(12) United States Patent  
Onishi et al.

(10) Patent No.: US 10,922,240 B2  
(45) Date of Patent: Feb. 16, 2021

(54) MEMORY SYSTEM, STORAGE SYSTEM AND METHOD OF CONTROLLING THE MEMORY SYSTEM

(71) Applicant: TOSHIBA MEMORY CORPORATION, Minato-ku (JP)

(72) Inventors: Shohei Onishi, Kawasaki (JP); Yoshiki Saito, Kawasaki (JP); Yohei Hasegawa, Fuchu (JP); Konosuke Watanabe, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/298,529

(22) Filed: Mar. 11, 2019

(65) Prior Publication Data

US 2020/0089617 A1 Mar. 19, 2020

(30) Foreign Application Priority Data

Sep. 19, 2018 (JP) .................................. 2018-174671

(51) Int. Cl.
    *G06F 12/00* (2006.01)  
    *G06F 12/1009* (2016.01)  
    *G06F 12/0875* (2016.01)

(52) U.S. Cl.  
    CPC ...... *G06F 12/1009* (2013.01); *G06F 12/0875* (2013.01); *G06F 2212/45* (2013.01); *G06F 2212/608* (2013.01)

(58) Field of Classification Search  
    CPC ............. G06F 12/1009; G06F 12/0875; G06F 2212/45; G06F 2212/608  
See application file for complete search history.

(56) References Cited

U.S. PATENT DOCUMENTS

| | | | | |
|---|---|---|---|---|
| 6,327,646 B1 * | 12/2001 | Sharma | ............... | G06F 12/1027 365/189.07 |
| 6,715,057 B1 * | 3/2004 | Kessler | ............... | G06F 12/1009 711/207 |
| 6,804,766 B1 * | 10/2004 | Noel | ...................... | G06F 12/08 711/203 |
| 8,527,544 B1 | 9/2013 | Colgrove et al. | | |
| 8,667,220 B2 | 3/2014 | Sato et al. | | |

(Continued)

FOREIGN PATENT DOCUMENTS

| | | |
|---|---|---|
| JP | 5789660 B2 | 10/2015 |
| JP | 6240071 B2 | 11/2017 |

*Primary Examiner* — Mano Padmanabhan  
*Assistant Examiner* — Mohammad S Hasan  
(74) *Attorney, Agent, or Firm* — Oblon, McClelland, Maier & Neustadt, L.L.P.

(57) ABSTRACT

According to one embodiment, a memory system includes a cache configured to cache a part of a multi-level mapping table for logical-to-physical address translation, and a controller. The multi-level mapping table includes a plurality of hierarchical tables corresponding to a plurality of hierarchical levels. The table of each hierarchical level includes a plurality of address translation data portions. The controller sets a priority for each of the hierarchical level based on a degree of bias of reference for each of the hierarchical level, and preferentially caches each of the address translation data portions of a hierarchical level with a high priority into the cache, over each of the address translation data portions of a hierarchical level with low priority.

14 Claims, 38 Drawing Sheets

(56) References Cited

U.S. PATENT DOCUMENTS

| | | | |
|---|---|---|---|
| 8,806,160 B2* | 8/2014 | Colgrove | G06F 3/0671 |
| | | | 711/162 |
| 9,959,214 B1* | 5/2018 | Habusha | G06F 12/1009 |
| 2002/0087544 A1* | 7/2002 | Selkirk | G06F 3/0608 |
| 2003/0236961 A1* | 12/2003 | Qiu | G06F 12/122 |
| | | | 711/170 |
| 2006/0195683 A1* | 8/2006 | Kissell | G06F 9/30043 |
| | | | 712/228 |
| 2010/0325352 A1* | 12/2010 | Schuette | G06F 3/0685 |
| | | | 711/103 |
| 2011/0191523 A1* | 8/2011 | Caulkins | G06F 12/0868 |
| | | | 711/103 |
| 2013/0042052 A1 | 2/2013 | Colgrove et al. | |
| 2013/0086006 A1 | 4/2013 | Colgrove et al. | |
| 2013/0086353 A1 | 4/2013 | Colgrove et al. | |
| 2013/0097380 A1* | 4/2013 | Colgrove | G06F 3/0641 |
| | | | 711/118 |
| 2013/0297894 A1* | 11/2013 | Cohen | G06F 3/0679 |
| | | | 711/154 |
| 2014/0195551 A1 | 7/2014 | Colgrove et al. | |
| 2014/0281122 A1* | 9/2014 | Lieber | G06F 12/0246 |
| | | | 711/103 |
| 2014/0304453 A1* | 10/2014 | Shao | G06F 12/0246 |
| | | | 711/103 |
| 2014/0325151 A1* | 10/2014 | Kim | G06F 16/185 |
| | | | 711/117 |
| 2016/0070474 A1* | 3/2016 | Yu | G06F 3/0604 |
| | | | 711/103 |
| 2016/0313920 A1* | 10/2016 | O'Broin | G06F 3/06 |
| 2016/0328161 A1* | 11/2016 | Huang | G06F 12/0238 |

* cited by examiner

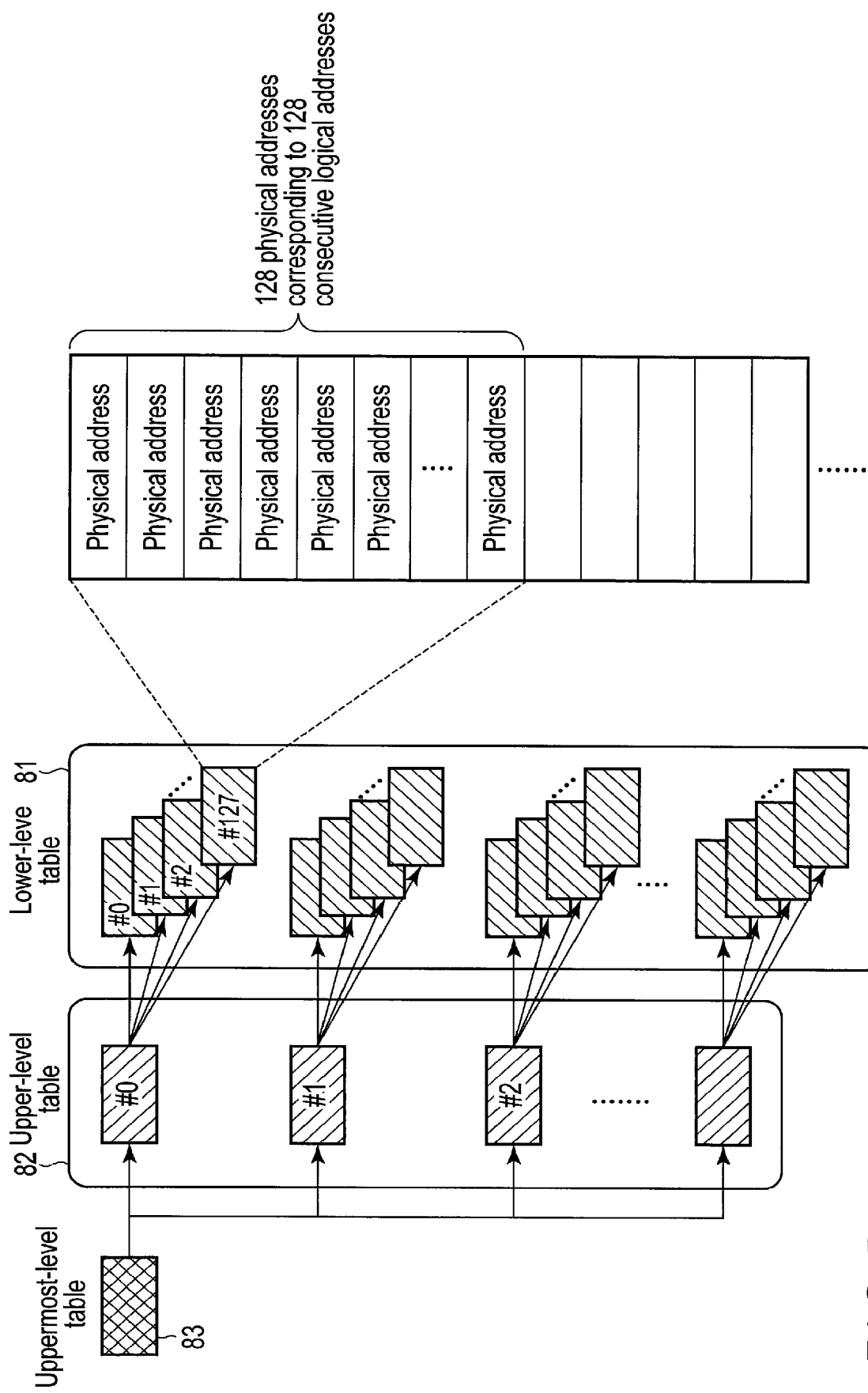
F I G. 5

Table cache 61

| Tag | Type (Lower/Upper) | History | Flags | Segment (address translation data portion) | Cache line |
|---|---|---|---|---|---|
| Tag.addr. | Upper | | | Upper-level table segment | L0 |
| Tag.addr. | Lower | | | Lower-level table segment | L1 |
| Tag.addr. | Lower | | | Lower-level table segment | L2 |
| Tag.addr. | Upper | | | Upper-level table segment | L3 |
| Tag.addr. | Lower | | | Lower-level table segment | L4 |
| Tag.addr. | Upper | | | Upper-level table segment | L5 |
| Tag.addr. | Lower | | | Lower-level table segment | L6 |
| Tag.addr. | Lower | | | Lower-level table segment | L7 |
| Tag.addr. | Lower | | | Lower-level table segment | L8 |
| ... | ... | ... | ... | ... | ... |
| Tag.addr. | Upper | | | Upper-level table segment | Lm-1 |

Cache management table | Cache main body

FIG. 7

| Hierarchical level | Range of coverable logical addresses | Number of times of access to storage medium when cache hit |
|---|---|---|
| Lower-level table segment | 512KiB (=4KiB×128) | One time (One time for reading user data) |
| Upper-level table segment | 64MiB (=512KiB×128) | Two times (One time for reading mapping table and one time for reading user data) |
| Uppermost-level table segment | Entire region (Entire uppermost-level table present on RAM) | Three times (Two times for reading mapping table and one time for reading user data) |

F I G. 12

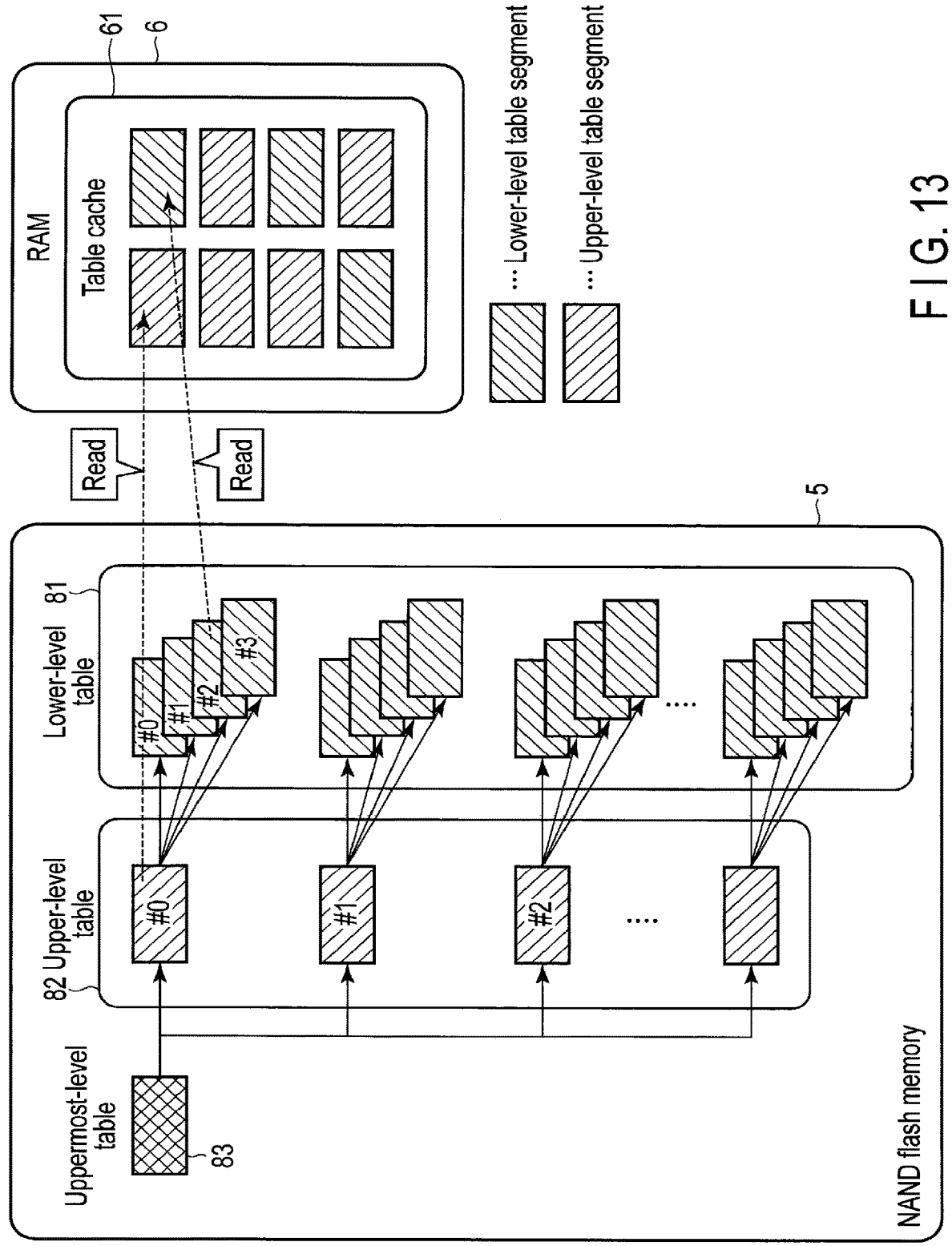
F I G. 13

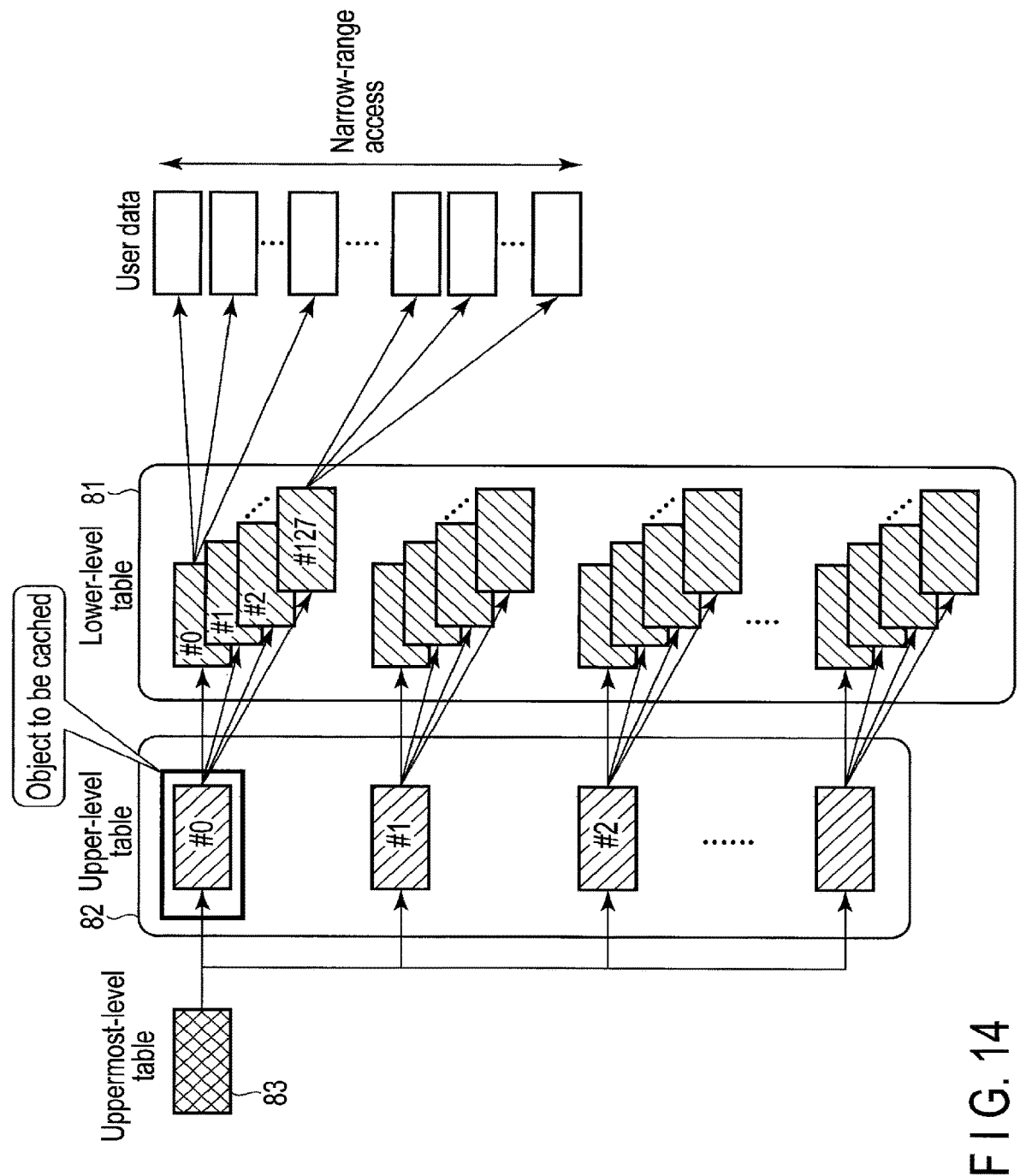
F I G. 14

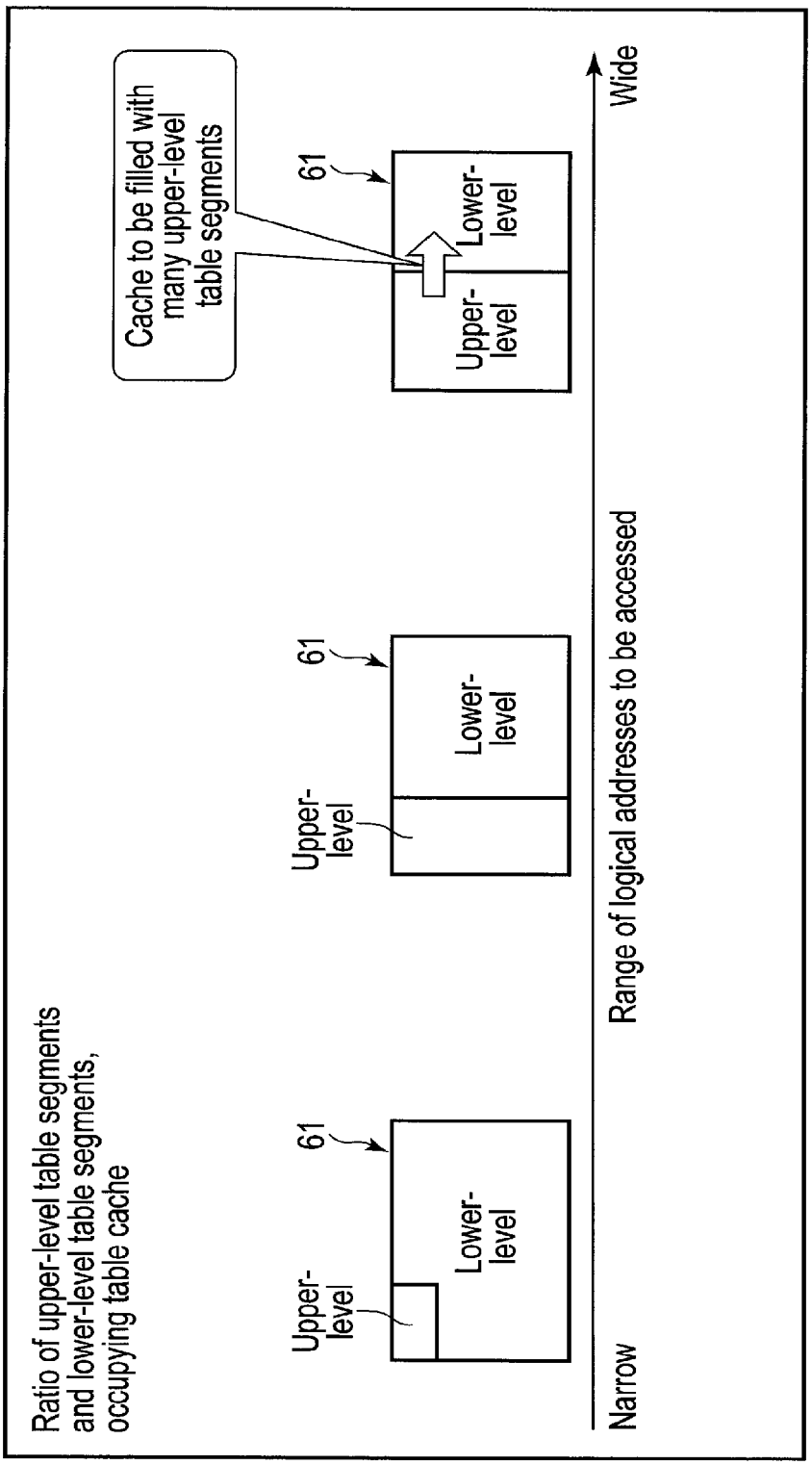
F I G. 17

| Hierarchical level | Priority |
|---|---|
| Upper-level | High |
| Lower-level | Low |
F I G. 18
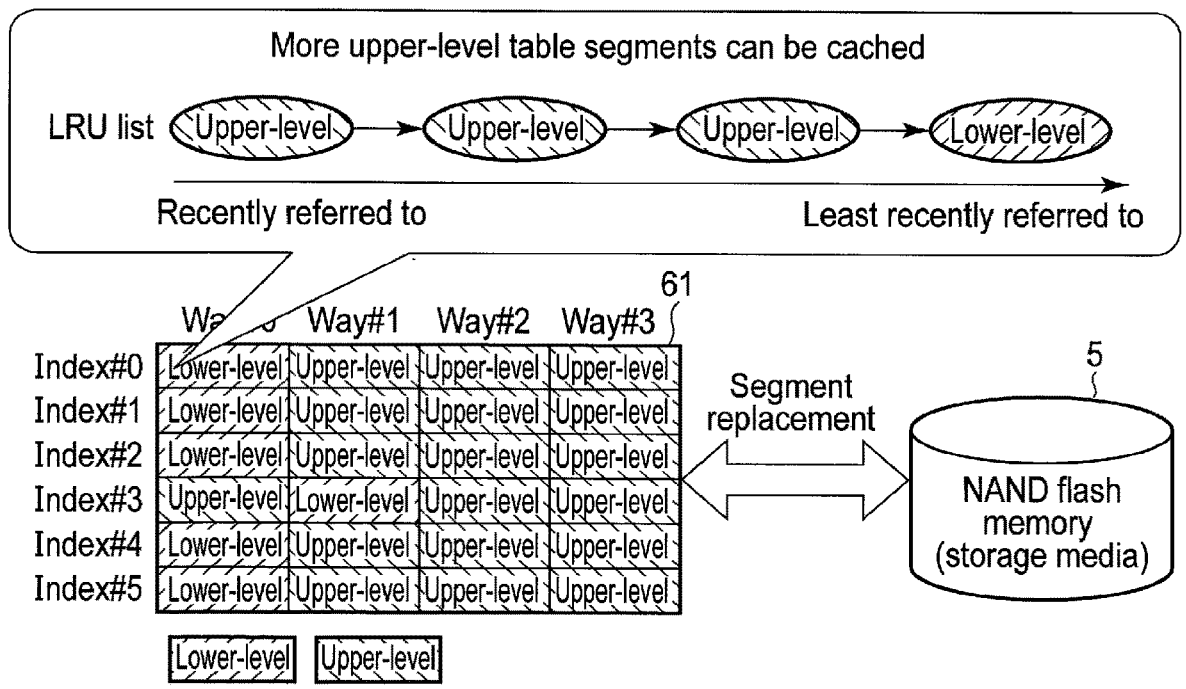
F I G. 19

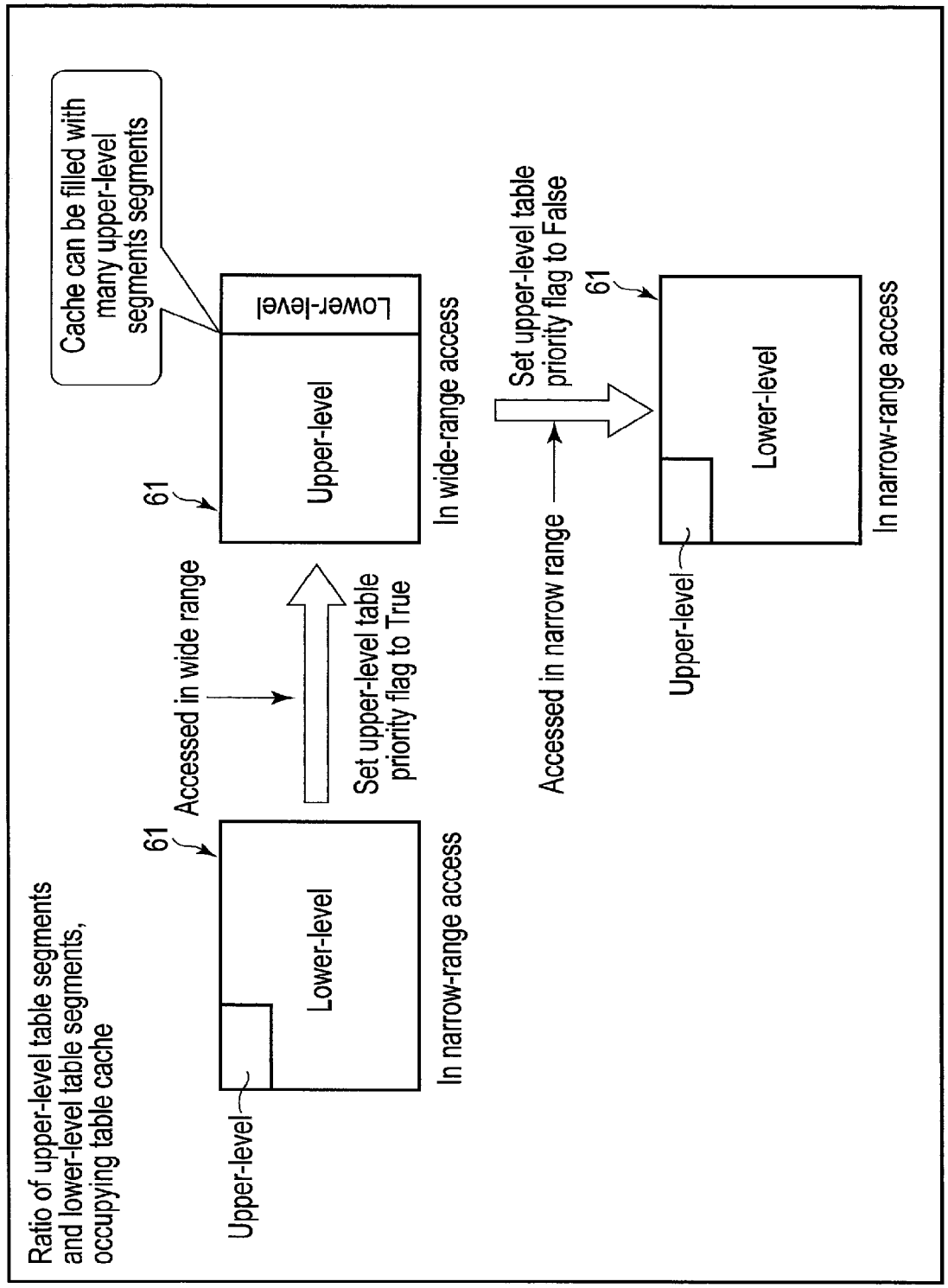
F I G. 20

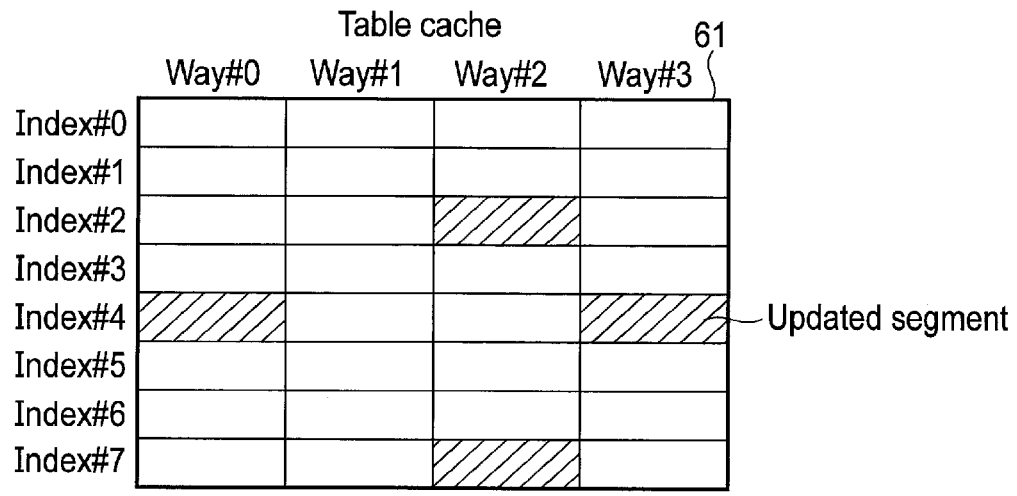
F I G. 21
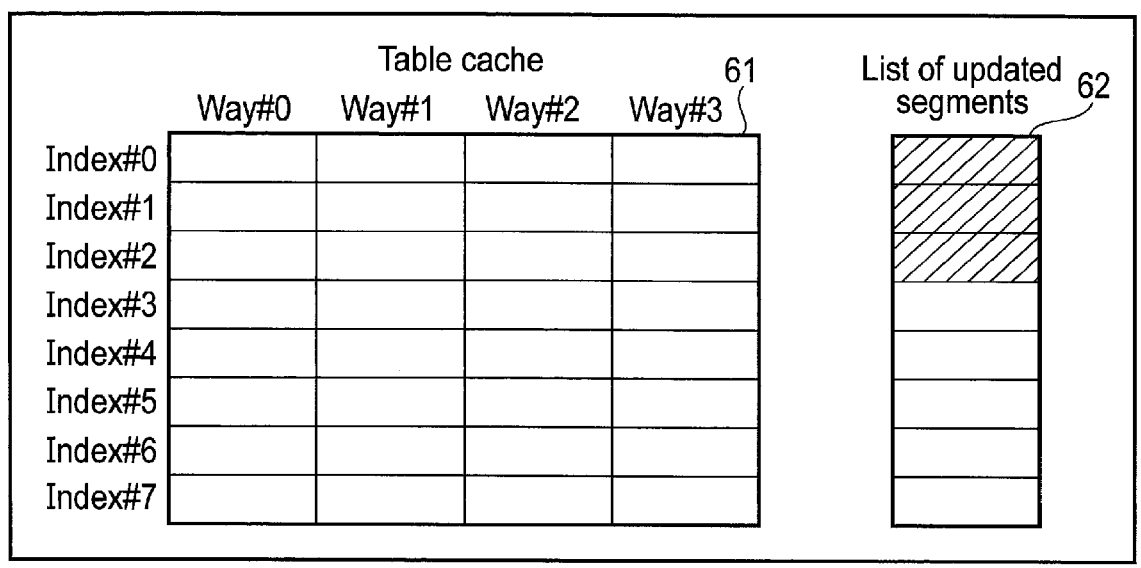
F I G. 22

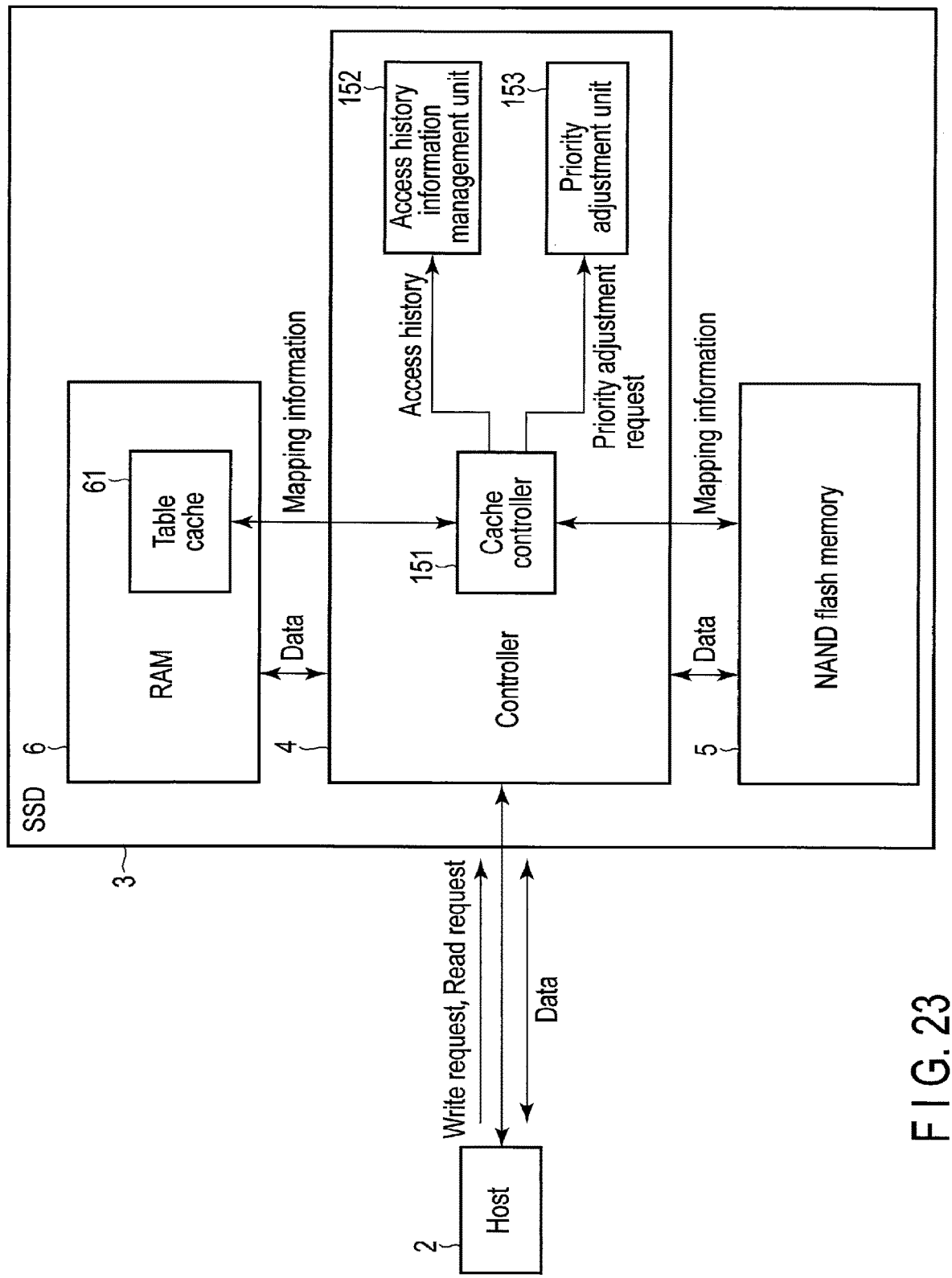
F I G. 23

Example of Case of deep hierarchical level:
Adjust priority order by numerical value

| Hierarchical level | Priority |
|---|---|
| 1 | 3 |
| 2 | 2 |
| 3 | 1 |

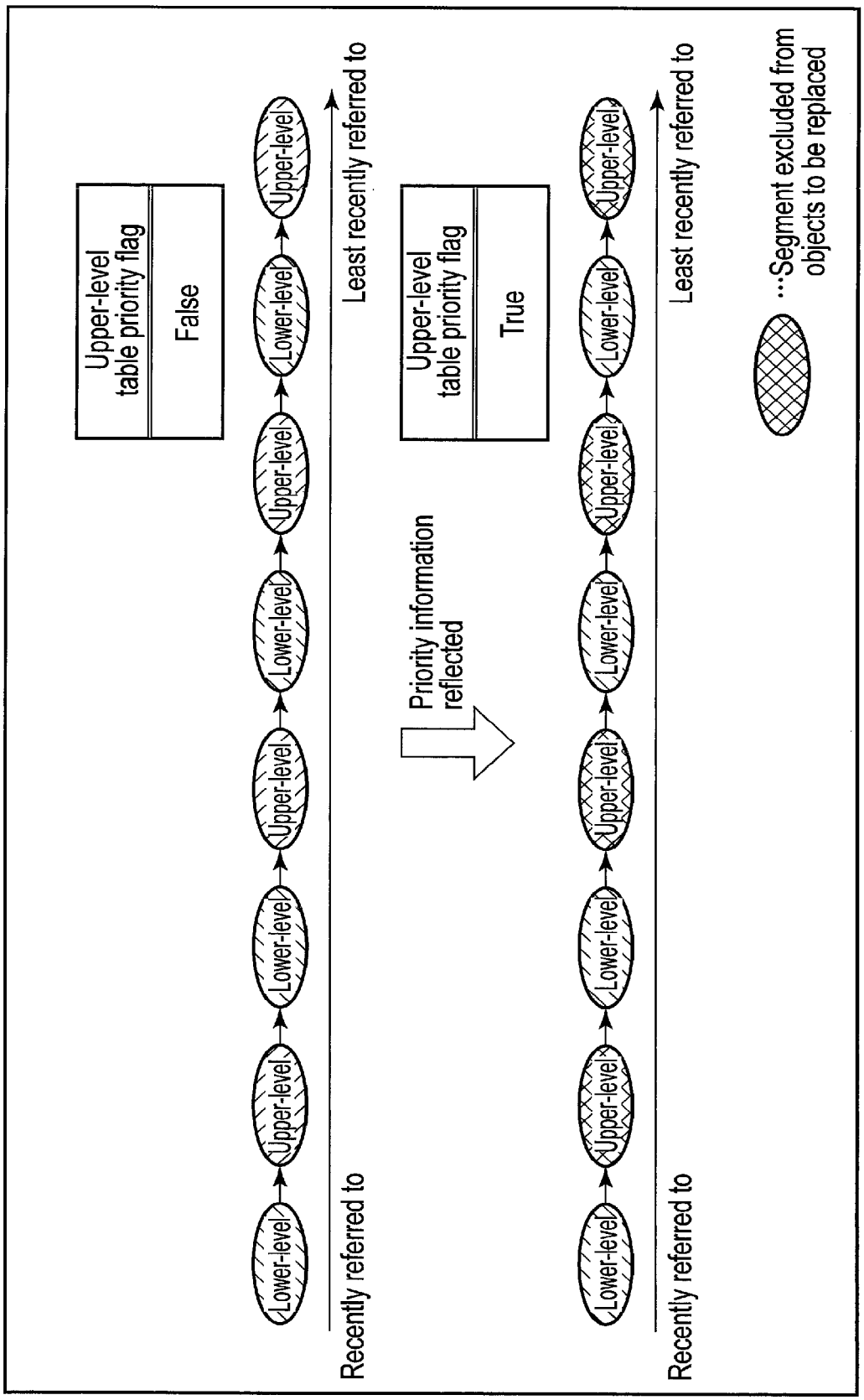
F I G. 27

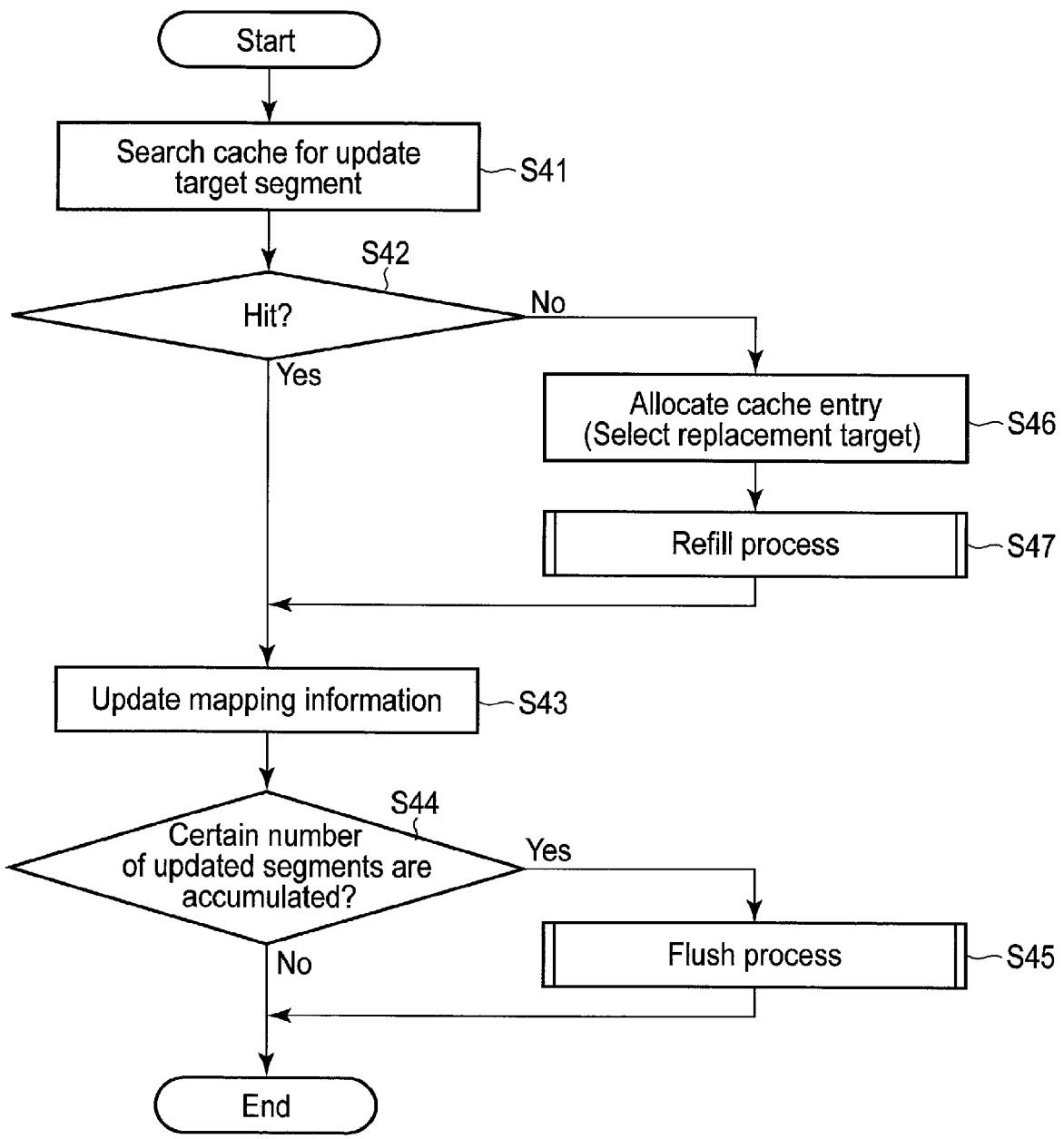
F I G. 30

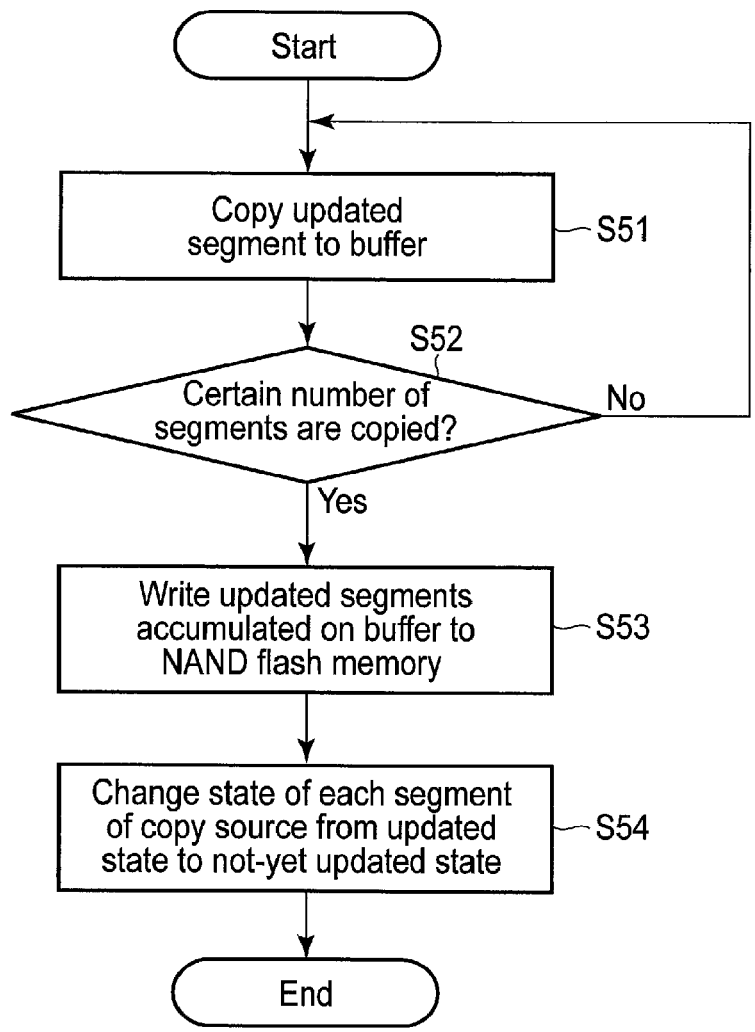
F I G. 31

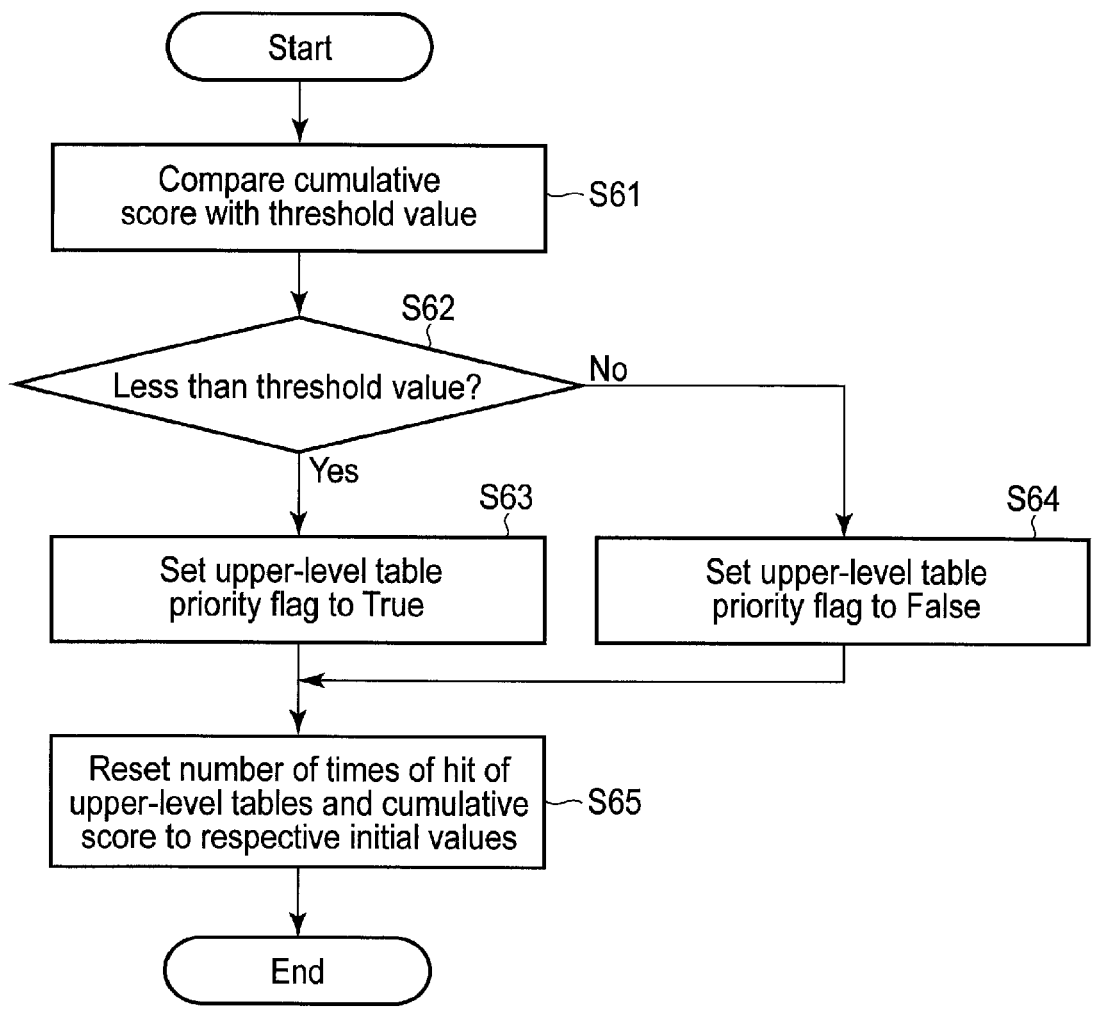
F I G. 32

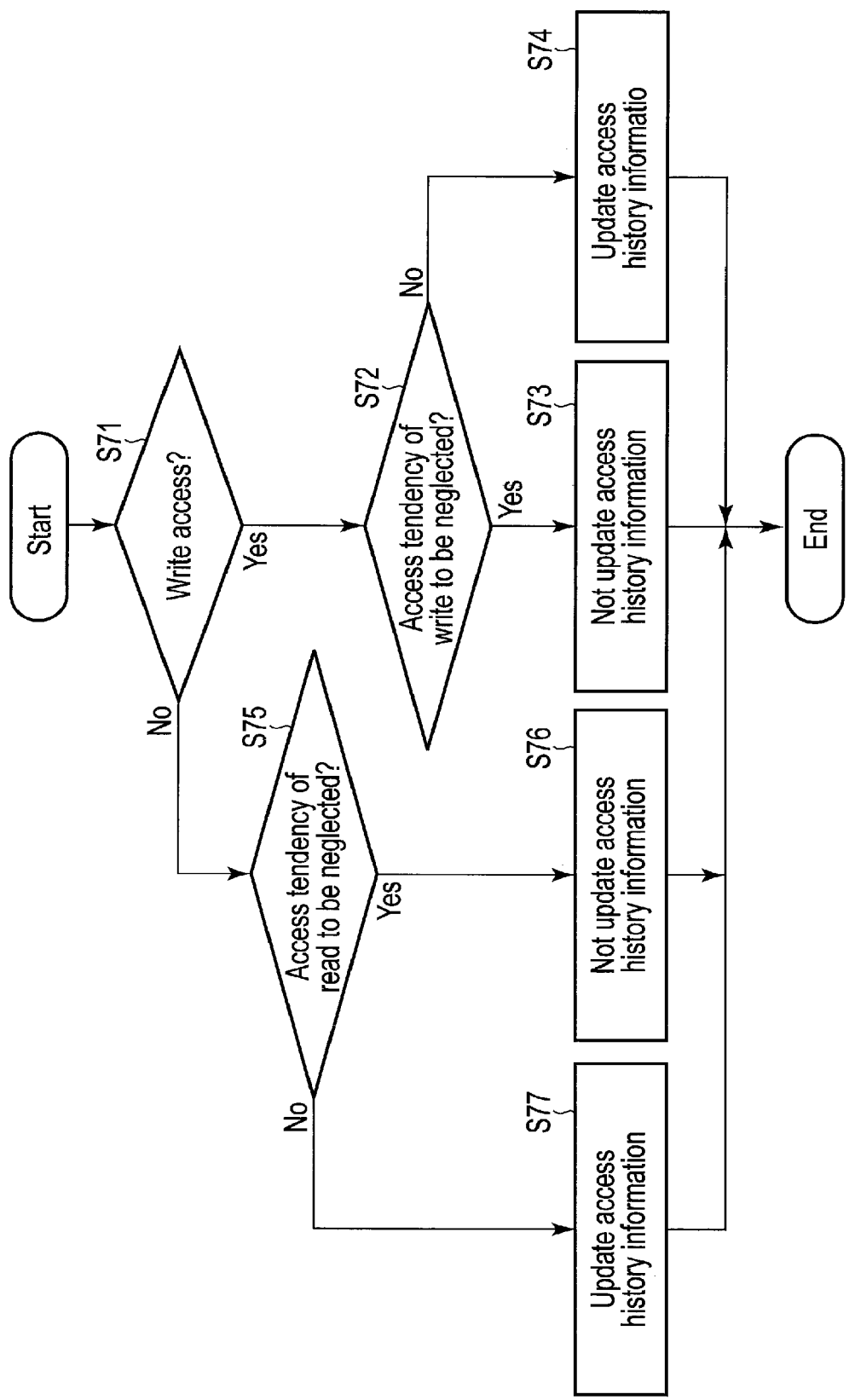
F I G. 34

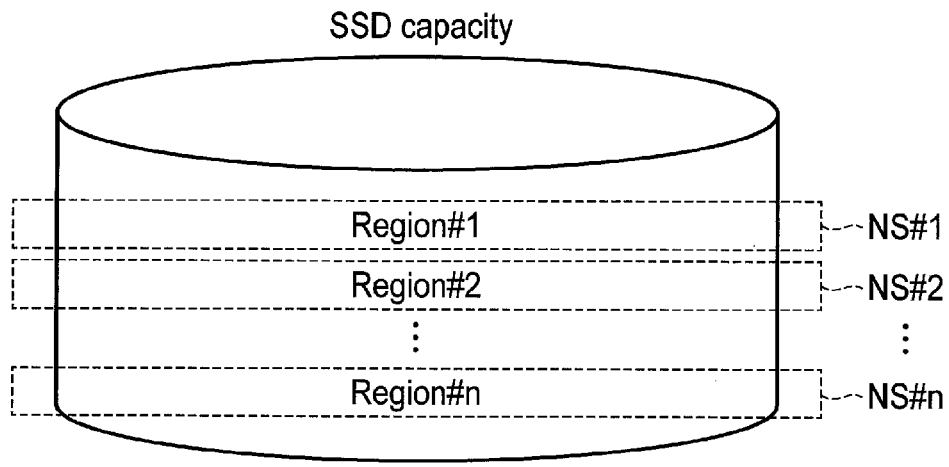
F I G. 35
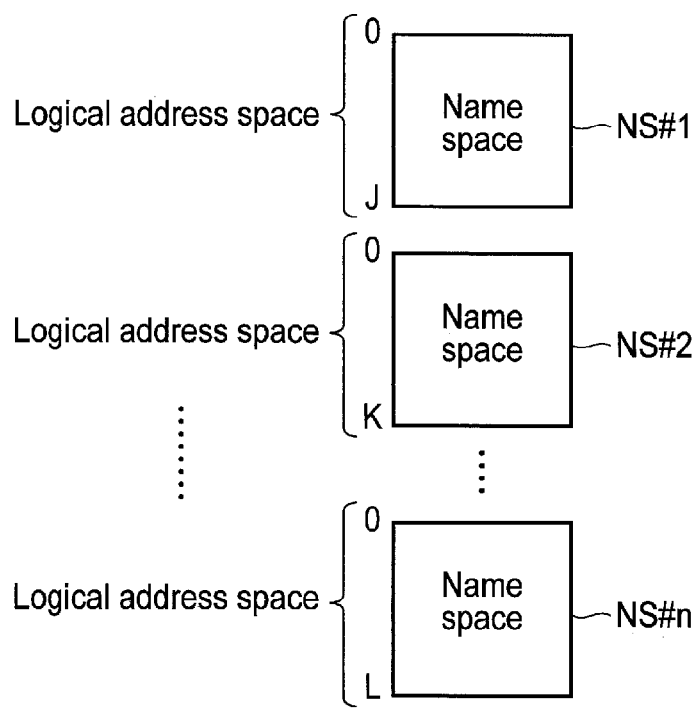
F I G. 36

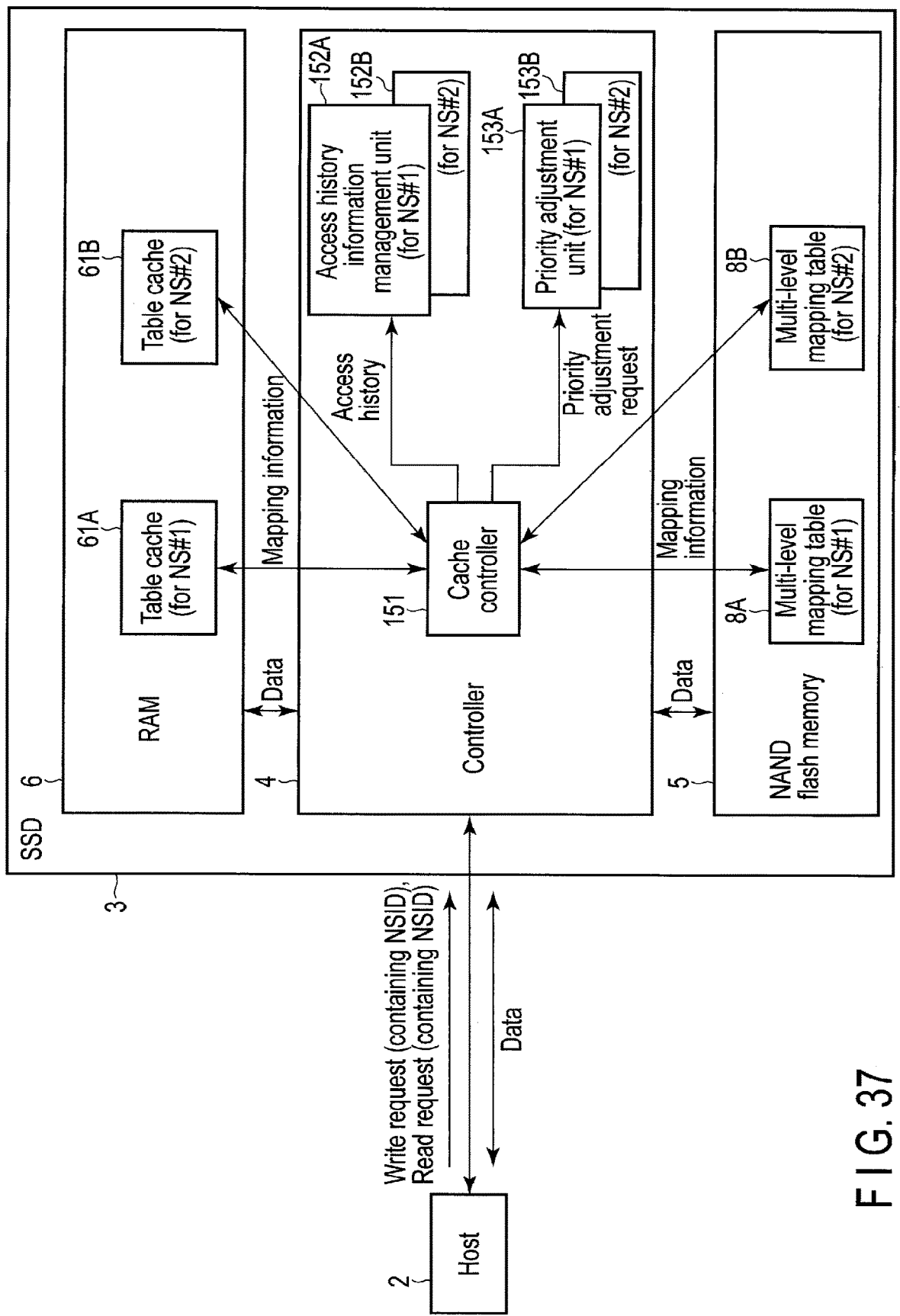
F I G. 37

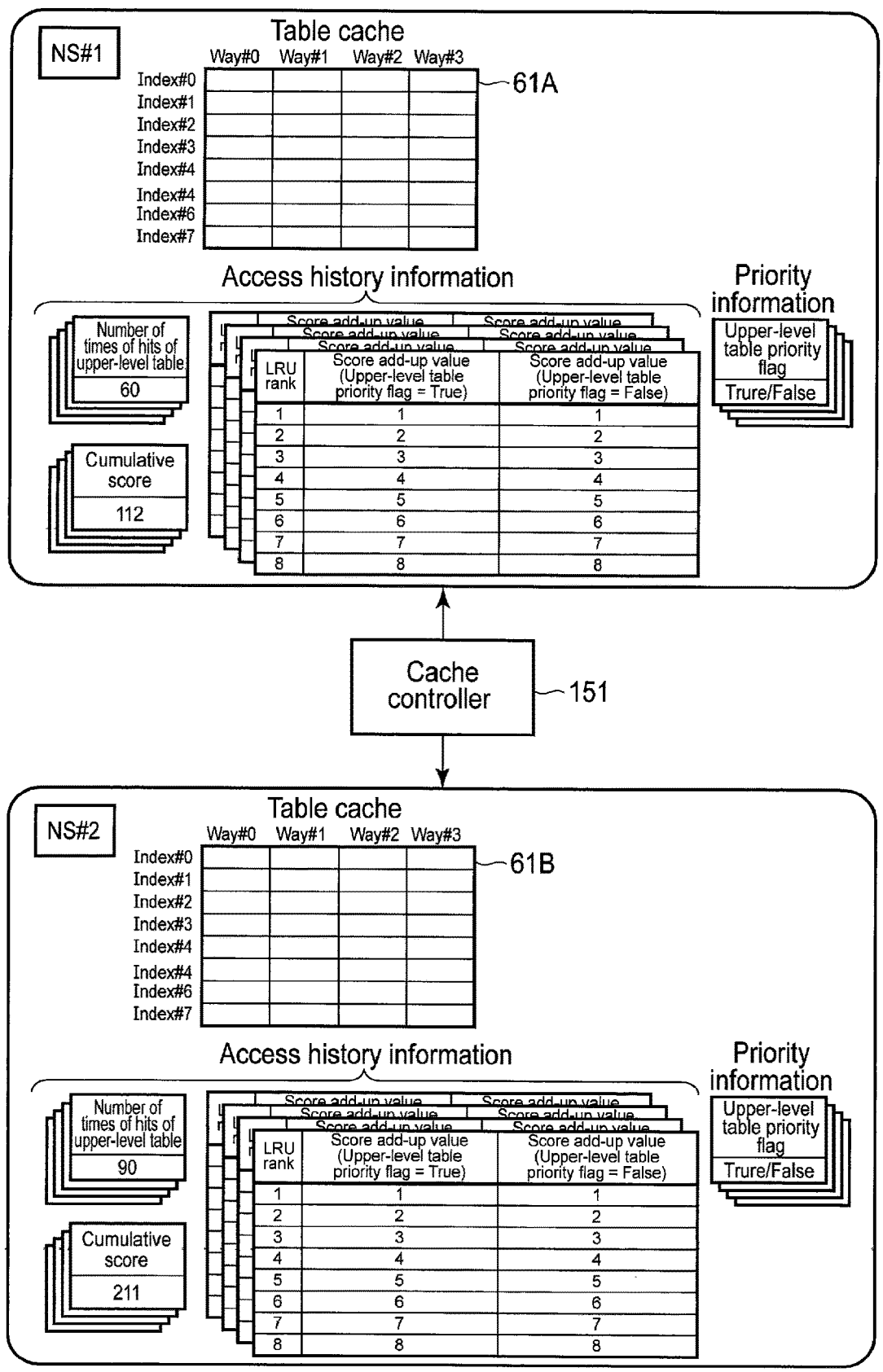
F I G. 39

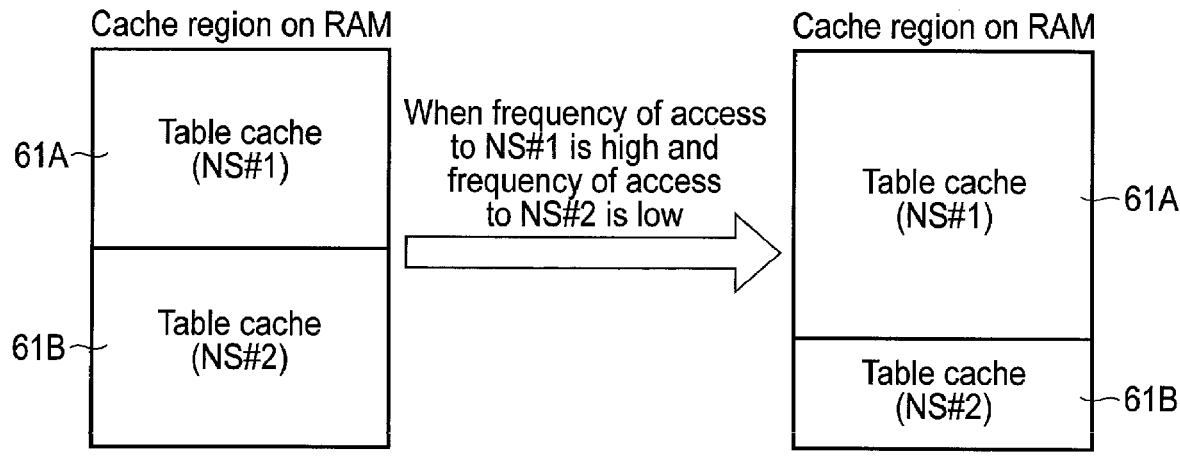
F I G. 42
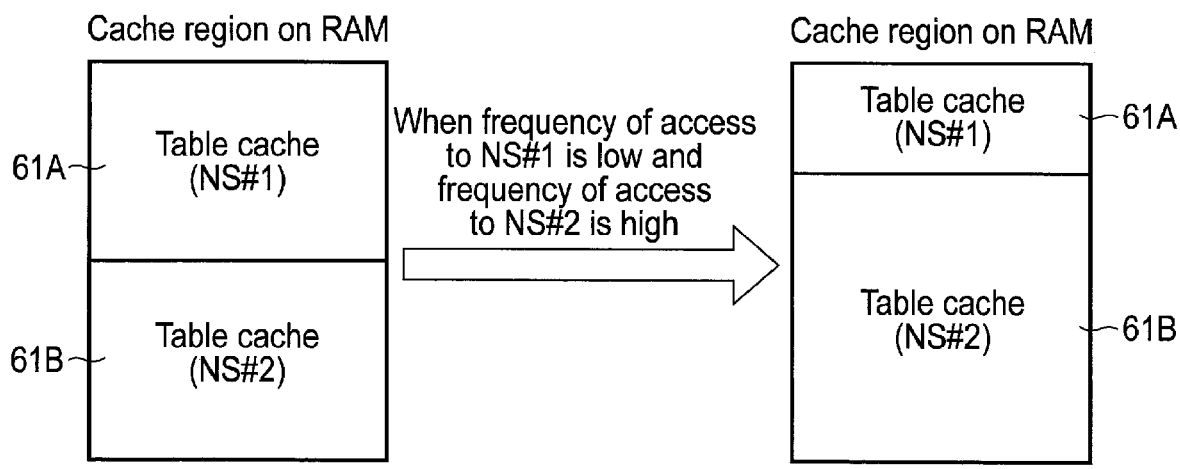
F I G. 43

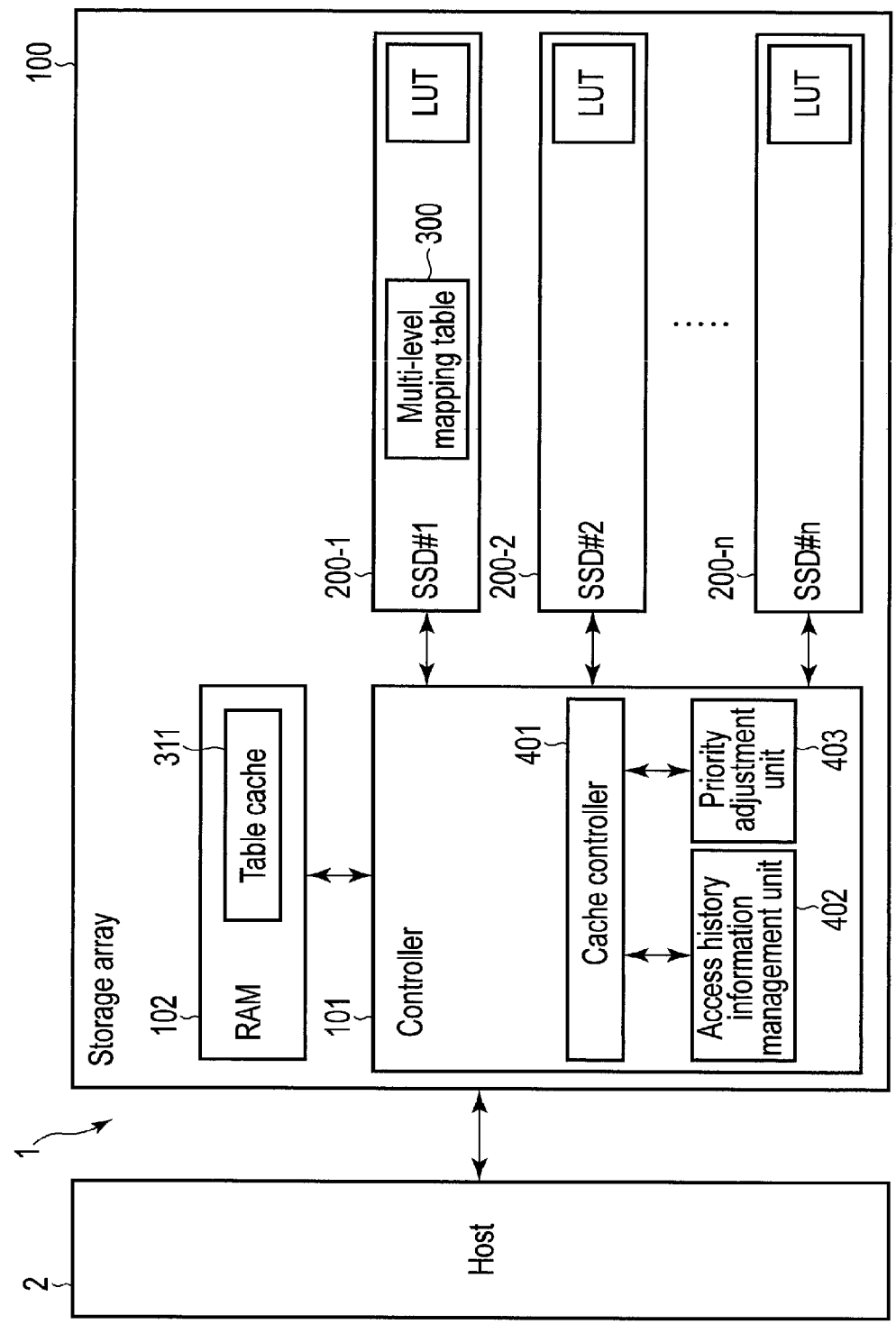
F I G. 44

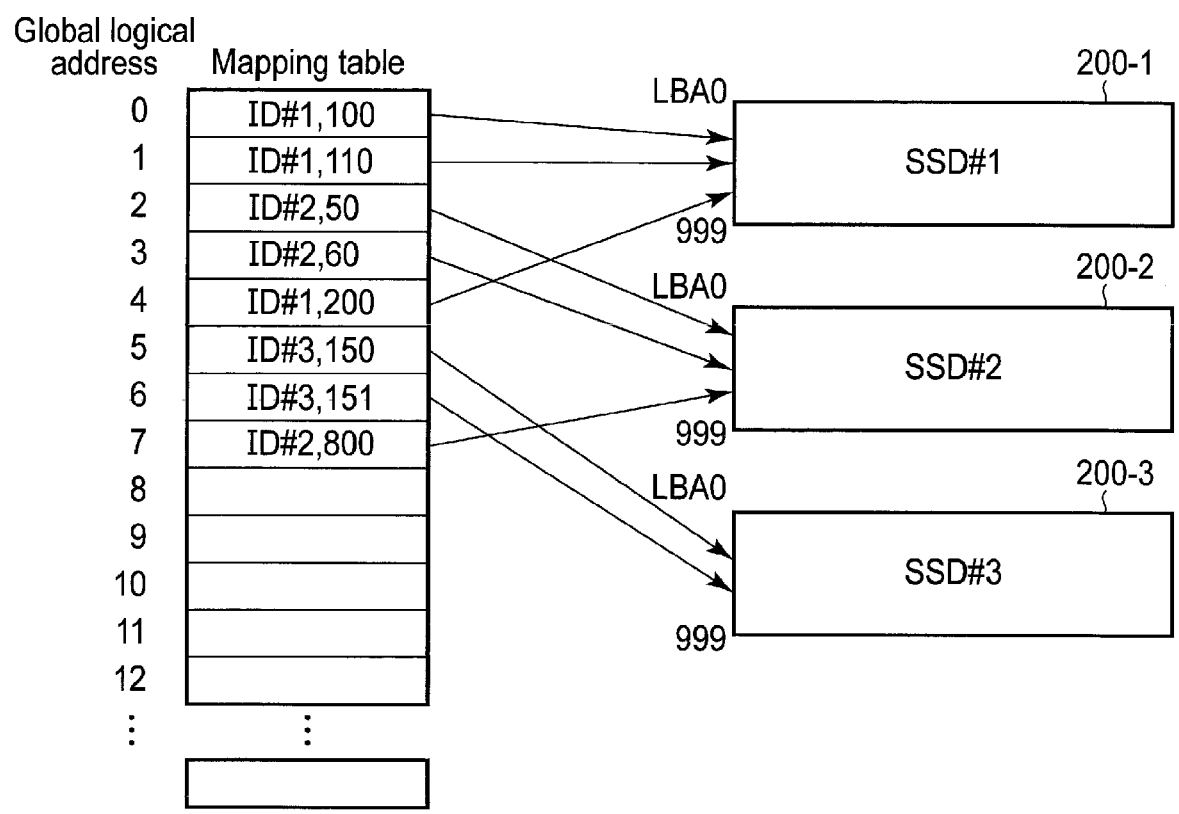
F I G. 45

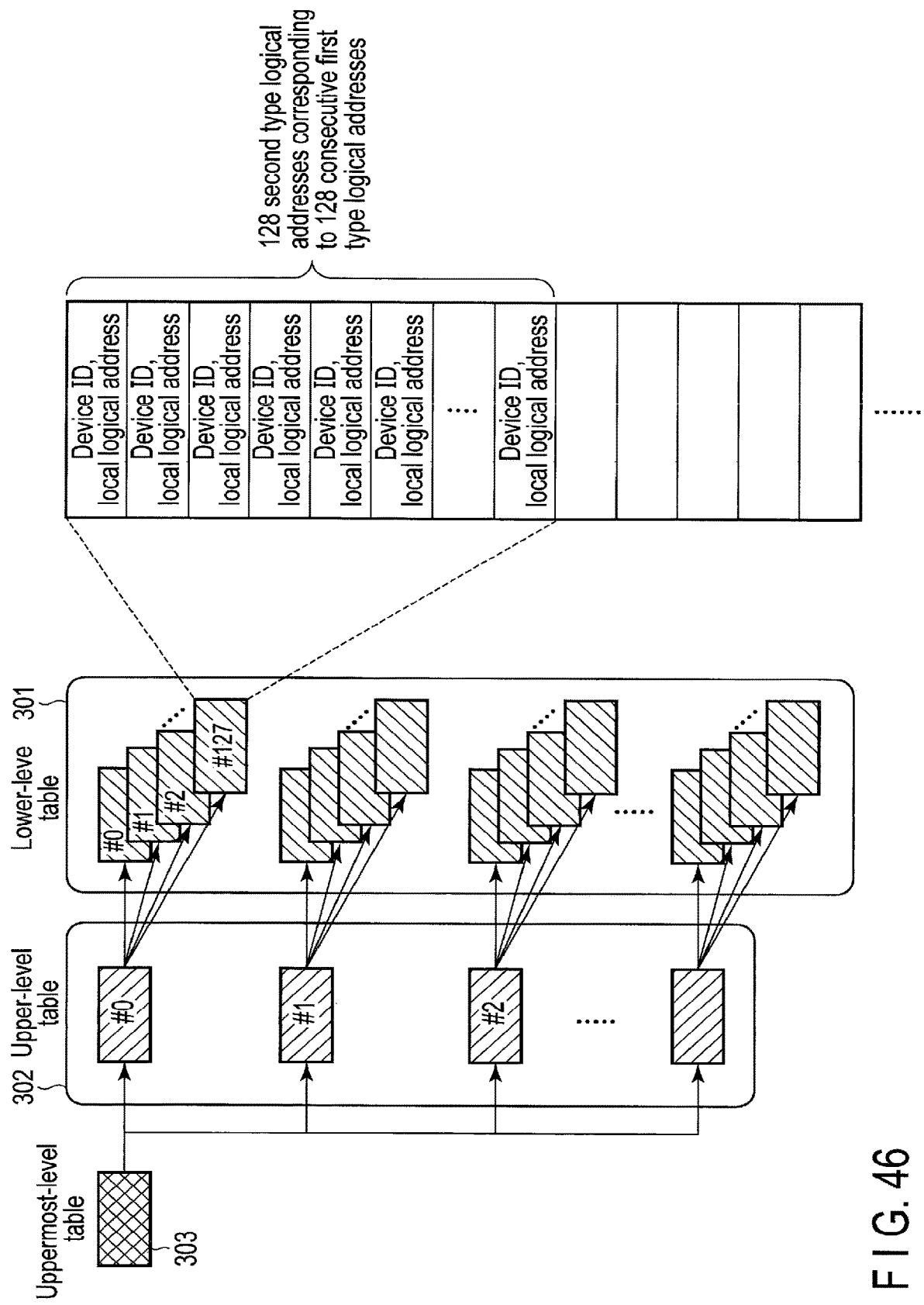
F I G. 46

MEMORY SYSTEM, STORAGE SYSTEM AND METHOD OF CONTROLLING THE MEMORY SYSTEM

CROSS-REFERENCE TO RELATED APPLICATIONS

This application is based upon and claims the benefit of priority from Japanese Patent Application No. 2018-174671, filed Sep. 19, 2018, the entire contents of which are incorporated herein by reference.

FIELD

Embodiments described herein relate generally to a technique of controlling address translation such as logical-to-physical address translation.

BACKGROUND

In recent years, memory systems including nonvolatile memories have been widely prevalent.

As one of the memory systems, a solid state drive (SSD) including a NAND flash memory has been known. In such a memory system, address translation is executed using an address mapping table.

Moreover, in a computer system such as a server, a storage system including a plurality of storage devices is also used. The storage system is called a storage array in some cases.

In such the storage system as well, address translation may be executed using an address mapping table.

Here, if the time which requires for the address translation is prolonged, the performance of the memory system or the storage system may be degraded.

BRIEF DESCRIPTION OF THE DRAWINGS

FIG. 5 is a diagram illustrating a multi-level mapping table (multi-level logical-to-physical address translation table) used in the memory system of the first embodiment.

FIG. 7 is a diagram illustrating a configuration example of a table cache which stores a part of the multi-level mapping table in the memory system of the first embodiment.

FIG. 12 is a diagram illustrating the range of logical addresses covered by each hierarchical level of the multi-level mapping table, and the number of times of accessing the storage medium (nonvolatile memory) when a cache hit occurs in each hierarchical level.

FIG. 13 is a diagram illustrating an operation of refilling (storing) mapping information from the nonvolatile memory to the table cache in the order of an upper-level table and a lower-level table.

FIG. 14 is a diagram illustrating a case where only a narrow logical address range covered by one upper-level table segment is accessed by a host (narrow-range access).

FIG. 17 is a diagram illustrating the ratio of the upper-level table segments and the lower-level table segments, which occupy the table cache.

FIG. 18 is a diagram illustrating an upper-level table priority (high priority) and a lower-level table priority (low priority) set in the memory system of the first embodiment when a degree of bias of reference with respect to an upper-level table segment stored in the table cache is weak (when it is wide-range access).

FIG. 19 is a diagram illustrating an operation of preferentially caching each upper-level table segment with a high priority into the table cache, over each lower-level table segment.

FIG. 20 is a diagram illustrating an operation of dynamically adjusting the priority of each hierarchical level of the multi-level mapping table according to the degree of bias of reference with respect to the upper-level table segment stored in the table cache.

FIG. 21 is a diagram illustrating an operation of managing updated segments within the table cache.

FIG. 22 is a diagram illustrating an operation of managing updated segments by a data structure different from that of the table cache.

FIG. 23 is a block diagram illustrating a cache controller, an access history information management unit, and a priority adjustment unit contained in the memory system of the first embodiment.

FIG. 27 is a diagram illustrating how a method of selecting a replacement target is changed by a value of an upper-level table priority flag.

FIG. 30 is a flowchart illustrating a procedure of an address update process executed by the memory system of the first embodiment.

FIG. 31 is a flowchart illustrating a procedure of a flush process executed by the memory system of the first embodiment.

FIG. 32 is a flowchart illustrating a procedure of a priority information update process executed by the memory system of the first embodiment.

FIG. 34 is a flowchart illustrating a procedure of processing of neglecting either one of an access tendency regarding a write access and an access tendency regarding a read access.

FIG. 35 is a diagram illustrating a plurality of regions respectively corresponding to a plurality of namespaces supported by the memory system of the first embodiment.

FIG. 36 is a diagram illustrating an example of a logical address space corresponding to each of the namespaces.

FIG. 37 is a block diagram illustrating a configuration example for individually adjusting priority information for each table cache corresponding to each of the namespaces.

FIG. 39 is a diagram illustrating the access history information and the priority information, individually managed for each namespace by the cache controller in the memory system of the first embodiment.

FIG. 42 is a diagram illustrating an operation of changing memory capacities to be assigned to table caches respectively corresponding to the namespaces, on the basis of the frequencies of access to respective namespaces.

FIG. 43 is a diagram illustrating another operation of changing the memory capacities to be assigned to the table caches respectively corresponding to the namespaces, on the basis of the frequencies of access to respective namespaces.

FIG. 44 is a block diagram illustrating a configuration example of a storage system of a second embodiment, which contains a cache controller, an access history information management unit, and a priority adjustment unit.

FIG. 45 is a diagram illustrating a configuration example of a mapping table used in the storage system of the second embodiment.

FIG. 46 is a diagram illustrating a multi-level mapping table used in the storage system of the second embodiment.

DETAILED DESCRIPTION

Various embodiments will be described hereinafter with reference to the accompanying drawings.

In general, according to one embodiment, a memory system connectable to a host, comprises a nonvolatile memory configured to store a multi-level mapping table for logical-to-physical address translation, a cache configured to cache a part of the multi-level mapping table, and a controller configured to control the nonvolatile memory and the cache. The multi-level mapping table includes a plurality of tables corresponding to a plurality of hierarchical levels, each of the tables containing a plurality of address translation data portions, and each of the plurality of address translation data portions included in the table of each of the hierarchical levels covering a logical address range according to each hierarchical level.

The controller executes, by referring to the address translation data portion corresponding to each of the hierarchical levels stored in the cache, an address resolution process for logical-to-physical address translation and an address update process of updating a physical address corresponding to a logical address.

The controller sets a priority for each of the hierarchical levels, on the basis of a degree of bias of reference for each of the hierarchical levels, the degree of bias of reference relating to the address translation data portion corresponding to each of the hierarchical levels stored in the cache. The controller executes an operation of preferentially caching the address translation data portions of a hierarchical level with a high priority into the cache, over the address translation data portions of a hierarchical level with low priority.

First Embodiment

Figure 1:
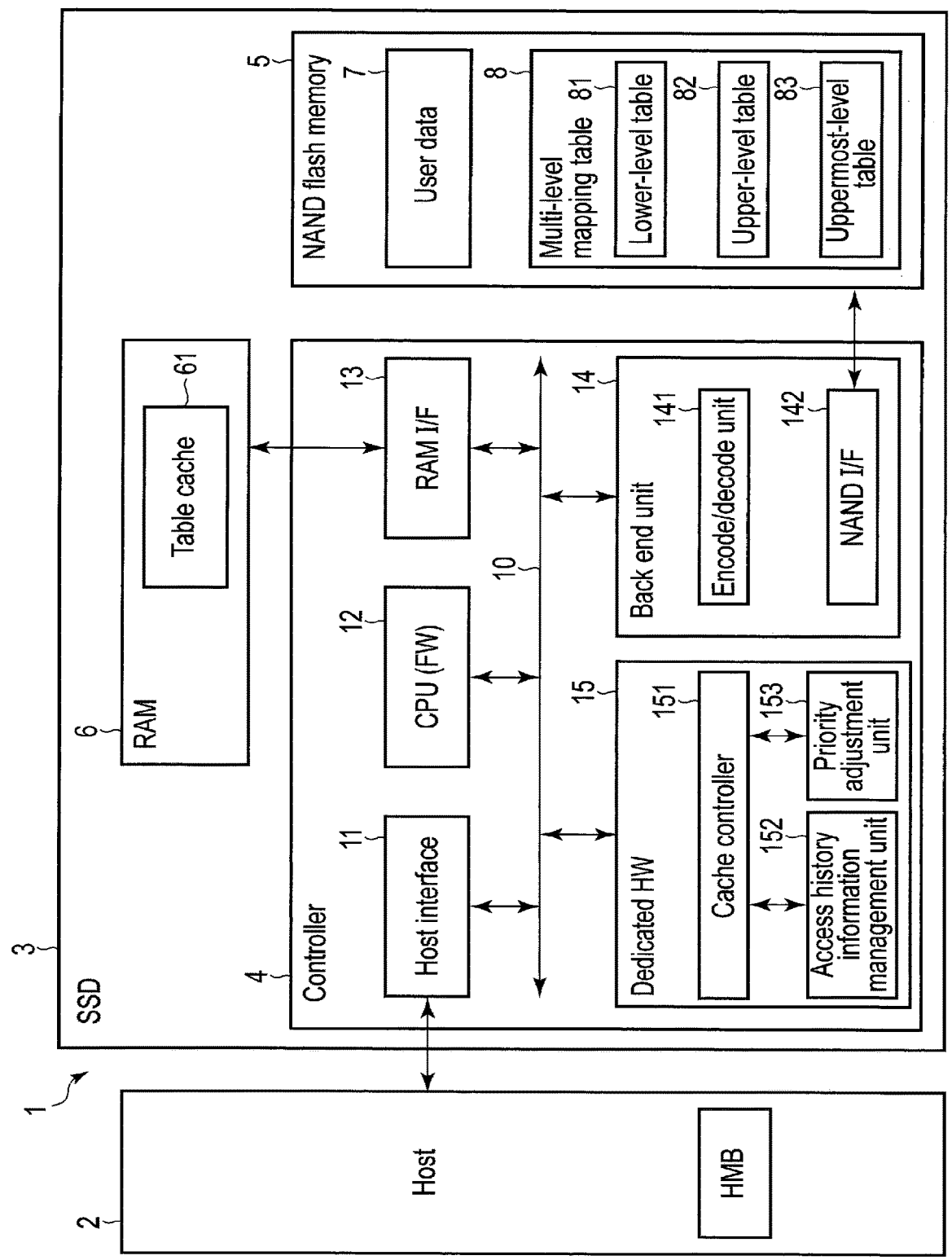
FIG. 1 is a block diagram illustrating a configuration example of an information processing system including a memory system according to a first embodiment.

With reference to FIG. 1, a configuration of an information processing system 1 including a memory system according to the first embodiment will be described.

The memory system is a semiconductor storage device configured to write data to a nonvolatile memory, and read data from the nonvolatile memory. The memory system may be realized as, for example, a solid-state drive (SSD) or a memory card. The following descriptions will be made based on the assumption that the memory system is realized as a solid-state drive (SSD) 3.

The information processing system 1 includes a host (host device) 2 and the SSD 3. The hosts 2 may be a personal computer, a server and a cellular phone or an imaging device, or a personal digital assistant such as a tablet and a smart phone, or a game console or an in-vehicle terminal such as a car-navigation system.

The SSD 3 may be used as an external storage of an information processing apparatus which functions as the host 2. The SSD 3 may be accommodated in the information processing apparatus or connected to the information processing apparatus via a cable or a network.

An NVM Express (NVMe) (registered trademark) protocol or a Serial ATA (SATA) protocol is used for communication between the host 2 and the SSD 3.

The SSD 3 comprises a controller 4 and a NAND flash memory 5 which operates as a nonvolatile memory (nonvolatile semiconductor memory). Although not particularly limited, the NAND flash memory 5 may include a plurality of NAND flash memory chips. The NAND flash memory 5 may be a NAND flash memory of a two-dimensional structure or a three-dimensional structure.

The NAND flash memory 5 is used to store user data 7 and a multi-level mapping table 8.

The multi-level mapping table 8 is a multi-level logical-to-physical address translation table for managing mapping between each of logical addresses designated by the host 2 and each of physical addresses of the NAND flash memory 5.

The multi-level mapping table 8 is a mapping table having a hierarchical structure, and contains a plurality of hierarchical tables. The number of hierarchical levels of the multi-level mapping table 8, i.e., the number of tables contained in the multi-level mapping table 8, is not particularly limited, and it may be two, three, four or more. That is, the multi-level mapping table 8 contains a plurality of tables corresponding respectively to the plurality of hierarchical levels. A table of each hierarchical level contains a plurality of address translation data portions. Each of the address translation data portions contained in the table of each hierarchical level covers a logical address range according to its hierarchical level.

FIG. 1 shows an example case where there are three tables contained in the multi-level mapping table 8. In this case, the multi-level mapping table 8 contains a lower-level table 81, an upper-level table 82 and an uppermost-level table 83.

The controller 4 utilizes the multi-level mapping table 8 to manage, in units of a predetermined management size, correspondence relationship between each of logical addresses and each of physical addresses of the NAND flash memory 5 in which the user data corresponding to each of the logical addresses is stored. The lower-level table 81 is used to manage the physical addresses in the NAND flash memory 5, in which the user data are written. The upper-level table 82 is used to manage the physical addresses in the NAND flash memory 5, in which address translation data portions contained in the lower-level table 81 are written. The uppermost-level table 83 is used to manage the physical addresses in the NAND flash memory 5, in which address translation data portions contained in the upper-level table 82 are written.

Usually, logical block addresses (LBAs) are used as the logical addresses. In this embodiment, the data written in the NAND flash memory 5 according to a write command received from the host 2 is called user data.

Figure 2:
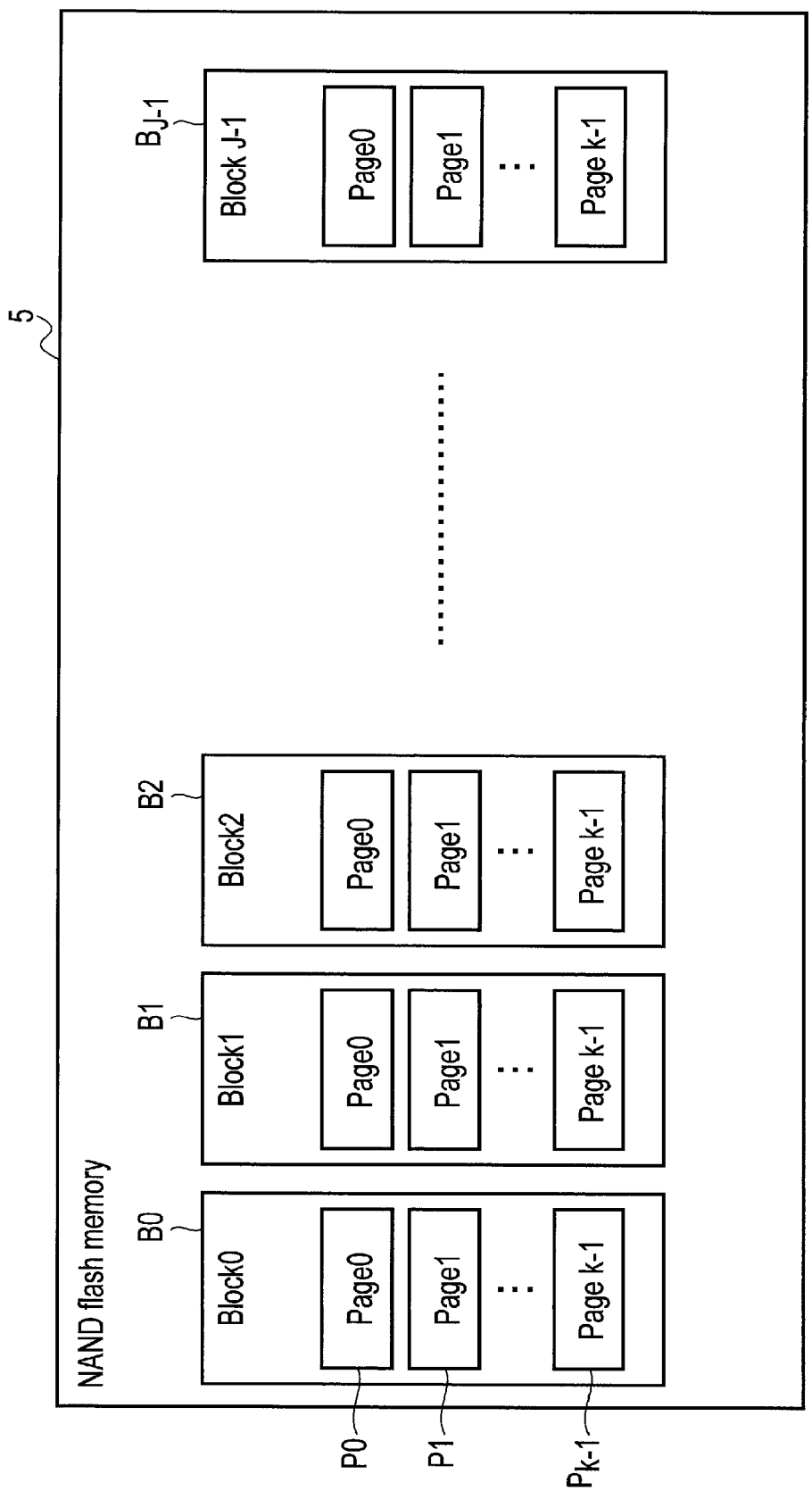
FIG. 2 is a block diagram illustrating a configuration example of a nonvolatile memory in the memory system according to the first embodiment.

The NAND flash memory 5 contains one or more NAND flash memory chips each comprising a memory cell array. The memory cell array comprises a plurality of memory cells arrayed in a matrix. As shown in FIG. 2, the memory cell array of the NAND flash memory 5 comprises a plurality of blocks B0 to Bj−1. Each of the blocks B0 to Bj−1 function as an erase unit. That is, each of the blocks B0 to Bj−1 is a unit of erasing data.

Each of the blocks B0 to Bj−1 includes pages P0, P1, . . . Pk−1. Each page contains a plurality of memory cells connected to the same word line. In the NAND memory 5, reading and writing of data are executed in units of page. That is, each of the pages P0, P1, . . . Pk−1 is a unit of reading or writing data.

In FIG. 1, the controller 4 is electrically connected to the NAND flash memory 5, and it operates as a memory controller configured to control the NAND flash memory 5. The controller 4 may be realized by a circuit such as a System-on-a-chip (SoC).

The SSD 3 may further comprise a random access memory (RAM) 6. The RAM 6 may be a dynamic RAM (DRAM) or a static RAM (SRAM). When the RAM 6 is an SRAM, the RAM 6 may be built in the controller 4.

The controller 4 receives various requests such as a write request (write command) and a read request (read demand) from the host 2, and executes data transfer between the host 2 and the RAM 6 and data transfer between the RAM 6 and the NAND flash memory 5 according to the write or read request received.

The RAM6 is used as a region (buffer) to temporarily store the data received from the host 2 and the data read from the NAND flash memory 5. Further, the RAM 6 is used also as a work area for the internal processing executed within the SSD 3.

The SSD 3 may use a region (device usage region) on a host memory provided by the host 2, or may use both of the device usage region and the RAM 6. The device usage region may be a host managed buffer (HMB). Each of the write request and the read request received from the host 2 contains a logical address, a data length, a data attribute, and the like. The logical address contained in a write request specifies the location in a logical address space in which data is to be written, and the logical address contained in a read request specifies the location in the logical address space from which data is to be read. The data length indicates the length of data to be written (or to be read).

When the controller 4 receives a write request from the host 2, the controller 4 stores data transferred from the host 2 temporarily in the RAM 6. Then, the controller 4 writes the data to an available physical storage location in the NAND flash memory 5. When the controller 4 receives a read request from the host 2, the controller 4 reads from the NAND flash memory 5 the data corresponding to the logical address designated by the read request received. Then, the controller 4 stores the read data temporarily in the RAM 6 and transfers the read data to the host 2.

The controller 4 may also function as a flash translation layer (FTL) configured to manage the data of the NAND flash memory 5 and manage the blocks of the NAND flash memory 5.

The data management includes, for example, (1) management of mapping data indicating the correspondence relationship between each of the logical addresses and each of the physical addresses, and (2) processing for hiding constraint (for example, read/write operation executed in units of pages, and erase operation executed in units of blocks) of the NAND flash memory 5. In this embodiment, management of mapping between the logical addresses and physical addresses is executed using the multi-level mapping table 8 for logical-to-physical address translation.

A physical address corresponding to a logical address indicates the physical storage location in the NAND flash memory 5, where the data corresponding to the logical address is actually written.

Note that data can be written to a page only one time per one erase cycle. Therefore, the controller 4 writes update data corresponding to a logical address, not to a physical storage location where previous data corresponding to the logical address is stored, but to other physical storage location. Then, the controller 4 updates the multi-level mapping table 8, and associates the physical address indicating the other physical storage location with this logical address.

Figure 3:
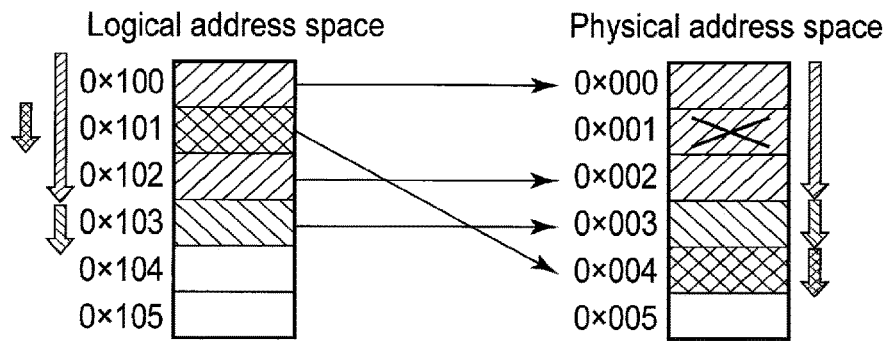
FIG. 3 is a diagram illustrating a write operation executed in the memory system of the first embodiment.

Let us now assume, as shown in FIG. 3, the case where the following three writing operations are executed:
(1) Write data of 12 KiB to the logical address 0x100;
(2) Write data of 4 KiB to the logical address 0x103; and
(3) Write (overwrite) data of 4 KiB to the logical address 0x101.

In the write operation (1), the controller 4 writes data of 12 KiB to, for example, a physical storage location of the NAND flash memory 5, which corresponds to the physical addresses 0x000 to 0x002.

In the write operation (2), the controller 4 writes data of 4 KiB to, for example, a physical storage location of the NAND flash memory 5, which corresponds to the physical address 0x003.

In the writing operation (3), the controller 4 writes data of 4 KiB not to the physical address 0x001, but to, for example, a physical storage location in the NAND flash memory 5, which corresponds to the physical address 0x004.

Figure 4:
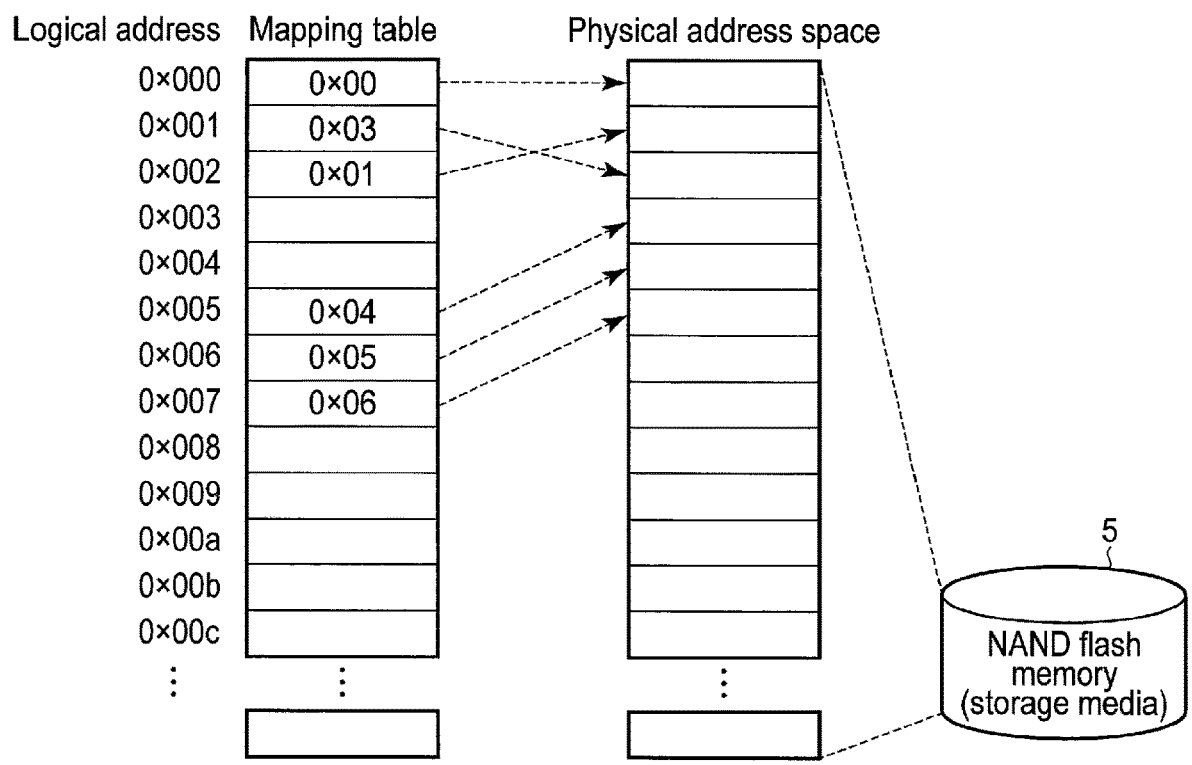
FIG. 4 is a diagram illustrating a configuration example of a mapping table.

Under these circumstances, such a mapping table is required that associates the logical addresses designated by the host 2 and the physical addresses of the NAND flash memory 5, where the data received from the host 2 are actually written. The mapping table manages the correspondence relationship (mapping information) between each of logical addresses and each of physical addresses, as shown in FIG. 4. The mapping between each logical address and each physical address is managed, for example, in units of 512 bytes or 4 KiB.

In order to be able to maintain the mapping information over the power cycles of the SSD 3, it is required to write the mapping table itself to the NAND flash memory 5.

However, it is not efficient, in terms of the performance and lifetime of the SSD 3, to write the entire mapping table the NAND flash memory 5 each time a part of the mapping table is updated.

Moreover, the mapping table is so huge as to require a large-scale RAM to be prepared for disposing the entire mapping table in the RAM 6.

Therefore, in this embodiment, the mapping table having a hierarchical structure is used to make it possible to write only the updated portion of the mapping table to the NAND flash memory 5. The multi-level mapping table 8 described above is this mapping table with the hierarchical structure.

As shown in FIG. 5, the lower-level table 81 of the multi-level mapping table 8 contains a plurality of data portions (address translation data portions) #0, #1, #2, #127, and . . . , each referred to as a segment. One segment (one address translation data portion) of the lower-level table 81 is a set of, for example, 128 continuous mapping information items. In other words, each segment of the lower-level table 81, i.e., each address translation data portion of the lower-level table 81, contains, for example, 128 physical addresses respectively corresponding to 128 logical addresses consecutive, for example, by unit of 4 KiB as the mapping information items. In the following description, the segments belonging to the lower-level table 81 are also referred to as lower-level table segments.

The upper-level table 82 of the multi-level mapping table 8 also contains a plurality of data portions (address translation data portions) #0, #1, #2, and . . . , each referred to as a segment. One segment (one address translation data portion) of the upper-level table 82 indicates, for example, 128 locations (physical storage locations) in the NAND flash memory 5, 128 continuous lower-level table segments are respectively stored. Each segment of the upper-level table 82 indicates the locations of the 128 lower-level table segments, and therefore the number of segments contained in the upper-level table 82 is 1/128 of the number of lower-level table segments. In the following descriptions, the segments of the upper-level table 82 are also referred to as upper-level table segments.

The uppermost-level table 83 of the multi-level mapping table 8 contains a plurality of pointers. These pointers indicate the locations (physical storage locations) in the NAND flash memory 5, where all of the upper-level table segments are respectively stored.

The total number of the pointers contained in the uppermost-level table 83 is the same as the number of the upper-level table segments.

Figure 6:
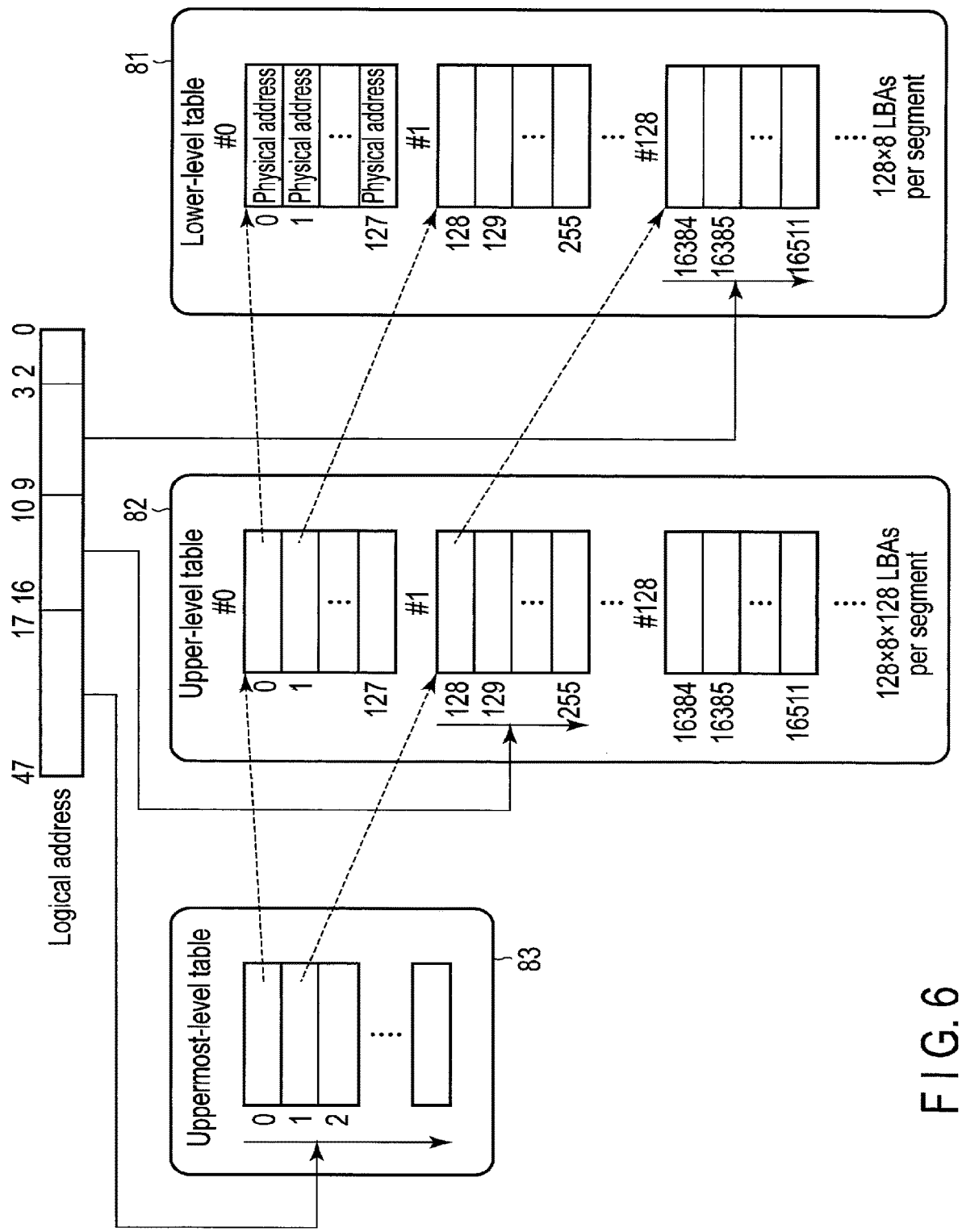
FIG. 6 is a diagram illustrating a configuration example of the multi-level mapping table of FIG. 5.

FIG. 6 illustrates a configuration example of a plurality of hierarchical tables contained in the multi-level mapping table 8.

The lower-level table 81 is a table for managing physical addresses in the NAND flash memory 5, to which the data received from the host 2 are written. The lower-level table 81 contains a plurality of segments (address translation data portion #0, address translation data portion #1, . . . , address translation data portion #128, . . . ), as described above. In other words, the lower-level table 81 is divided into these segments (address translation data portion #0, address translation data portion #1, . . . , address translation data portion #128, . . . ). The size of each address translation data portion coincides with, for example, the size of one cache line (cache entry) of the table cache 61.

As described above, the number of physical addresses contained in each segment of the lower-level table 81 is, for example, 128. A minimum unit addressed by a logical address (LBA) designated by the host 2 is 512 bytes, and in the case where correspondence between each logical address (LBA) and each physical address is managed in units of 4 KiB, the range of logical addresses covered by one segment of the lower-level table 81 is equivalent to 128×8 LBAs.

The upper-level table 82 is a table for managing the physical addresses in the NAND flash memory 5, where the respective segments of the lower-level table 81 are written. The upper-level table 82 also contains a plurality of segments (address translation data portion #0, address translation data portion #1, . . . , address translation data portion #128, . . . ), each having a size for one cache line. As described above, the number of physical addresses contained in each segment of the upper-level table 82 is, for example, 128. In this case, the range of the logical addresses covered by one segment of the upper-level table 82 is equivalent to 128×8×128 LBAs.

The physical addresses in the NAND flash memory 5, where a plurality of segments (address translation data portion #0, address translation data portion #1, . . . , address translation data portion #128, . . . ) of the upper-level table 82 are stored, are managed respectively by a plurality of pointers in the uppermost-level table 83.

The entire uppermost-level table 83 may be loaded from the NAND flash memory 5 to the RAM 6 when the SSD 3 receives power supply and is powered on, for example, and after that, the table 74 may be maintained at all times on the RAM 6.

Next, the outline of the address resolution process (logical-to-physical address translation) executed using the multi-level mapping table 8 of FIG. 6 will be described. Here, to make it easy to understand, first, the address resolution process for the case of not using the table cache 61 will be described.

First, one of the pointers in the uppermost-level table 83 is specified using an upper-level bit field in a specific logical address designated by the host 2 (for example, bit 47 to bit 17), and thus the physical address of a specific segment (the location on the NAND flash memory 5) in the upper-level table 82 can be obtained. Based on this physical address, this specific segment in the upper-level table 82 (the specific upper-level table segment) is read from the NAND flash memory 5. The specific upper-level table segment stores the physical address (the location on the NAND flash memory 5) of each of the 128 lower-level table segments belonging to the range of the logical addresses covered by this specific upper-level table segment.

Then, this specific upper-level table segment is referred to using a middle-level bit field (for example, bit 16 to bit 10) in this specific logical address and thus one entry is selected from this specific upper-level table segment. The selected entry stores the physical address (the location on NAND flash memory 5) of the specific lower-level table segment. Based on this physical address, this specific lower-level table segment is read from NAND flash memory 5.

Subsequently, this specific lower-level table segment is referred to using a lower bit field (for example, bit 9 to bit 3) in this specific logical address and thus one entry is selected from this specific lower-level table segment. The selected entry stores the physical address (the location on the NAND flash memory 5), where the user data corresponding to this specific logical address is written.

In the case where the address resolution is executed using the table cache 61, the table cache 61 is searched in the order of, for example, the lower-level table and the upper-level table. That is, first, it is determined whether or not a target lower-level table segment corresponding to a specific logical address designated by the host 2 is present in the table cache 61, based on the specific logical address. The target lower-level table segment means a lower-level table segment which covers a specific location in the logical address space designated by this specific logical address.

If the target lower-level table segment is present in the table cache 61, the target lower-level table segment is referred to using the lower bit field (for example, bit 9 to bit 3) in this specific logical address, and thus the physical address (the location on the NAND flash memory 5), where the user data corresponding to this specific logical address is stored, can be acquired.

If the target lower-level table segment is not present in the table cache 61, it is determined whether or not a target upper-level table segment corresponding to this specific logical address is present in the table cache 61, based on this specific logical address. The target upper-level table segment is an upper-level table segment whose cover range includes the logical address range covered by the target lower-level table segment. The target upper-level table segment contains mapping information including the physical address of the target lower-level table segment.

If the target upper-level table segment is present in the table cache 61, the physical address (the location on the NAND flash memory 5) where the target lower-level table segment is stored, can be acquired from the target upper-level table segment. Then, the target lower-level table segment is read from the NAND flash memory 5, and is stored in the table cache 61.

If the target upper-level table segment is not present in the table cache 61, the uppermost-level table 83 is referred based on the specific logical address, and thus the physical address of the target upper-level table segment (the location on the NAND flash memory 5) is acquired. Then, the target upper-level table segment is read from the NAND flash memory 5, and is stored in the table cache 61.

The physical address (the location on the NAND flash memory 5) where the target lower-level table segment is stored is acquired from the target upper-level table segment stored in the table cache 61. Then, the target lower-level table segment is read from NAND flash memory 5, and is stored in the table cache 61.

The physical address (the location on the NAND flash memory 5) where the user data is stored is acquired from the target lower-level table segment stored in the table cache 61, and the user data is read from the NAND flash memory 5.

Thus, in the address resolution process for the logical-to-physical address translation, the table cache 61 is searched in the order of the lower-level table and the upper-level table.

Next, the hardware configuration of the controller 4 illustrated in FIG. 1 will be described.

The controller 4 uses a part of the memory area of the RAM 6 as the table cache 61 which caches a part of the contents of the multi-level mapping table 8. All the hierarchical levels 81, i.e., the lower-level table, the upper-level table 82 and the uppermost-level table 83, each may be partially cached into the table cache 61. The following descriptions will be assumed based on the case where the lower-level table 81 and the upper-level table 82 are partially cached into the table cache 61. In this case, the uppermost-level table 83 is loaded on the RAM 6 and is not cached in the table cache 61.

The controller 4 controls the NAND flash memory 5 and the table cache 61, and executes the operation of loading the segments (address translation data portion) read from the NAND flash memory 5 into the table cache 61, the operation of replacing a segment stored in the table cache 61 with another segment, and the like. Further, the controller 4 refers to segments (here, the lower-level table segment and the upper-level table segment) corresponding respectively to the hierarchical levels stored in the table cache 61, and thus executes the address resolution process for logical-to-physical address translation and the address update process which updates the physical address corresponding to the logical address. Note that all the operations for controlling the table cache 61 may be executed by the cache controller 151 in dedicated hardware (HW) 15. In this case, the cache controller 151 may execute, in the above-described address resolution process, the process of searching the table cache 61 for the target lower-level table segment or the target upper-level table segment, the process of transferring the target lower-level table segment or the target upper-level table segment to the table cache 61 from the NAND flash memory 5 and acquiring the mapping information, and the like. Further, in the address update process, the cache controller 151 may execute the process of searching the table cache 61 for the segment to be updated, the process of updating mapping information of the segment to be updated on the table cache 61, the flushing process of writing an updated segment to the NAND flash memory 5, and the like.

As shown in FIG. 1, the controller 4 includes a host interface 11, a CPU 12, a RAM interface 13, a back end unit 14, a dedicated hardware (HW) 15, and the like. The host interface 11, the CPU 12, the RAM interface 13, the back end unit 14, and the dedicated hardware (HW) 15 are interconnected to each other via a bus 10.

The host interface 11 functions as a circuit which receives various requests such as a write request and a read request from the host 2.

The CPU 12 is a processor configured to control the operations of the host interface 11, the RAM interface 13, the back end unit 14, the dedicated hardware (NW) 15, and the like. The CPU 12 executes various processes by executing a control program (firmware: FW) stored in a ROM (not shown) or the like. The CPU 12 may execute, for example, command processes for processing various commands from the host 2, in addition to the above-described FTL process. The operations of the CPU 12 are controlled by the above-described firmware executed by the CPU 12. Note that some or all of the command processes may be executed by the dedicated hardware 15.

The RAM interface 13 functions as a control circuit which controls the RAM 6. The back end unit 14 includes an encode/decode unit 141 and a NAND interface 142. The encode/decode unit 141 can function as, for example, an error correction code (ECC) encoder and an ECC decoder. When data is to be written in the NAND flash memory 5, the encode/decode unit 141 adds an error correction code (ECC) to the data as a redundant code by encoding (ECC-encoding) the data to be written. When data is read from the NAND flash memory 5, the encode/decode unit 141 uses the ECC added to the read data and performs error correction of the data (ECC-decoding).

The NAND interface 142 functions as a NAND control circuit configured to control the NAND flash memory 5. The NAND interface 142 may be connected to a plurality of chips in the NAND flash memory 5 through a plurality of channels.

The dedicated hardware 15 includes the cache controller 151, the access history data management unit 152, and the priority adjustment unit 153. Note that the cache controller 151, the access history data management unit 152 and the priority adjustment unit 153 may not necessarily be realized by hardware, but any one of the cache controller 151, the access history information management unit 152 and the priority adjustment units 153, or all of the cache controller 151, the access history information management unit 152 and the priority adjustment units 153 may be realized by firmware executed by the CPU 12.

The cache controller 151 searches the table cache 61 for a segment (address translation data portion) including the mapping information to be accessed, which should be referred to or updated, and determines whether or not the segment including the mapping information to be accessed is present in the table cache 61. Further, the cache controller 151 transfers segments between the table cache 61 and the NAND flash memory 5.

The cache controller 151 is configured to execute, when the degree of bias of reference with respect to the upper-level table segment stored in the table cache 61 is weak, the operation of preferentially caching each upper-level table segment into the table cache 61, over each lower-level table segment.

For example, in the case where the host 2 accesses a wide logical address range which ranges over a number of upper-level table segments at random (wide-range access), a number of upper-level table segments on the table cache 61 are referred to. In this case, the lower-level table segments on the table cache 61 are hardly hit. This is because the logical address range covered by each lower-level table segment is narrow. On the other hand, in the case where the host 2 accesses only the logical address range covered by one specific upper-level table segment (narrow-range access), or the case where it accesses alternately logical address ranges covered by specific several upper-level table segments (narrow-range access), each of a limited number of upper-level table segments on the table cache 61 is referred to at a relatively high frequency.

That is, when the host 2 performs narrow-range access, the degree of bias of reference with respect to the upper-level table segment on the table cache 61 becomes strong.

On the other hand, when the host 2 performs wide-range access, access destinations are dispersed to a number of upper-level table segments. Thus, the degree of bias of reference with respect to the upper-level table segment on the table cache 61 becomes weak.

Therefore, in this embodiment, in the case where each of the segments corresponding to a plurality of hierarchical levels is cached in the table cache 61, the priority is set for each hierarchical level, on the basis of a degree of bias of reference for each hierarchical level, the degree of bias of reference relating to the segment corresponding to each hierarchical level stored in the table cache 61. Then, each of the segments of a hierarchical level with a high priority is preferentially cached in the table cache 61 over each of the segments of a hierarchical level which with a low priority. In this case, for example, the degree of bias of reference with respect to the segment cached is obtained for each hierarchical level. Then, based on the degree of bias of reference for each hierarchical level obtained, a priority is set for each hierarchical level.

As described above, in the case where an upper-level table segment and a lower-level table segment are cached into the table cache 61, the priority of the hierarchical level corresponding to the upper-level table 82 is set based on the degree of bias of reference with respect to the upper-level table segment stored in the table cache 61. In wide-range access, the degree of bias of reference with respect to the upper-level table segment cached becomes weak. In narrow-range access, the degree of bias of reference with respect to the upper-level table segment cached becomes strong.

That is, when the degree of bias of reference with respect to the upper-level table segment stored in the table cache 61 is weak, it is estimated that the current access tendency of the host 2 is wide-range access. Then, the priority of the hierarchical level corresponding to the upper-level table 82 is raised, and the upper-level table priority mode for preferentially caching upper-level table segments, over the lower-level table segments into the table cache 61, is enabled. Thus, it becomes possible to place more upper-level table segments necessary for the address resolution process and address update process in the wide-range access, on the table cache 61, thereby making it possible to improve the hit rate of the table cache 61.

On the other hand, when the degree of bias of reference with respect to the upper-level table segment stored in the table cache 61 is strong, it is estimated that the current access tendency of the host 2 is the narrow-range access. Then, the priority of the hierarchical level corresponding to the upper-level table 82 is lowered, and the upper-level table priority mode is disabled. Thus, it becomes possible to place more lower-level table segments necessary for the address resolution process and address update process in the narrow-range access, on the table cache 61, thereby making it possible to improve the hit rate of the table cache 61.

The access history information management unit 152 accumulates access history information necessary to estimate the access tendency of the host. In this embodiment, the value which indicates the degree of bias of reference with respect to the upper-level table segment cached is accumulated as the access history information.

The priority adjustment unit 153 determines the priority corresponding to each of the lower-level table 81 and the upper-level table 82 based on the access history information. For example, when the degree of bias of reference with respect to the upper-level table segment cached is less than a threshold value (the degree of bias of reference being weak), the priority adjustment unit 153 set high priority to the upper-level table 82, thereby enabling an upper-level table priority mode. If the degree of bias of reference with respect to the upper-level table segment cached becomes more than the threshold value (the degree of bias of reference being strong) in the state where the upper-level table priority mode is enabled, the priority adjustment unit 153 lowers the priority of the upper-level table 82, and thus the upper-level table priority mode is switched to the disabled state.

Next, the structure of the table cache 61 will be described.

The table cache 61 may be realized by a full associative cache or a set associative cache.

FIG. 7 illustrates a configuration example of the table cache 61 when realized as the full associative cache.

The table cache 61 contains a cache main body and a cache management table. The cache main body is used to partially cache both of the lower-level table 81 and the upper-level table 82 of the multi-level mapping table 8. The cache management table is used to manage the cache main body. The cache management table and the cache main body may be integrated as one or may be separated independently.

A cache main body contains a plurality of cache lines L0 to Lm−1. Each of cache lines L0 to Lm−1 is used to store a segment (128 mapping information) of the lower-level table 81 or the upper-level table 82. The size of each cache line is the same as that of one segment. Therefore, the mapping information is transmitted from the NAND flash memory 5 to the table cache 61 in units of segment. Similarly, replacement process which evicts data to be replaced from the table cache 61, to replace it with new mapping information is executed also in units of segment.

The cache management table includes entries corresponding respectively to the cache lines L0 to Lm−1. Each entry retains Tag, Type, History, and Flags as management information of the corresponding cache line.

"Tag" indicates which segment is stored in the corresponding cache line, and is used to determine whether hit or missed in the table cache 61. "Type" indicates the hierarchical level to which the segment stored in the corresponding cache line belongs (here the lower-level table/upper-level table). "History" indicates the priority rank (LRU rank) information for least recently used (LRU) policies to evict the cache line which has not been used for the longest time. Note that the replacement algorithm applicable to this embodiment is not limited only to the LRU replacement algorithm, but other various replacement algorithms. "Flags" contains various flags for managing the corresponding cache line.

For example, Flags may contain a valid flag, a lock flag, a refilling flag, a dirty flag or the like.

A valid flag indicates whether or not the corresponding cache line stores an effective (referable) segment. A lock flag indicates whether or not the corresponding cache line can possibly be evicted from the table cache 61. A refilling flag indicates whether the corresponding cache line is being refilled. A dirty flag indicates whether or not the corresponding cache line has already been updated.

When evicting a segment (address translation data portion) from the table cache 61, basically, the segment (address translation data portion) placed on the cache line of all the cache lines, which is determined as the lowest priority by the LRU replacement algorithm or the like, is selected as a replacement target.

Figure 8:
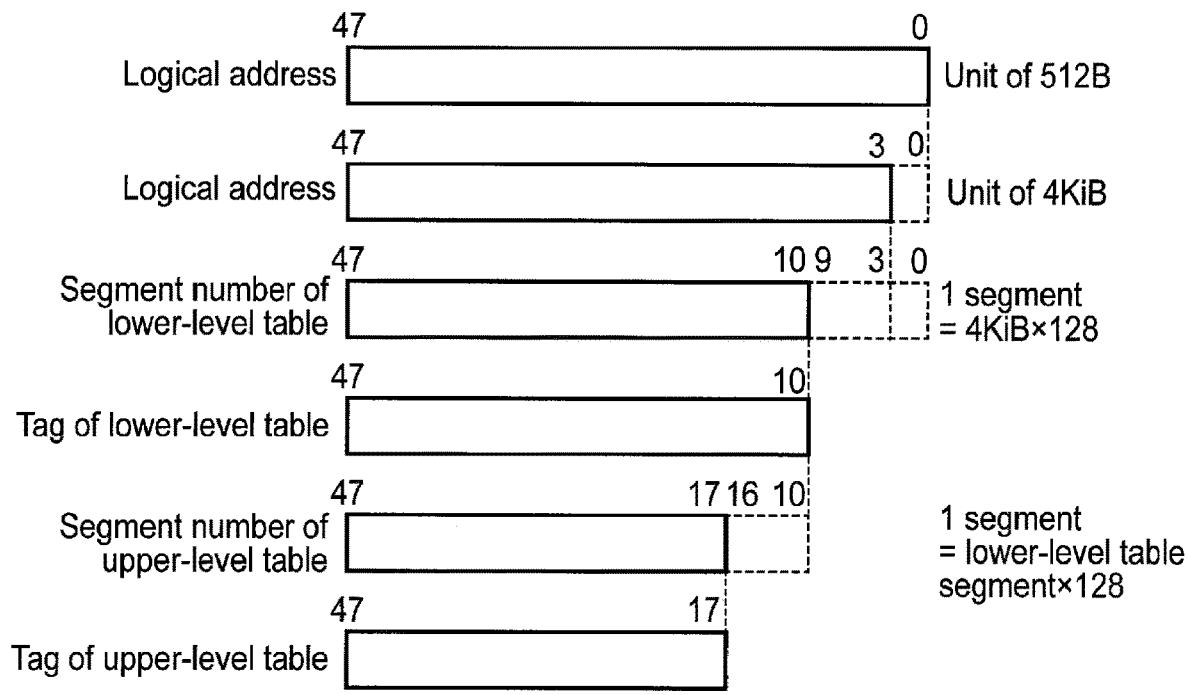
FIG. 8 is a diagram illustrating a tag field used to refer to a lower-level table in the table cache shown in FIG. 7 and a tag field used to refer to an upper-level table in the table cache of FIG. 7.

FIG. 8 illustrates a tag field used to refer to the lower-level table segment (address translation data portion) in the table cache 61 of FIG. 7, and a tag field used to refer to the upper-level table segment in the table cache 61 of FIG. 7.

The following descriptions will be provided based on the assumption that the minimum unit addressed by the logical address (LBA) designated by the host 2 is 512 bytes, and the correspondence between each logical address and each physical address is managed in units of 4 KiB.

The lower three bits (bit 2 to bit 0) of the logical address (LBA) designated by the host 2 is used as offset within 4 KiB.

Bit 9 to bit 3 of the logical address (LBA) are used to specify one of the 128 mapping information pieces in each lower-level table segment.

Bit 47 to bit 10 of the logical address (LEA) express the segment number for a lower-level table. The segment numbers for lower-level tables are consecutive numbers assigned to address ranges from the leading one, which are obtained by dividing the logical address space expressed by bit 47 to bit 3 of the logical address (LBA) in units of "logical address range covered by a lower-level table segment". That is, the logical address space is managed by a plurality of lower-level table segments. Sequential numbers assigned to the lower-level table segments are segment numbers for the lower-level tables. Bit 47 to bit 10 of the logical address (LBA) express the segment number of a certain lower-level table segment. Bit 47 to bit 10 of the logical address (LBA) are used as a tag field for searching for the target lower-level table segment from the table cache 61 of FIG. 7.

Bit 16 to bit 10 of the logical address (LBA) are used to specify one of the 128 mapping information items in each upper-level table segment.

Bit 47 to bit 11 of the logical address (LBA) express the segment numbers for upper-level tables. The segment numbers for upper-level tables are consecutive numbers assigned to logical address ranges from the leading one, which are obtained by dividing the logical address space expressed by bit 47 to bit 3 of the logical address (LBA) in units of "address range covered by an upper-level table segment". Bit 47 to bit 17 of a logical address (LBA) express the segment number of a certain upper-level table segment. Bit 47 to bit 17 of the logical address (LBA) are used as a tag field for searching for the target upper-level table segment from the table cache 61 of FIG. 7.

Figure 9:
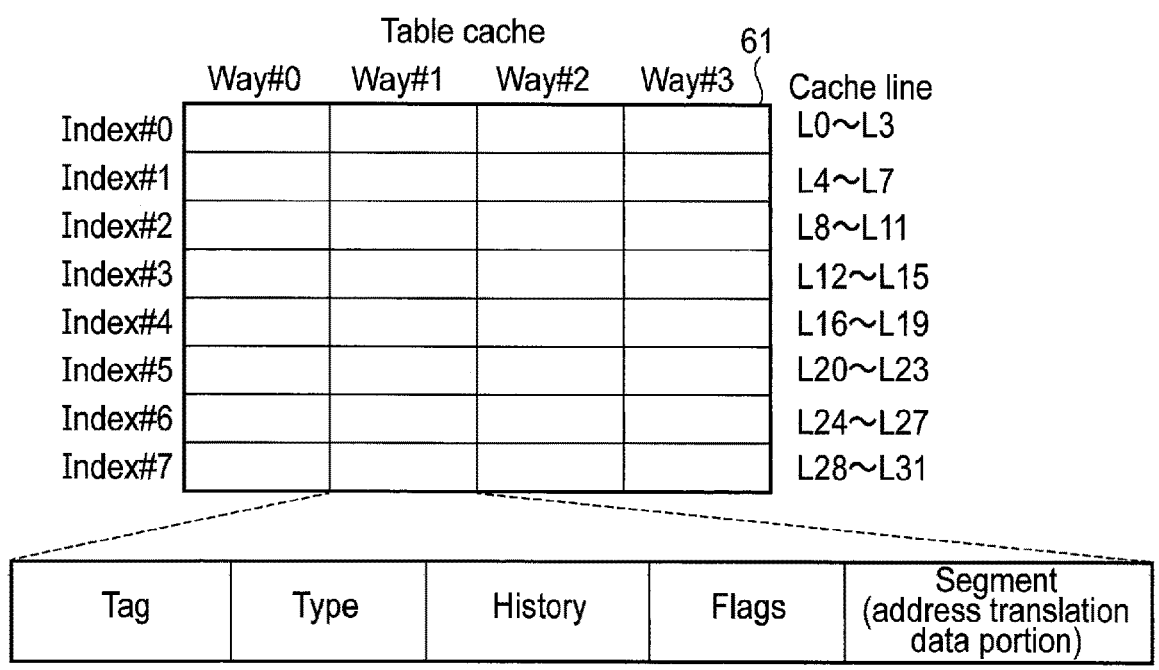
FIG. 9 is a diagram illustrating another configuration example of the table cache which stores a part of the multi-level mapping table in the memory system of the first embodiment.

FIG. 9 illustrates a configuration example of the table cache 61 when realized as set associative cache.

FIG. 9 illustrates the case where the table cache 61 is a 4-way set associative cache including eight indexes (Index #0 to Index #7). In each index, the four ways each retain Tag, Type, History, and Flags. Each of the four ways further stores an actual segment (128 mapping information). One index is equivalent to four cache lines. Note in the structure of the table cache 61 of FIG. 9 as well, the cache management table and cache main body may be managed separately.

When evicting a segment of the table cache 61, the segment placed on the way determined as the lowest priority by the LRU replacement algorithm or the like, of the four ways corresponding to one index to be selected as a replacement candidate is selected as replacement target data.

Figure 10:
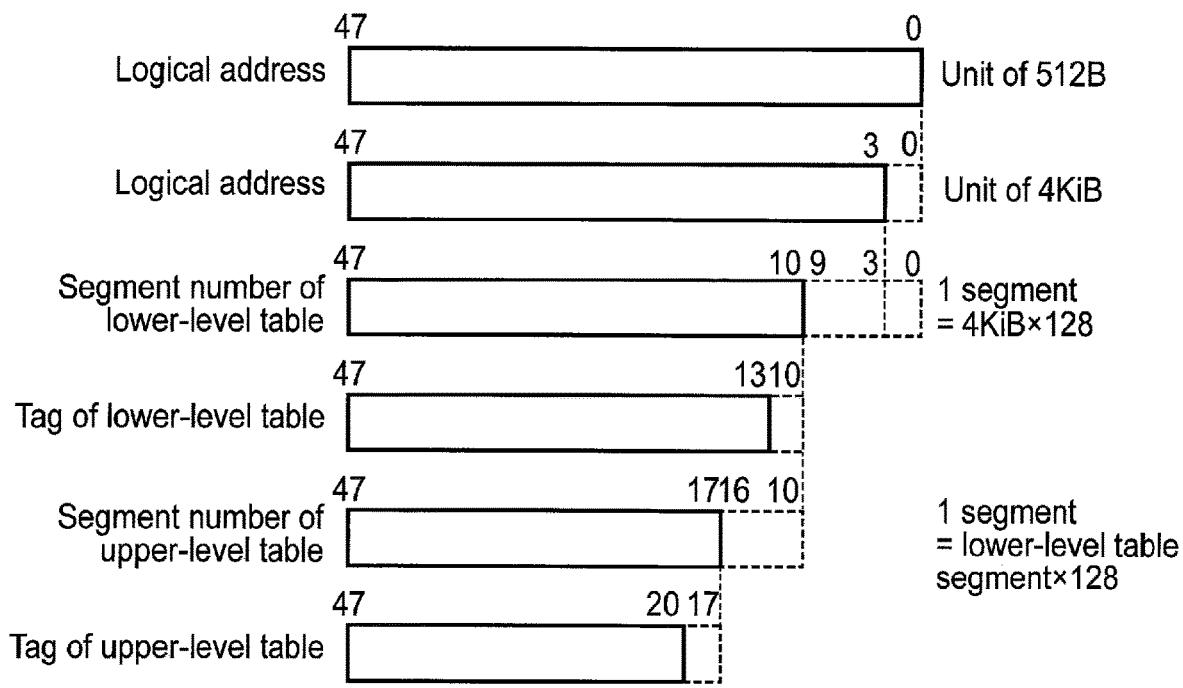
FIG. 10 is a diagram illustrating a tag field used to search mapping information of a lower-level table in the table cache illustrated in FIG. 9, and a tag field used to search mapping information of an upper-level table in the table cache illustrated in FIG. 9.

FIG. 10 illustrates a tag field used to refer to the lower-level table segment in the table cache 61 of FIG. 9, and a tag field used to refer to the upper-level table segment in the table cache 61 of FIG. 9.

Bit 47 to bit 10 of a logical address (LBA) express the segment number for a lower-level table. The lower three bits of bit 47 to bit 10 (that is, bit 12 to bit 10) are used to select one of the eight indexes, and bit 47 to bit 13 of the logical address (LBA) are used as a tag field for searching for the target lower-level table segment from the table cache 61 of FIG. 9.

Bit 47 to bit 17 of the logical address (LBA) express the segment number for an upper-level table. The lower three bits of bit 47 to bit 17 (that is, bit 19 to bit 17) are used to select one of the eight indexes, and bit 47 to bit 20 of the logical address (LBA) are used as a tag field for searching for the target upper-level table segment from the table cache 61 of FIG. 9.

Next, how to use the table cache 61 will be described.

The following descriptions will be provided based on the assumption that the table cache 61 is a 4-way set associative cache.

When carrying out, for example, address resolution, address update or flag operation, the cache controller 151 searches the table cache 61.

For example, when a read request is received from the host 2, the cache controller 151 executes the address resolution process for acquiring a physical address corresponding to a logical address designated by the read request received from the host 2. In this case, the cache controller 151 searches the table cache 61 for a segment (address translation data portion) containing the mapping information corresponding to the logical address designated by the read request received from the host 2.

When a write request is received from the host 2, the controller 4 writes write data received from the host 2 in the NAND flash memory 5. The cache controller 151 executes the address update process for updating the target mapping information so as to map the physical address to which the write data is actually written to the logical address designated by the write request. In this case as well, the controller 4 searches the table cache 61 for an address translation data portion containing the target mapping information in order to update the mapping information.

In the address resolution process, the table cache 61 is searched in the order of, for example, the lower-level table segment and the upper-level table segment.

When searching a segment of the lower-level table, the cache controller 151 executes the following operations.

First, the cache controller 151 computes Index and the Tag field from the logical address designated by the host 2.

In this case, Index is obtained by the following formula.

Index=[segment number of lower-level table] mod [the number of Indexes]

The Tag field is obtained by the following formula.

Tag field=[segment number of lower-level table]/[the number of Indexes]

The cache controller 151 searches for a way of the four ways belonging to the obtained Index, which stores the tag which coincides with the value of the Tag field obtained. When the valid flag of this searched way is set and Type of the searched segment coincides with the table type of the segment to be search (here, the lower-level table), it is determined as a cache hit.

When searching a segment of the upper-level table, the cache controller 151 executes the following operations.

First, the cache controller 151 computes Index and the Tag field from the logical address designated by the host 2.

In this case, Index is obtained by the following formula.

Index=[the segment number of upper-level table] mod [the number of Indexes]

The Tag field is obtained by the following formula.

Tag field=[the segment number of upper-level table]/ [the number of Indexes]

The cache controller 151 searches the way of the four ways belonging to the obtained Index, which stores the tag which coincides the value of the Tag field. If the valid flag of the searched way is set, and Type of this searched way coincides the table type of the target segment (here, upper-level table), it is determined as a cache hit.

Figure 11:
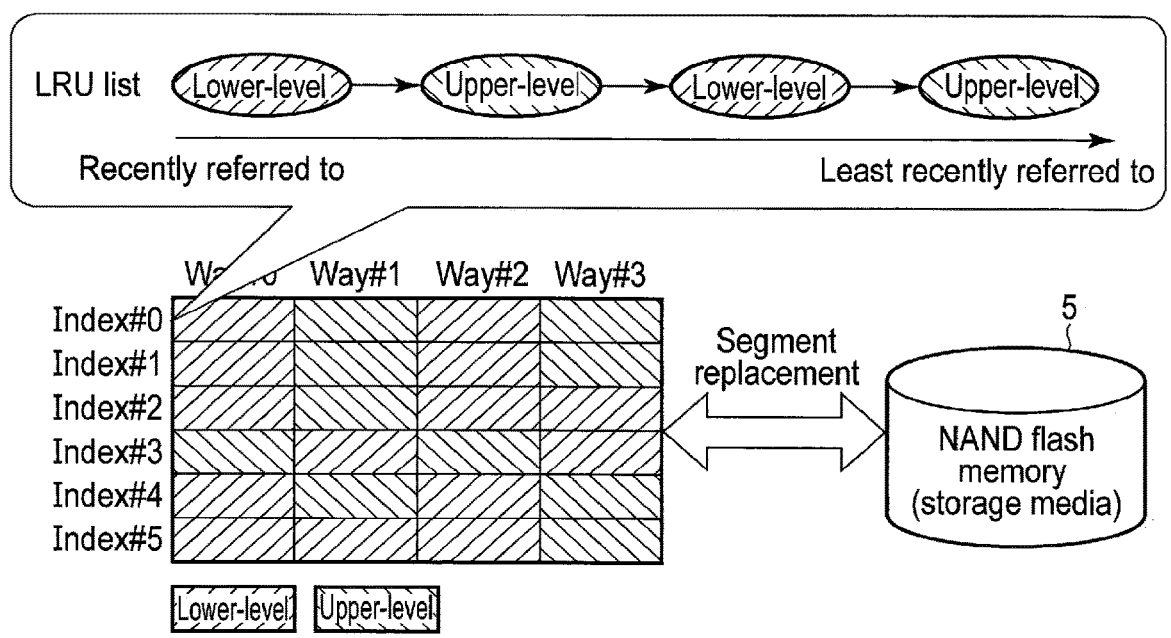
FIG. 11 is a diagram illustrating an example of replacement operation applied to the table cache.

FIG. 11 illustrates an example of the replacement operation applied to the table cache 61.

The following descriptions are based on the assumption that the table cache 61 is a 4-way set associative cache. As described above, usually, the replacement target data is selected by the LRU replacement algorithm or the like. In this case, the segment placed on the way determined as the lowest priority is selected as the replacement target data. FIG. 11 is based on the assumption that one of the four segments stored in four ways of index #0 is evicted from the table cache 61. When the LRU replacement algorithm is used, the segment stored in the way, of the four segments stored in the four ways, which has not been recently referred to is evicted. That is, the way with the longest time interval since the last access is replaced with a new segment read from the NAND flash memory 5.

FIG. 12 illustrates the range of logical addresses covered by each hierarchical level (the lower-level table segment, the upper-level table segment and the uppermost-level table segment) of the multi-level mapping table 8, and the number of times that the memory medium (the NAND flash memory 5) is accessed when the cache hit of each hierarchical level occurs. Here, the number of times of access shown in FIG. 12 expresses an ideal number thereof.

For example, when the mapping information manages correspondence between logical addresses and physical addresses for every 4 KiB and each lower-level table segment includes 128 mapping information items, the range of the logical addresses covered by a lower-level table segment, that is, one address translation data portion of the lower-level table 81, is 512 KiB (=4 KiB×128). If the target lower-level table segment is present in the table cache 61 (a lower-level table hit), the cache controller 151 can acquire the mapping information in the target lower-level table segment from the table cache 61, and therefore there is no need to read the target lower-level table segment from the NAND flash memory 5. Thus, the controller 4 can read the user data immediately from the NAND flash memory 5 using the mapping information (physical address) acquired from the target lower-level table segment in the table cache 61 by the cache controller 151. The number of times that the NAND flash memory 5 is accessed is only one. This one access is for reading user data from the NAND flash memory 5.

For example, when the range of logical addresses covered by each lower-level table segment is 512 KiB and each upper-level table segment includes 128 mapping information items, the range of logical addresses covered by an upper-level table segment, that is, one address translation data portion of the upper-level table 82 is 64 MiB (=512 KiB×128). If the target lower-level table segment is not present in the table cache 61 (a lower-level table miss) and the target upper-level table segment is present in the table cache 61 (an upper-level table hit), the cache controller 151 can acquire the mapping information in the target upper-level table segment from the table cache 61, there is no need to read the target upper-level table segment from the NAND flash memory 5. Therefore, the cache controller 151 transfers the target lower-level table segment from the NAND flash memory 5 to the table cache 61 using the mapping information (physical address) acquired from the target upper-level table segment in the table cache 61, and acquires the mapping information from the target lower-level table segment transferred to the table cache 61. Thus, the controller 4 can read the user data from the NAND flash memory 5 using the mapping information (physical address) acquired from the target lower-level table segment by the cache controller 151. Therefore, the number of times that the NAND flash memory 5 is accessed is two. These two accesses include one access for reading a mapping table (here, the lower-level table segment) from the NAND flash memory 5, and one access for reading the user data from the NAND flash memory 5.

All the pointers of the uppermost-level table 83 are present on the RAM 6. Therefore, the uppermost-level table 83 covers the entire logical address space. If the target lower-level table segment is not present in the table cache 61 (a lower-level table miss) and the target upper-level table segment is not present either in the table cache 61 (an upper-level table miss), the cache controller 151 acquires the physical address of the target upper-level table segment from the uppermost-level table 83, and transfers the target upper-level table segment from the NAND flash memory 5 to the table cache 61 using the physical address acquired. Subsequently, the cache controller 151 transfers the target lower-level table segment from the NAND flash memory 5 to the table cache 61 using the physical address acquired from the target upper-level table segment, and acquires the mapping information from the target lower-level table segment transferred to the table cache 61. Then, the controller 4 reads the user data from the NAND flash memory 5 using the mapping information (physical address) acquired from the target lower-level table segment by the cache controller 151. Therefore, the number of times that the NAND flash memory 5 is accessed is three. These three accesses include two accesses for reading mapping tables (here, the upper-level table segment and the lower-level table segment) from the NAND flash memory 5, and one access for reading user data from the NAND flash memory 5.

Depending on the access tendency of the host 2, the hierarchical level to be cached to the table cache 61 varies.

Therefore, in this embodiment, the following cache control is executed.

In the narrow-range access, the cache controller 151 operates to cache many lower-level table segments, thereby making the average number of times of access to the NAND flash memory 5 approximately substantially one.

In the wide-range access, the cache controller 151 operates to cache many upper-level table segments, thereby making the average number of times of access to the NAND flash memory 5 approximately two. When the access range is excessively wide (super-wide area access), the average number of times of access to the NAND flash memory 5 is three. The logical address range covered by each lower-level table segment is narrow, and therefore, even if many lower-level table segments are cached in the wide-range access, a lower-level table hit does not substantially occur. Thus, in the wide-range access, it is preferable to cache more upper-level table segments each of which can cover the wide logical address range.

However, when the target lower-level table segment is not present in the table cache 61 and the specific upper-level table segment corresponding to the target lower-level table segment is not present in the table cache 61, it is necessary to cache these segments into the table cache 61 in the order of the specific upper-level table segment and the target lower-level table segment. Therefore, in the wide-range access, as shown in FIG. 13, the upper-level table segment and the lower-level table segment are cached alternately by the table cache 61. For this reason, both of the upper-level table segments and lower-level table segments are placed on the table cache 61 at substantially an equal ratio, and the ratio of the upper-level table segment to be cached by the table cache 61 is limited to about 50%.

FIG. 14 illustrates an example of a typical narrow-range access.

FIG. 14 illustrates the case on the assumption that only the logical address range covered by segment #0 of an upper-level table 82 is accessed by the host 2. In this case, regardless of whichever a lower-level table segment of the 128 lower-level table segments belonging to this logical address range needs to be referred to or updated, the upper-level table segment required to cache this lower-level table segment is only segment #0 of the upper-level table 82. For this reason, a bias of reference with respect to the upper-level table segment occurs.

Therefore, after segment #0 of the upper-level table 82 is cached in the table cache 61, only the segment #0 of the upper-level table 82 stored in the table cache 61 is referred to frequently, and other upper-level table segments stored in the table cache 61 are rarely referred to. That is, in the narrow-range access, a bias of reference with respect to the upper-level table segment cached occurs (the degree of bias of reference becomes strong).

Figure 15:
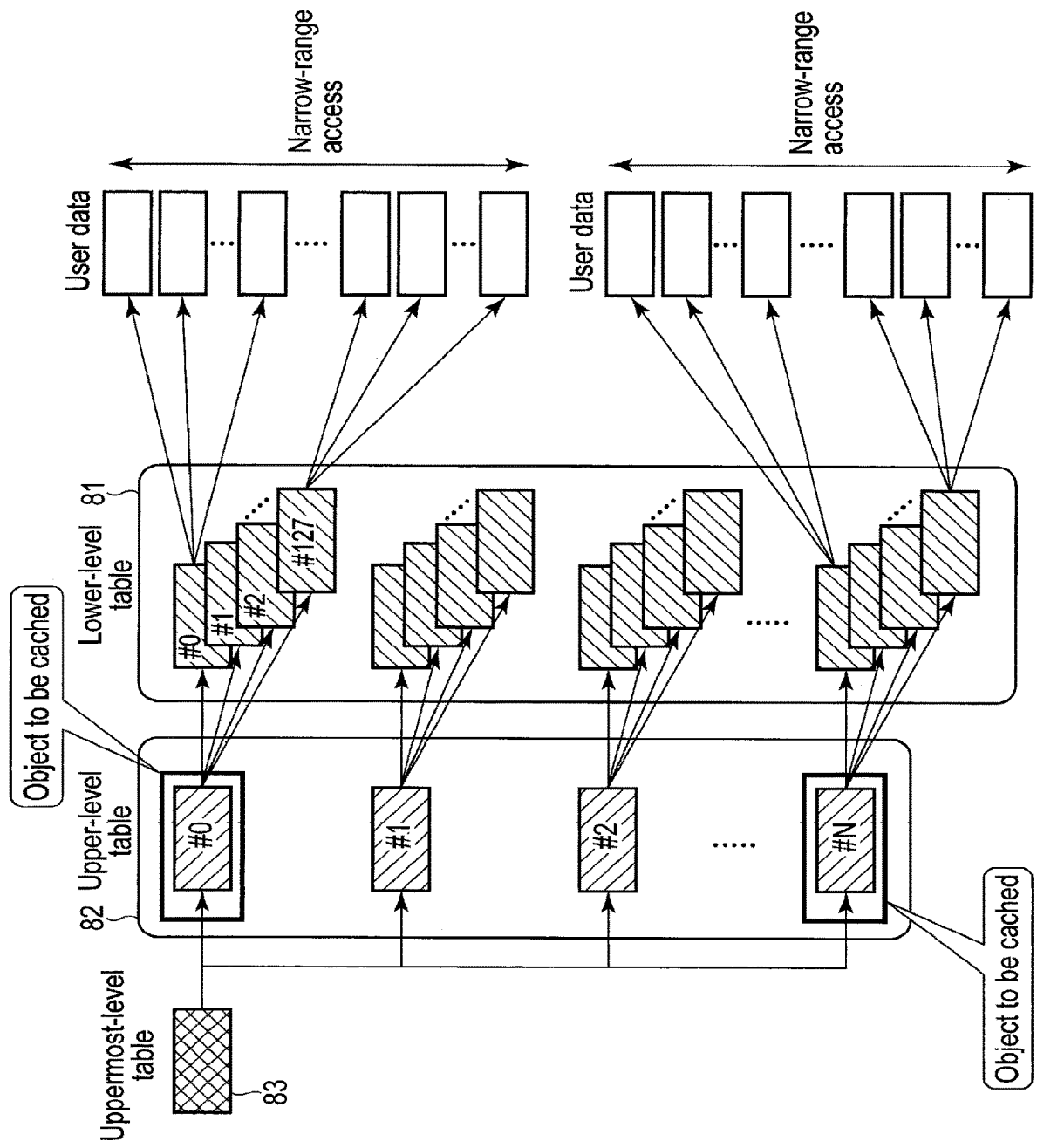
FIG. 15 is a diagram illustrating a case where a narrow logical address range covered by one upper-level table segment and a narrow logical address range covered by another upper-level table segment are accessed by the host (narrow-range access).

FIG. 15 illustrates another example of the typical narrow-range access.

FIG. 15 illustrates the case on the assumption that the logical address range covered by segment #0 of the upper-level table 82 and the logical address range covered by segment #N of the upper-level table 82 are accessed alternately by the host 2. In this case, after segment #0 of the upper-level table 82 and segment #N of the upper-level table 82 are cached in the table cache 61, only the segment #0 of these upper-level table 82 and the segment #N of the upper-level table 82 are referred to frequently, and other upper-level table segments stored in the table cache 61 are rarely referred to. In this case as well, a bias of reference with respect to the upper-level table segment cached occurs (the degree of bias of reference becomes strong).

Figure 16:
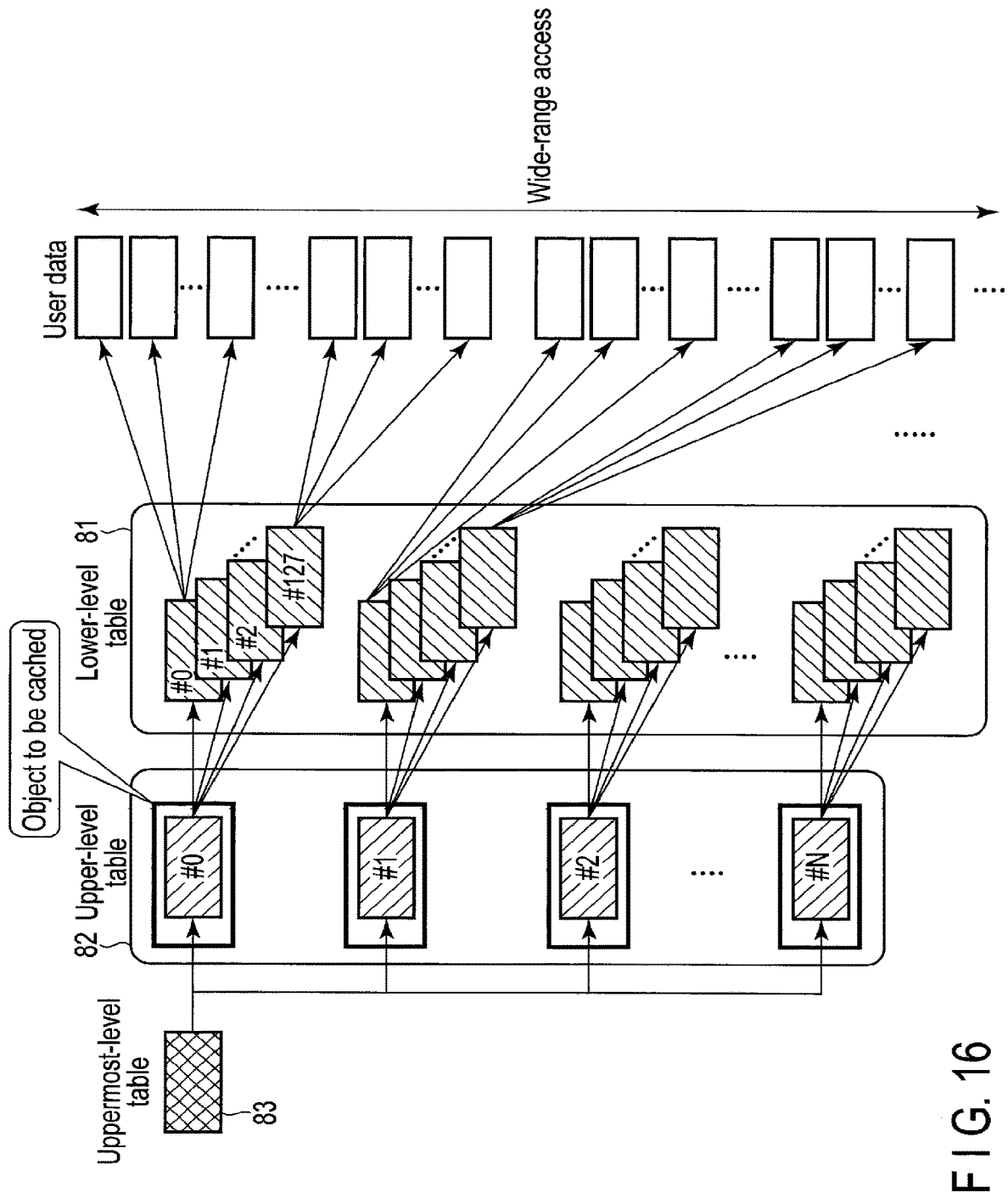
FIG. 16 is a diagram illustrating a case where a wide logical address range including a plurality of logical address ranges, which are covered by a plurality of upper-level table segments, is accessed at random by the host (wide-range access).

FIG. 16 illustrates an example of a typical wide-range access.

FIG. 16 illustrates the case on the assumption that a wide logical address range including a large number of logical address ranges covered respectively by segment #0, segment #1, segment #2, . . . , segment #N of the upper-level table 82 are accessed at random by the host 2. In this case, the access destination logical addresses accessed by the host 2 are frequently changed among a number of logical address ranges. Therefore, the target upper-level table segment is frequently switched among a plurality of different upper-level table segments, and as a result, the degree of bias of reference with respect to the upper-level table segment cached becomes weak.

FIG. 17 illustrates the ratio of the upper-level table segments and lower-level table segments, which occupy the table cache 61.

When the logical address range accessed by the host 2 is narrow, (1) the lower-level table segments are referred to more frequently than the upper-level table segments, and (2) a bias of reference with respect to the upper-level table segment cached occurs. In the narrow-range access, items (1) and (2) occur, and therefore the ratio of the upper-level table segments which occupy the table cache 61 is low, and the ratio of the lower-level table segments which occupy the table cache 61 is high.

As the logical address range accessed by the host 2 expands, the bias of reference with respect to the upper-level table segment becomes weak and further the hit rate of the lower-level table is lowered. Therefore, the ratio of the upper-level table segments which occupy the table cache 61 increases.

However, when the target lower-level table segment is not present in the table cache 61 and the specific upper-level table segment corresponding to the target lower-level table segment is not present in the table cache 61, these segments are cached in the table cache 61 in the order of the specific upper-level table segment and the target lower-level table segment. Thus, the ratio of the upper-level table segments which occupy the table cache 61 is limited to about 50%. As a result, in the wide-range access, about a half of the capacity of the table cache 61 is occupied by the lower-level table segments which are hardly hit.

In this embodiment, the priority adjustment unit 153 in the controller 4 evaluates the degree of bias of reference with respect to the upper-level table segment cached by the table cache 61, thereby estimating the current access tendency (narrow-range access/wide-range access) by the host 2. Then, when the condition that the degree of bias of reference with respect to the upper-level table segment is less than a threshold value is satisfied, the cache controller 151 executes operation for preferentially caching the upper-level table segments into the table cache 61, over the lower-level table segments. In this case, the cache controller 151 may preferentially selects each of the lower-level tables segments in the table cache 61, over each of the upper-level table segments in the table cache 61, as a candidate for replacement target.

As a result, in the wide-range access, the ratio of the upper-level table segments which occupy the table cache 61 can be increased to more than 50%, and thus more upper-level table segments can be placed in the table cache 61.

FIG. 18 illustrates an upper-level table priority (high priority) and a lower-level table priority (low priority) which are set by the priority adjustment unit 153 when the degree of bias of reference with respect to the upper-level table segment cached in the table cache 61 is less than a threshold value (in the case of the wide-range access).

The priority adjustment unit 153 determines the priority corresponding to each of the lower-level table 81 and the upper-level table 82 based on the degree of bias of reference with respect to the upper-level table segment cached in the table cache 61.

For example, when the degree of bias of reference with respect to the upper-level table segment cached in the table cache 61 is less than a threshold value, it is presumed that the current access tendency of the host 2 is wide-range access. In this case, as illustrated in FIG. 18, the priority adjustment unit 153 determines the priority corresponding to the lower-level table 81 and the priority corresponding to the upper-level table 82 as the low priority and high priority.

Here, with reference to FIG. 19 and FIG. 27, the operation for caching more upper-level table segments into the table cache 61 will be described. FIG. 19 illustrates the operation which stores more upper-level table segments in the table cache 61 by preferentially leaving each of the upper-level table segments with high priority in the table cache 61, over the lower-level table segments with low priority. FIG. 27 illustrates how the method of selecting a replacement target changes depending on the value of the upper-level table priority flag, which indicates the relationship in priority between the lower-level table 81 and the upper-level table 82.

When the lower-level table 81 and the upper-level table 82 are set to low priority and high priority, respectively, as shown in FIG. 18, the upper-level table priority mode for preferentially leaving the upper-level table segments with priority in the table cache 61 over the lower-level table segments, is enabled.

The cache replacement method is as follows.

When the priority of the upper-level table 82 is low and thus the upper-level table priority mode is disabled, the Way to be replaced is selected based on the LRU replacement algorithm or the like for each Index. In the case of the LRU replacement algorithm, the Way with the longest elapsed time since the last access is replaced.

When the priority of the upper-level table 82 rises and thus the upper-level table priority mode is enabled, the data belonging to the hierarchical level with low priority (here, the lower-level table) is preferentially selected as replacement target.

FIG. 20 illustrates the operation of dynamically adjusting the priority of each hierarchical level of the multi-level mapping table 8 according to the degree of bias of reference with respect to the upper-level table segment cached in the table cache 61.

In the case where only two types, namely, the lower-level table 81 and the upper-level table 82, are tables to be cached in the table cache 61, the setting of the priority corresponding to each of the lower-level table 81 and the upper-level table 82 can be expresses by a 1-bit flag ("upper-level table priority flag"). The upper-level table priority flag=True expresses that the priority of the upper-level table 82 is set to high priority. In the case of Upper-level table priority flag=True, the upper-level table priority mode is enabled. In the case of Upper-level table priority flag=False, the upper-level table priority mode is disabled.

The default value of the upper-level table priority flag may be False. In this case, the upper-level table priority mode is disabled and therefore the lower-level table 81 and the upper-level table 82 are equally treated. In this case, the data to be replaced may be determined based the LRU rank.

In the state of Upper-level table priority flag=False, when the logical address range accessed by the host 2 is narrow (narrow-range access) and only the upper-level tables are focused, only the specific one, specific ones or tens of upper-level table segments are referred to frequently, a bias of reference with respect to the upper-level table segment occurs. In some cases, depending on the case, the bias of reference may be occurs in hundreds of upper-level table segments. Therefore, in the narrow-range access, a bias of reference with respect to the upper-level table segment occurs. Further, the lower-level table segments are referred to more frequently than the upper-level table segments. As a result, the ratio of the upper-level table segments which occupy the table cache 61 is low, and the ratio of the lower-level table segments which occupy the table cache 61 is high.

The ratio of the upper-level table segments which occupy the table cache 61 increases gradually as the logical address range accessed by the host 2 expands.

Then, if it is estimated that the access tendency of the host 2 is wide-range access, the upper-level table priority flag is set to True (the priority of the upper-level table rises). Thus, the upper-level table priority mode is enabled. In this case, the operation of preferentially caching the upper-level table segments into the table cache 61 over the lower-level table segments, in other words, the operation of preferentially selecting the lower-level table segments over the upper-level table segments as a candidate for replacement target is executed. Thereby, it becomes possible to fill up the table cache 61 with many upper-level table segments.

After that, if the logical address range to be accessed by the host 2 is narrow, the upper-level table priority flag is changed to False (the priority of the upper-level table lowers). Thus, the upper-level table priority mode is disabled. As a result, the ratio of the lower-level table segments which occupy the table cache 61 can be raised.

Thus, in this embodiment, the cache controller 151 selectively executes, based on the degree of bias of reference of the upper-level table segment cached by the table cache 61, (i) the operation of preferentially caching each of the upper-level table segments into the table cache 61, over the lower-level table segments, and (ii) the operation of caching each of the lower-level table segments and each of the upper-level table segments into the table cache 61, without giving priority to each upper-level table segment over each lower-level table segment.

The descriptions provided here is directed to the case where the relationship in priority between the upper-level tables and lower-level tables is decided based on the degree of bias of reference with respect to the upper-level table segment cached. The degree of bias of reference with respect to the upper-level table segment cached and the degree of bias of reference with respect to the lower-level table segment cached may be evaluated, respectively, and the relationship in priority between the upper-level tables and lower-level tables may be determined.

Next, how to manage updated segments will be described.

For example, the following two methods can be considered, as the method of managing segments already updated and not yet volatilized to the NAND flash memory 5, but it is not limited to these. The first method is, as shown in FIG. 21, to manage not-yet updated segments together with updated segments in the table cache 61. The second method is, as shown in FIG. 22, to manage updated segments not by the table cache 61 but by some other data structure.

FIG. 23 illustrates the cache controller 151, the access history information management unit 152, and the priority adjustment unit 153 which are included in the controller 4.

The cache controller 151 passes an access history to the access history information management unit 152 at a predetermined timing. Moreover, the cache controller 151 issues a priority adjustment request to the priority adjustment unit 153 at a predetermined timing.

The access history information management unit 152 estimates the access tendency of the host 2 while focusing on the degree of bias of reference with respect to the upper-level table segment cached. Specifically, the access history information management unit 152 memorizes a cumulative score obtained by accumulatively adding up values (scores) corresponding to the priority ranks (for example, the LRU rank) of the segments hit by the search of the upper-level table, as the access history information. A high score may be given to an upper-level table segment of a high priority rank (an upper-level table segment of such a priority rank that is likely evicted), and a low score may be given to an upper-level table segment of a low priority rank (an upper-level table segment of such a priority rank which is likely evicted). For example, in the case where the LRU replacement algorithm is applied, a high score may be given to the LRU rank of an upper-level table segment recently referred to (a rank which is unlikely evicted), and a low score may be given to the LRU rank of the upper-level table segment of a long elapsed time since the last access (a rank which is likely evicted).

In the case where a bias of reference with respect to the upper-level table segment cached occurs and, for example, one specific upper-level table segment cached is frequently referred to, this upper-level table segment tends to be maintained easily at a priority rank which is unlikely evicted. Therefore, the cumulative score takes a high value. Moreover, also, in the case where a bias of reference with respect to the upper-level table segment cached occurs and, for example, two or three upper-level table segments cached are alternately referred to, these upper-level table segments tend to be maintained at priority ranks which are relatively unlikely evicted. Therefore, the cumulative score takes a relatively high value in this case as well.

Therefore, the cumulative score can express the degree of bias of reference with respect to the upper-level table segment cached in the table cache 61.

Note that a low score may give to an upper-level table segment of a high priority rank (an upper-level table segment of a priority rank which is unlikely evicted), and a high score may be given to an upper-level table segment of a low priority rank (an upper-level table segment of a priority rank which is likely evicted). In this case, if the degree of bias of reference with respect to the upper-level table segment cached is strong, the cumulative score takes a relatively small value.

The following descriptions are directed to the case on the assumption that a high score is given to an upper-level table segment of a high priority rank (an upper-level table segment of a priority rank which is unlikely evicted) and a low score is given to an upper-level table segment of a low priority rank (an upper-level table segment of a priority raking which is likely evicted), though not limited to this. Moreover, though not limited to this, such a case is also assumed that the LRU rank is used as a priority rank for selecting a candidate for replacement target.

When the number of times of hits of the upper-level table segments reaches a predetermined number, the priority adjustment unit 153 compares the cumulative score with a threshold value set in advance, and determines the priority of each of the lower-level table and the upper-level table according to whether or not the cumulative score is less than the threshold value. Note that the priority adjustment unit 153 may evaluate the cumulative score by comparing the cumulative score with the threshold value each time a certain time period elapses.

When the cumulative score is less than the threshold value, the priority adjustment unit 153 sets the upper-level table priority flag to True so as to set the priority rank of the lower-level table and the priority of the upper-level table to a low priority rank and a high priority rank.

Figure 24:
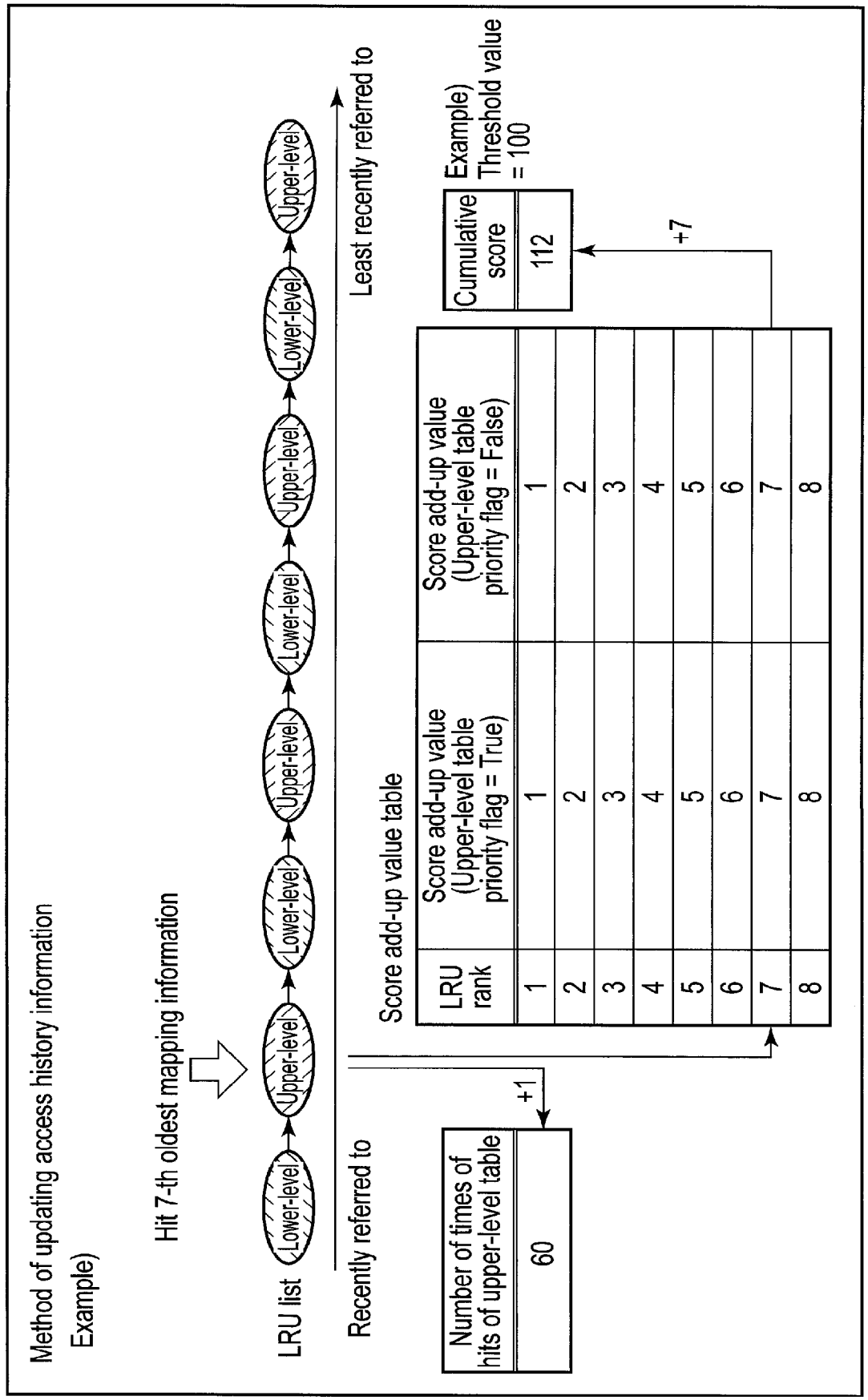
FIG. 24 is a diagram illustrating an access history information update operation executed by the access history data management unit.

FIG. 24 illustrates an access history information update operation to be executed by the cache controller 151 and the access history information management unit 152.

The cache controller 151 searches the table cache 61 for address resolution or address updating. Each time hit of an upper-level table occurs in search of the table cache 61, the cache controller 151 increments the number of times of hit of the upper-level table by +1. Then, the cache controller 151 acquires a score corresponding to the current LRU rank of the hit upper-level table segment from a score add-up value table, and passes this score to the access history information management unit 152 as an access history. The access history information management unit 152 adds the score passed from the cache controller 151 to the current cumulative score. Note that the processing of incrementing the number of times of hits of the upper-level table, and the processing of acquiring a score corresponding to an LRU rank from the score add-up value table may be executed by the access history information management unit 152.

The score add-up value table holds the scores respectively corresponding to the LRU ranks. For example, LRU rank 1 is the LRU rank which is most likely evicted, and LRU rank 8 is the LRU rank which is most unlikely evicted. For example, when the current LRU rank of the hit upper-level table segment is LRU rank 7, the score corresponding to the LRU rank 7 (here, 7) is acquired from the score add-up value table. Note that the score add-up value table may hold a score list corresponding to the case where the upper-level table priority flag is False, and a score list corresponding to the case where the upper-level table priority flag is True.

When the current upper-level table priority flag is False, the cache controller 151 or the access history information management unit 152 acquires the score corresponding to the current LRU rank of the hit upper-level table segment from the score list corresponding to the case where the upper-level table priority flag is False. On the other hand, when the current upper-level table priority flag is True, the cache controller 151 or the access history information management unit 152 acquires the score corresponding to the current LRU rank of the hit upper-level table segment from the score list corresponding to the case where the upper-level table priority flag is True.

Figures 25, 26:
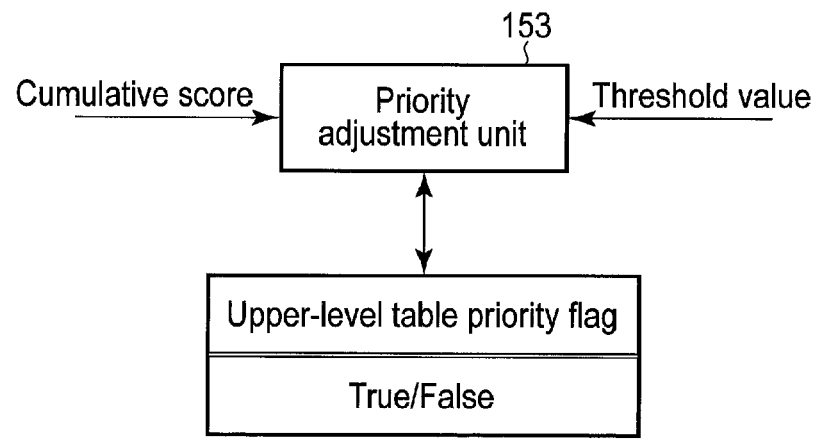
FIG. 25 is a diagram illustrating an upper-level table priority flag setting operation executed by the priority adjustment unit.
FIG. 26 is a diagram illustrating an example of the priority set to the table of each of a plurality of hierarchical levels to be stored in the table cache when the multi-level mapping table contains more tables corresponding to more hierarchical levels.

FIG. 25 illustrates an upper-level table priority flag setting operation executed by the priority adjustment unit 153.

The priority adjustment unit 153 executes a priority change process, for example, when the number of times of hit of upper-level table exceeds a predetermined number. In the priority change process, the priority adjustment unit 153 compares the cumulative score with the threshold value. If the cumulative score is less than the threshold value, the priority adjustment unit 153 raises the priority of the upper-level table and sets the upper-level table priority flag to True. If the cumulative score is higher than or equal to the threshold value, the priority adjustment unit 153 lowers the priority of the upper-level table, and sets the upper-level table priority flag to False.

Each time the priority change process is executed, the access history information management unit 152 resets the number of times of hits of upper-level table and the cumulative score to initial values.

FIG. 26 illustrates an example of the respective priority set to each respective one of these hierarchical levels when the multi-level mapping table 8 includes more tables corresponding to more hierarchical levels.

In this embodiment, the number of tables included in the multi-level mapping table 8 may be four or more. For example, the number of tables included in the multi-level mapping table 8 may include ten tables corresponding to ten hierarchical levels which execute ten stages of address translation. FIG. 26 illustrates an example of the case where three types of table segments corresponding to hierarchical level 1, hierarchical level 2 and hierarchical level 3 are cached. In this case, the multi-level mapping table 8 may further include the uppermost-level table in addition to the tables of the hierarchical level 1, the hierarchical level 2, and the hierarchical level 3.

The table of the hierarchical level 3 is a table for managing the physical addresses in the NAND flash memory 5 in which the data received from the host 2 are written. The table of the hierarchical level 2 is a table for managing the physical addresses in the NAND flash memory 5 in which the table segments of the hierarchical level 3 are written. The table of the hierarchical level 1 is a table for managing the physical address in the NAND flash memory 5 in which the table segments of the hierarchical level 2 are written. The uppermost-level table is a table for managing the physical addresses in the NAND flash memory 5 in which the table segments of the hierarchical level 1 are written. The following descriptions are based on the case on the assumption that the table of the hierarchical level 1, the table of the hierarchical level 2 and the table of the hierarchical level 3 are cached in the table cache 61.

Priority rank3 may indicate the highest priority, priority rank2 may indicate a middle priority, and priority rank1 may indicate the lowest priority. In this case, the cache controller 151 executes the operation of preferentially caching the table segments of the hierarchical level 1 into the table cache 61 over the table segments of the hierarchical level 2 and the table segments of the hierarchical level 3. Then, the cache controller 151 executes the operation of preferentially caching the table segments of the hierarchical level 2 into the table cache 61 over the table segments of the hierarchical level 3.

In the processing of setting the priority of each of the hierarchical levels 1, 2, and 3, the controller 4 may obtain, for example, the degree of bias of reference with respect to the table segment of the hierarchical level 1 cached, the degree of bias of reference with respect to the table segment of the hierarchical level 2 cached and the degree of bias of reference with respect the table segment of the hierarchical level 3 cached, and set the priority for each hierarchical level. In this case, the access history information management unit 152 of the controller 4 calculates, for example, a cumulative score indicating the degree of bias of reference with respect to the table segment of the hierarchical level 1 cached, a cumulative score indicating the degree of bias of reference with respect to the table segment of the hierarchical level 2 cached and a cumulative score indicating the degree of bias of reference with respect to the table segment of the hierarchical level 1 cached. The priority adjustment unit 153 of the controller 4 determines a priority of the table of the hierarchical level 1, a priority of the table of the hierarchical level 2, and a priority of the table of the hierarchical level 3 based on the cumulative scores.

Or the access history information management unit 152 may calculate, for example, the cumulative score indicating the degree of bias of reference with respect to the table segment of the hierarchical level 1 cached, the cumulative score indicating the degree of bias of reference with respect to the table segment of the hierarchical level 2 cached, and the priority adjustment unit 153 may determine the priority of the tables of each of the hierarchical level 1, the hierarchical level 2, and the hierarchical level 3 based on the cumulative scores of the hierarchical levels 1 and 2.

FIG. 27 is a diagram illustrating how the method of selecting a replacement target changes depending on the upper-level table priority flag. Here, an example is provided in connection with the case where a replacement target (an object to be replaced) is selected from four ways corresponding to a certain index of a set associative cache.

As shown in the upper portion of FIG. 27, when the upper-level table priority flag is False, the cache controller 151 equally selects the lower-level table segments and the upper-level table segments based on the LRU replacement algorithm or the like as candidates of the replacement target.

On the other hand, as shown in the lower portion of FIG. 27, when the upper-level table priority flag is True, the cache controller 151 excepts the upper-level table segments from the candidates of the replacement target, and selects the replacement target (an object segment to be replaced) from the lower-level table segments. Note that when no lower-level table segment selectable as a candidate of the replacement target is present, the upper-level table segment judged as of the lowest priority by the LRU replacement algorithm or the like is selected as the replacement target.

Next, the procedures of the following four processes will be described.

(1) Address Resolution Process

The address resolution process is a process of acquiring a physical address corresponding to a logical address designated by the host 2.

(2) Refill Process

The refill process is a process of placing mapping information necessary for address resolution or mapping information to be updated on the table cache 61.

(3) Address Update Process

The address update process is a process of updating mapping information of a lower-level table segment, mapping information of an upper-level table segment, or mapping information of the uppermost-level table segment. When the data corresponding to the logical address designated by the write request from the host 2 is written to the NAND flash memory 5, the mapping information of the lower-level table segment corresponding to the logical address is an object to be updated.

When a lower-level table segment updated on the table cache 61 is written to the NAND flash memory 5, the mapping information of a specific upper-level table segment which manages the physical address of this lower-level table segment is an object to be updated.

When an upper-level table segment updated on the table cache 61 is written to the NAND flash memory 5, the mapping information of the uppermost-level table manages the physical address of this upper-level table segment is an object to be updated.

(4) Flush Process

The flush process is a process of writing the mapping information updated on the table cache 61 to a storage media (the NAND flash memory 5).

Figure 28:
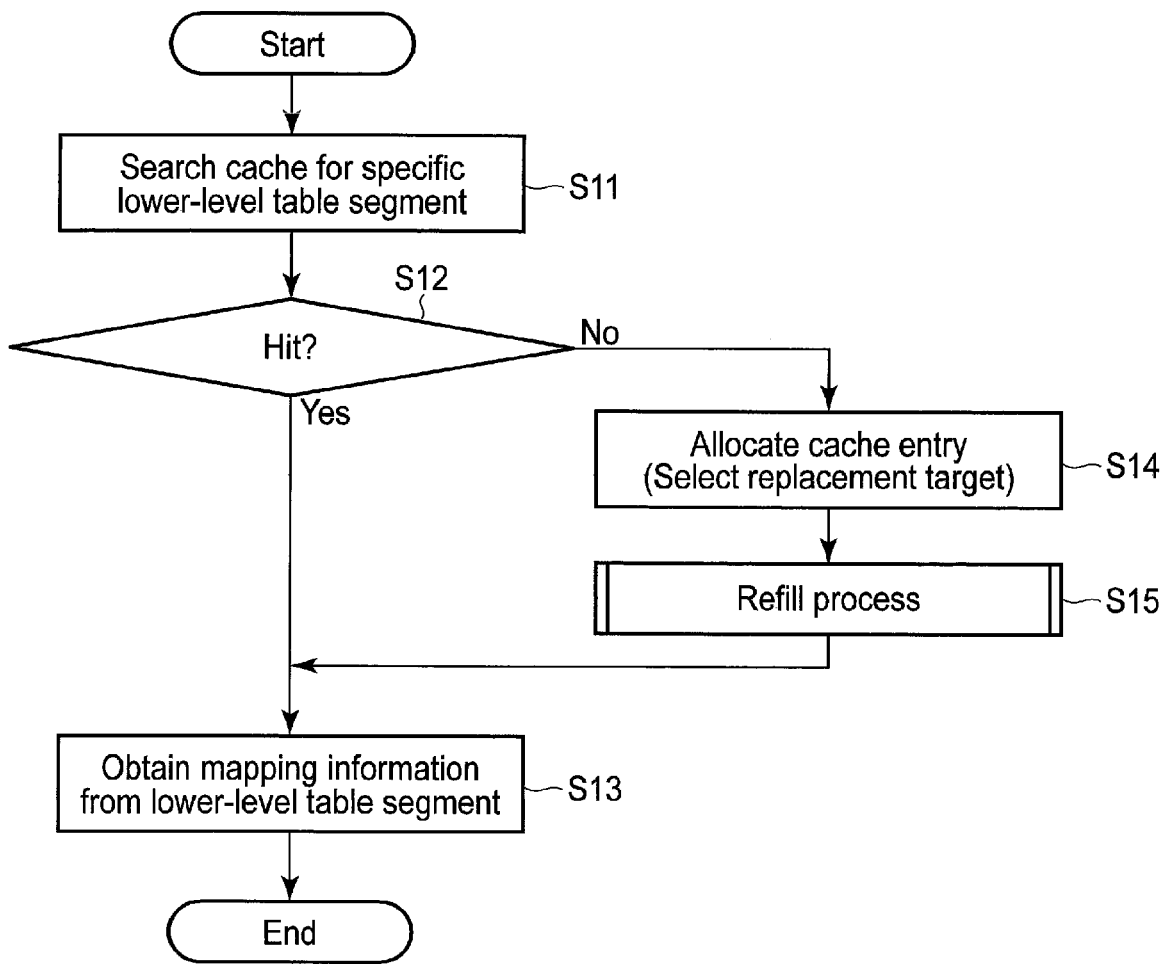
FIG. 28 is a flowchart illustrating a procedure of an address resolution process executed by the memory system of the first embodiment.

The flowchart of FIG. 28 illustrates the procedure of the address resolution process. In the address resolution process, the cache controller 151 searches the table cache 61, for example, in the order of the lower-level table segment and the upper-level table segment.

The cache controller 151 searches the table cache 61 for a specific lower-level table segment containing the physical address corresponding to the logical address designated by the host 2 (Step S11).

When the specific lower-level table segment is present in the table cache 61 (*hit*) (Yes in Step S12), the cache controller 151 acquires mapping information from this specific lower-level table segment (address translation data portion) (Step S13). This mapping information includes the physical address corresponding to the logical address designated by the host 2.

When this specific lower-level table segment is not present in the table cache 61 (No in Step S12), the cache controller 151 allocates a cache entry (cache line) for storing this specific lower-level table segment (Step S14). In Step S14, when the usable cache entry (cache line) is not present, the process of selecting a replacement target cache entry (replacement target cache line) is executed.

In this process, when all the ways in the specific index for storing this specific lower-level table segment are filled with updated segments, the process of writing the updated segments to the NAND flash memory 5 is executed by the flush process. Thus, each of the ways in this specific index can be selected as a replacement target.

Moreover, when all the ways in this specific index are being used in a previous address resolution process or a previous address update process, it is necessary to select a replacement target after completing processing the previous address resolution process or previous address update process, or to proceed with the processing, without caching the segment read from the NAND flash memory 5 into the table cache 61.

In the process of selecting a replacement cache entry, if the upper-level table priority flag is False, the replacement cache entry is selected based on the LRU replacement algorithm or the like. If the upper-level table priority flag is True, the replacement cache entry is selected from the cache entries which store the lower-level table segments so as to preferentially leave the upper-level table segments in the table cache 61.

Subsequently, the cache controller 151 executes the refill process which transmits this specific lower-level table segment to the table cache 61 from the NAND flash memory 5 (Step S15). In the refill process, this specific lower-level table segment is stored in the cache entry allocated as described above. The details of this refill process will be provided with reference to FIG. 29.

Then, the cache controller 151 acquires mapping information from this specific lower-level table segment (Step S13).

Thus, the processing until the specific lower-level table segment is transferred to the table cache 61 and the mapping information is acquired is executed by the cache controller 151. The processing of reading/writing the user data from/to the NAND flash memory 5 is executed by the controller 4 (for example, CPU 12). Note that, the task roles of the cache controller 151 and the controller 4 (for example, CPU 12) are not limited to those of this example.

Figure 29:
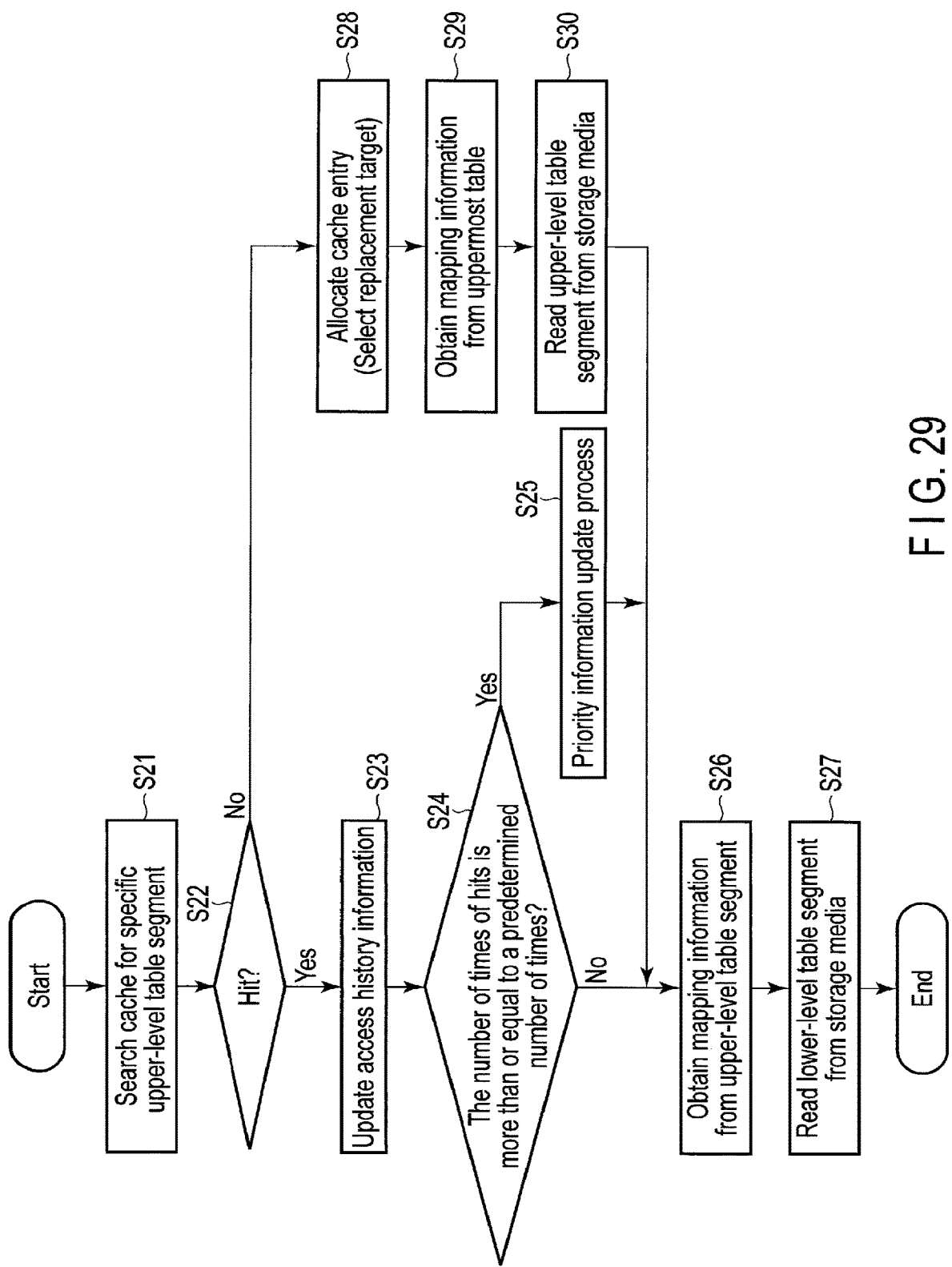
FIG. 29 is a flowchart illustrating a procedure of a refill process executed by the memory system of the first embodiment.

The flowchart of FIG. 29 illustrates the procedure of the refill process.

The cache controller 151 searches the table cache 61 for a specific upper-level table segment with the logical address range which covers the logical address range of the specific lower-level table segment to be refilled (Step S21).

When this specific upper-level table segment is present in the table cache 61 (*hit*) (Yes in Step S22), the access history information management unit 152 updates the access history information (Step S23).

In Step S23, the access history information management unit 152 executes processing to increment the number of times of hit s of the upper-level table by +1, and processing to add the score corresponding to the current LRU rank of the hit upper-level table segment to the current cumulative score.

When the number of times of hits from the last priority information update process is more than or equal to a predetermined number (Yes in Step S24), that is, when the incremented number of times of hits of the upper-level table reaches the predetermined number, the priority adjustment unit 153 executes the priority information update process (Step S25).

The reason for performing the priority information update process on condition that the number of times of hits from the last priority information update process is more than or equal to the predetermined number, is to become able to evaluate the access tendency of the host 2 over a period more than a certain length (that is, the reference tendency of the table cache 61). In the priority information update process of Step S25, the priority adjustment unit 153 executes processing to set the upper-level table priority flag as True or False based on the cumulative score, and processing to reset the number of times of hits of the upper-level table and the cumulative scores to initial values.

Subsequently, the cache controller 151 acquires mapping information from this specific upper-level table segment (Step S26). This mapping information contains the physical address which indicates the location on the NAND flash memory 5, where the specific lower-level table segment to be refilled is written. The cache controller 151, using this physical address, reads the specific lower-level table segment from the NAND flash memory 5 and stores the read lower-level table segment in the allocated cache entry (Step S27).

When this specific upper-level table segment is not present in the table cache 61 (No in Step S22), the cache controller 151 allocates a cache entry (cache line) for storing this specific upper-level table segment (Step S28). In Step S28, when the usable cache entry (cache line) is not present, processing to select a replacement target cache entry (replacement target cache line) is executed.

In the processing of selecting a replacement target cache entry, if the upper-level table priority flag is False, the replacement target cache entry is selected from candidates of the replacement target cache entries based on the LRU replacement algorithm or the like. If the upper-level table priority flag is True, the replacement target cache entry is selected from candidates of the replacement target cache entries, which store the lower-level table segments so as to preferentially leave the upper-level table segments in the table cache 61. Note that when all the lower-level table segments included in the candidates of the replacement target cache entries are being used, the replacement target cache entry is selected from the candidates of the cache entries, which store the upper-level table segments.

Subsequently, the cache controller 151 acquires mapping information (the physical address which indicates the location in the NAND flash memory 5, where the specific upper-level table segment is written) corresponding to this specific upper-level table segment from the uppermost-level table 83 (Step S29). The cache controller 151, using the thus acquired physical address, reads this specific upper-level table segment from the NAND flash memory 5 and stores this specific upper-level table segment in the cache entry allocated (Step S30).

Subsequently, the cache controller 151 acquires the mapping information from this specific upper-level table segment (Step S26). This mapping information contains the physical address which indicates the location on the NAND flash memory 5, where the specific lower-level table segment to be refilled is written. The cache controller 151, using this physical address, reads the specific lower-level table segment from the NAND flash memory 5 and stores the thus read lower-level table segment in the cache entry allocated (Step S27).

The flowchart of FIG. 30 illustrates the procedure of the address update process.

An update target segment, whose mapping information is to be updated, is one of the lower-level table segment, the upper-level table segment and the uppermost-level table segment. When the data corresponding to the logical address designated by the write request from the host 2 is written in the NAND flash memory 5, the mapping information of the lower-level table segment corresponding to this logical address is an object to be updated. When the lower-level table segment updated on the table cache 61 is written in the NAND flash memory 5, the mapping information of the specific upper-level table segment which manages the physical address of this lower-level table segment is an object to be updated. When the upper-level table segment updated on the table cache 61 is written in the NAND flash memory 5, the uppermost-level table is an object to be updated.

Since the entire uppermost-level table is present on the RAM 6, the following descriptions are directed to the case where an update target segment is a lower-level table segment or an upper-level table segment. The cache controller 151 searches the table cache 61 for the update target segment (a lower-level table segment or an upper-level table segment) (Step S41).

When the segment to be updated is present in the table cache 61 (a hit) (YES in Step S42), the cache controller 151 updates, on the table cache 61, the mapping information of the update target segment (Step S43). Note that when the update target segment is an upper-level table segment and this upper-level table segment is present in the table cache 61 (*hit*) (Yes in Step S42), the cache controller 151 may further execute the processing illustrated by Steps S23 to S25 of FIG. 29.

When a certain number of updated segments are accumulated (Yes in Step S44), the cache controller 151 executes the flush process of writing these updated segments in the NAND flash memory 5 (Step S45).

On the other hand, when a certain number of updated segments have not been accumulated (No in Step S44), the cache controller 151 finishes the address update process without performing the flush process.

When the update target segment is not present in the table cache 61 (NO in Step S42), the cache controller 151 allocates a cache entry (cache line) for storing the update target segment (Step S46). In Step S46, when the usable cache entry (cache line) is not present, the processing of selecting a replacement target cache entry (replacement target cache line) is executed.

In the processing which selects a replacement target cache entry, if the upper-level table priority flag is False, a replacement target cache entry is selected based on the LRU replacement algorithm or the like. If the upper-level table priority flag is True, a replacement target cache entry is selected from cache entries which store the lower-level table segments so as to preferentially leave the upper-level table segments in the table cache 61.

Subsequently, the cache controller 151 executes the refill process illustrated in FIG. 28 and stores the update target segment in the table cache 61 (Step S47). Then, the cache controller 151 executes the processes by Steps S43 to S45 described above.

The flowchart of FIG. 31 illustrates the procedure of the flush process.

The cache controller 151 copies the updated segment on the table cache 61 to a buffer (a buffer on the RAM 6) (Step S51). The processing of Step S51 is repeated until a certain number of updated segments are copied to the buffer. When a certain number of segments are copied (Yes in Step S52), the cache controller 151 writes the updated segments which are stored in the buffer to the NAND flash memory 5 (Step S53). The cache controller 151 executes the process of updating the table segment of the high hierarchical level corresponding to each updated segment written to the NAND flash memory 5 in Step S53, on the table cache 61. For example, When the updated segment written to the NAND flash memory 5 is a lower-level table segment, the process of updating a specific upper-level table segment corresponding to this lower-level table segment on the table cache 61 is executed. Thus, the physical address which indicates the latest storage location in the NAND flash memory 5, where this lower-level table segment is written, is reflected in the mapping information of this specific upper-level table segment. Moreover, when the updated segment written to the NAND flash memory 5 is an upper-level table segment, the process of updating the specific uppermost-level table segment corresponding to this upper-level table segment is executed.

After that, the cache controller 151 changes the state of each updated segment written to the NAND flash memory 5 in Step S53, from updated to not-yet updated (Step S54). A segment whose state has changed to the not-yet updated may be selected as a replacement target and evict from the table cache 61 later. The content of the specific upper-level table segment corresponding to this evicted segment is already updated to the newest content. When this evicted segment needs to be referred to, the latest storage location in the NAND flash memory 5, where the evicted segment is stored, can be acquired by referring to this specific upper-level table segment.

The flowchart of FIG. 32 illustrates the procedure of the priority information update process executed in Step S25 of FIG. 29.

When the number of times of hits of upper-level table reaches the predetermined number, the priority adjustment unit 153 compares the current cumulative score with a threshold value (Step S61). When the cumulative score is less than the threshold value (Yes in Step S62), the priority adjustment unit 153 sets the upper-level table priority flag to True (Step S63).

When this cumulative score is higher than or equal to the threshold value (No in Step S62), the priority adjustment unit 153 sets the upper-level table priority flag to False (Step S64).

After the processing of Step S63 or Step 64, the access history information management unit 152 resets each of the number of times of hits of upper-level tables and the cumulative score to a respective initial value (Step S65). After the number of times of hits of upper-level table and the cumulative score are reset, the access history information update process is executed each time of an upper-level table hit occurs to evaluate the access tendency of the next period.

Note that the threshold value to be compared with the cumulative score may be changed according to the current state of the upper-level table priority flag so as for the switching operation of the enabling/disabling of the upper-level table priority mode to have hysteresis characteristics.

When the current upper-level table priority flag is False, the priority adjustment unit 153 compares the cumulative score with a first threshold value. If the cumulative score is less than the first threshold value, the priority adjustment unit 153 sets the upper-level table priority flag to True. If the cumulative score is not less than the first threshold value, the priority adjustment unit 153 maintains the upper-level table priority flag to False.

When the current upper-level table priority flag is True, the priority adjustment unit 153 compares the cumulative score with a second threshold value, which is higher or lower than the first threshold value. If the cumulative score is higher than the second threshold value, the priority adjustment unit 153 changes the upper-level table priority flag to False. If the cumulative score is less than the second threshold value, the priority adjustment unit 153 maintains the upper-level table priority flag to True. Note that when, for example, the upper-level table priority mode is to be made hard to become disable from enable, the second threshold value may be made higher than the first threshold value. When the upper-level table priority mode is to be made easy to become disable from enable, the second threshold value may be made lower than the first threshold value.

Figure 33:
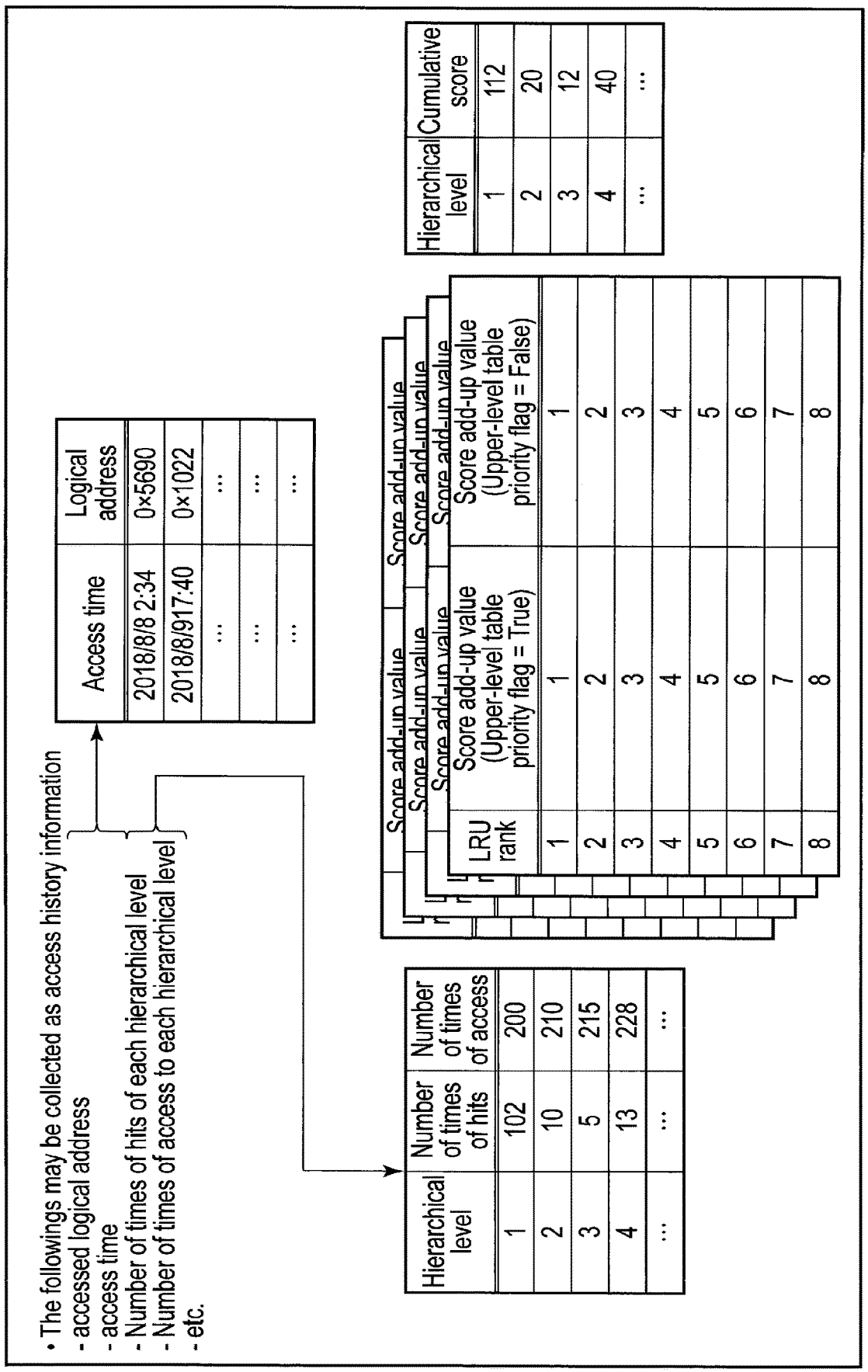
FIG. 33 is a diagram illustrating various parameters (accessed logical address, access time, the number of times of hits of each hierarchical level in the multi-level mapping table, the number of times of access to each hierarchical level of the multi-level mapping table, etc.) which can be used as access history information.

FIG. 33 shows other various parameters usable as the access history information (the logical addresses accessed, the access time, the number of times of hits of each hierarchical level of the multi-level mapping table, the number of access to each hierarchical level of the multi-level mapping table, and the like).

Although not used in this embodiment, accessed logical addresses, access time, the number of times of hits of each hierarchical level, the number of times of access to each hierarchical level, and the like may be collected as the access history information.

Moreover, for each of a plurality of hierarchical levels, the cumulative scores may be individually calculated. For example, such a case is assumed, where three types of table segments corresponding to the hierarchical level 1, the hierarchical level 2, and the hierarchical level 3 are cached into the table cache 61. As described above, the table of the hierarchical level 3 is a table for managing the physical address in the NAND flash memory 5, where the data received from the host 2 is written. The table of the hierarchical level 2 is a table for managing the physical address in the NAND flash memory 5, where each of the table segments of the hierarchical level 3 is written. The table of the hierarchical level 1 is a table for managing the physical address in the NAND flash memory 5, where each of the table segments of the hierarchical level 2 is written. For example, the logical address range covered by each segment of the hierarchical level 1 is the widest, and next, the logical address range covered by each segment of the hierarchical level 2 is wider. The logical address range covered by each segment of the hierarchical level 3 is the narrowest.

When the table segment of the hierarchical level 1 is hit, the access history information management unit 152 acquires score corresponding to the current LRU rank of the thus hit table segment from the score add-up value table corresponding to the hierarchical level 1, and adds this score to a cumulative score corresponding to the hierarchical level 1. When the table segment of the hierarchical level 2 is hit, the access history information management unit 152 acquires a score corresponding to the current LRU rank of the thus hit table segment from the score add-up value table corresponding to the hierarchical level 2, and adds this score to a cumulative score corresponding to the hierarchical level 2. When the table segment of the hierarchical level 3 is hit, the access history information management unit 152 acquires a score corresponding to the current LRU rank of the thus hit table segment from the score add-up value table corresponding to the hierarchical level 3, and adds this score to a cumulative score corresponding to the hierarchical level 3.

Thus, the degree of bias of reference with respect to the table segment cached can be evaluated for every hierarchical level by calculating the cumulative score for each respective hierarchical level; therefore the priority corresponding to each hierarchical level may be set based on this evaluation result.

The flowchart of FIG. 34 illustrates the procedure of the process of neglecting either one of the access tendency regarding the write access by the host 2 and the access tendency regarding the read access by the host 2.

In this embodiment, the priority corresponding to each of upper-level table and lower-level table is determined based on the access tendency of the host 2.

In this case, in the case where only the access tendency regarding the read access is focused, the access tendency regarding the write access by the host 2 may be neglected, and the priority corresponding to each of the upper-level tables and lower-level tables may be determined based on only the access tendency regarding the read access. Thus, even if the write access is narrow-range access and the read access is wide-range access, the mode suitable for the access tendency regarding the read access to be focused (wide-range access), i.e., the upper-level table priority mode can be enabled.

Or in the case where the access tendency regarding the write access is focused, the access tendency regarding the read access by the host 2 may be neglected, and the priority corresponding to each of the upper-level tables and lower-level tables may be determined based on only the access tendency regarding the write access.

In the case where the access tendency regarding the write access by the host 2 is neglected, that is, in the case where the reference tendency of the table cache 61 resulting from the write access by the host 2 is neglected, the access history information management unit 152 does not make the cache hit of the upper-level table segment which occurred in the address update process, to be reflected in the accumulation score, that is, the value indicating the degree of bias of reference to the upper-level table segment cached.

On the other hand, in the case where the access tendency regarding the read access by the host 2 is neglected, that is, in the case where the reference tendency of the table cache 61 resulting from the read access by the host 2 is neglected, the access history information management unit 152 does not make the cache hit of the upper-level table segment which occurred in the address resolution process, to be reflected in the cumulative score, that is, the value which indicates the degree of bias of reference with respect to the upper-level table segment cached.

The controller 4 (for example, CPU 12) may instruct the cache controller 151 that the access tendency regarding the write access should be neglected or the access tendency regarding the read access should be neglected.

When a write request is received from the host 2 (YES in Step S71), the cache controller 151 accesses the table cache 61 to update the mapping information so that the physical address which indicates the physical location in the NAND flash memory 5, where the write data corresponding to this write request is written, is mapped to the logical address designated by this write request.

The cache controller 151 determines whether or not the instruction that the access tendency regarding the write access should be neglected, is made (Step S72).

When the instruction that the access tendency regarding the write access should be neglected, is made (Yes in Step S72), the cache controller 151 does not pass information (access history) which indicates that hit of the upper-level table segment occurred, to the access history information management unit 152 even if the target upper-level table segment is hit. Thus, the access history information management unit 152 does not update the access history information (the number of times of hits of upper-level table, the cumulative score) (Step S73). As described above, the cumulative score is a value indicating the degree of bias of reference with respect to the upper-level table segment stored in the table cache 61. On the other hand, when the instruction that the access tendency regarding the write access should be neglected, is not made (No in Step S72) and the target upper-level table segment is hit, the cache controller 151 passes the information (access history) which indicates that hit of the upper-level table segment occurred, to the access history information management unit 152, and the access history information management unit 152 updates the access history information (the number of times of hits of upper-level table, the cumulative score) (Step S73).

When a read request is received from the host 2 (No in Step S71), the cache controller 151 searches the table cache 61 in order to refer to the mapping information containing the physical address corresponding to the logical address designated by the read request.

The cache controller 151 determines whether or not the access tendency regarding the read access should be neglected, is instructed (Step S75).

When the instruction that the access tendency regarding the read access should be neglected is made (Yes in Step S75), the cache controller 151 does not pass information (access history) which indicates that hit of the upper-level table segment occurred, to the access history information management unit 152 even if the target upper-level table segment is hit. Thus, the access history information management unit 152 does not update the access history information (the number of times of hits of upper-level tables, the cumulative score) (Step S76). On the other hand, when the instruction that the access tendency regarding the read access should be neglected, is not made (No in Step S75) and the target upper-level table segment is hit, the cache controller 151 passes the information (access history) which indicates that hit of the upper-level table segment occurred, to the access history information management unit 152, and the access history information management unit 152 updates the access history information (the number of times of hits of upper-level tables, the cumulative score) (Step S77).

Note that the processing described with reference to FIG. 34 is applicable also to the structure which calculates the cumulative score of each of a plurality of hierarchical levels to be cached. Here, in the case where the reference tendency of the table cache 61 resulting from the write access by the host 2 is neglected, the access history information management unit 152 does not make the cache hit of the table segment of each hierarchical level, which occurred in the address update process, to be reflected in the cumulative score of each hierarchical level, that is, the value which indicates the degree of bias of reference for each hierarchical level. On the other hand, in the case where the reference tendency of the table cache 61 resulting from the read access by the host 2 is neglected, the access history information management unit 152 does not make the cache hit of the table segment of each hierarchical level, which occurred in the address resolution process, to be reflected in the cumulative score of each hierarchical level, that is, the value which indicates the degree of bias of reference for each hierarchical level.

FIG. 35 illustrates a plurality of regions corresponding respectively to a plurality of namespaces managed by the SSD 3.

FIG. 35 illustrates the case on the assumption that a namespace NS #1, a namespace NS #2, . . . , a namespace NS #n are created in accordance with respective requests of creating namespaces received from the host 2 by the controller 4. In this case, the SSD capacity (the user capacity of the SSD 3) as seen from the host 2 is logically divided into a region #1 corresponding to the namespace NS #1, a region #2 corresponding to the namespace NS #2, . . . , a region #n corresponding to the namespace NS #n.

As illustrated in FIG. 36, a logical address space (LBA range) is allocated to each namespace. The size of the LBA range (that is, the number of LBAs) varies from a region to another (from a namespace to another). The host 2 can designate the size of the LBA range of the namespace to be created by the respective name space creating request. Generally, the LBA range which should be allocated to each namespace begins from LBA0.

FIG. 37 illustrates a configuration example of the SSD 3 for individually adjusting the priority information for each table cache corresponding to each respective one of the namespaces.

Read/write requests received from the host 2 each also contain the parameter which designates the identifier (NSID) of a namespace to be accessed in addition to the logical addresses and data lengths. When the write request which designates the NSID of the namespace NS #1 is received from the host 2, the controller 4 writes the write data corresponding to this write request to the region #1 of the NAND flash memory 5, which corresponds to the namespace NS #1. Further, when the write request which designates the NSID of the name space NS #2 is received from the host 2, the controller 4 writes the write data corresponding to this write request to the region #2 of the NAND flash memory 5, which corresponds to the namespace NS #2. Note that the regions #1 and #2 of the NAND flash memory 5 may not be managed separately.

In order for the simplification of illustration, the following descriptions are based on the case of the assumption two namespaces, the namespace NS #1 and the namespace NS #2, are created.

The mapping between each logical address corresponding to the namespace NS #1 and each physical address is managed by a multi-level mapping table 8A for the namespace NS #1. Similarly, the mapping between each logical address corresponding to the namespace NS #2 and each physical address is managed by a multi-level mapping table 8B for the namespace NS #2.

Each of the multi-level mapping table 8A and the multi-level mapping table 8B has a structure similar to that of the multi-level mapping table 8 described with reference to FIG. 5 and FIG. 6. A part of the lower-level table of the multi-level mapping table 8A and a part of the upper-level table of the multi-level mapping table 8A are cached in the table cache 61A for the namespace NS #1, which is present on the RAM 6. The entire uppermost-level table of the multi-level mapping table 8A is stored in a storage area in the RAM 6, which is different in the table cache 61A.

Similarly, a part of the lower-level table of the multi-level mapping table 8B and a part of the upper-level table of the multi-level mapping table 8B are cached in the table cache 61B for the namespace NS #2, which is present on the RAM 6. The entire uppermost-level table of the multi-level mapping table 8B is stored in a storage area in the RAM 6, which is different from the table cache 61A or 61B.

The controller 4 individually evaluates, for each of the table caches 61A and 61B, the degree of bias of reference with respect to the upper-level table segment cached.

That is, the controller 4 includes access history information management units 152A and 152B respectively corresponding to the table caches 61A and 61B, and priority adjustment units 153A and 153B respectively corresponding to the table caches 61A and 61B.

The access history information management unit 152A manages the number of times of hits of upper-level table and the cumulative score, which correspond to the table cache 61A as the access history information of the namespace NS #1. The access history information management unit 152B manages the number of times of hits of upper-level tables and the cumulative score, which corresponds to the table cache 61B as the access history information of the namespace NS #2.

The priority adjustment unit 153A compares the cumulative score corresponding to the table cache 61A with a threshold value, and sets the upper-level table priority flag corresponding to the namespace NS #1 to True or False based on the comparison result.

The priority adjustment unit 153B compares the cumulative score corresponding to the table cache 61B with a threshold value and sets the upper-level table priority flag corresponding to the namespace NS #2 to True or False based on the comparison result.

Figure 38:
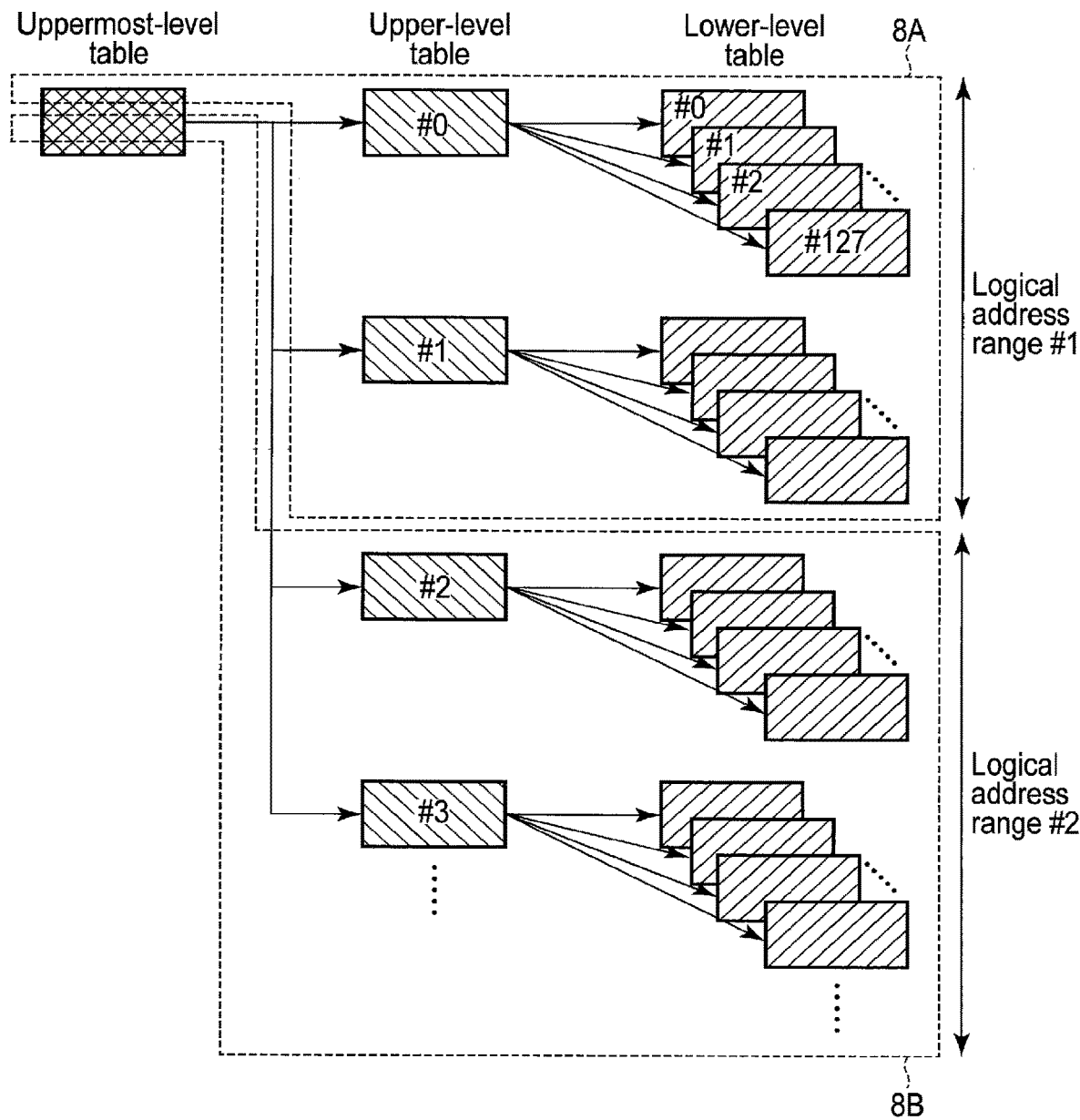
FIG. 38 is a diagram illustrating a configuration example of the multi-level mapping table shared by the namespaces.

The multi-level mapping table 8A corresponding to the namespace NS #1 and the multi-level mapping table 8B corresponding to the namespace NS #2 may be multi-level mapping tables separate from each other. Or, as shown in FIG. 38, the logical address range for the namespace NS #1 and the logical address range for the namespace NS #2 are allocated, respectively to the first logical address range #1 and the second logical address range #2 in the logical address space of one multi-level mapping table, and a part of the one multi-level mapping table, which corresponds to the first logical address range #1, may be used as the multi-level mapping table 8A for the namespace NS #1, and another part of the multi-level mapping table, which corresponds to the second logical address range #2, may be used as the multi-level mapping table 8B for the namespace NS #2.

FIG. 39 illustrates the access history information and the priority information, which are individually managed for each namespace.

As to the name space NS #1, the number of times of hits of upper-level table and the cumulative score are managed as the access history information for the namespace NS #1 based on the reference tendency of the table cache 61A for the namespace NS #1. Further, the upper-level table priority flag corresponding to the namespace NS #1 is managed as the priority information for the namespace NS #1.

Similarly, as to the name space NS #2, the number of times of hits of upper-level table and the cumulative score are managed as the access history information for the namespace NS #2 based on the reference tendency of the table cache 61B for the namespace NS #2. Further, the upper-level table priority flag corresponding to the namespace NS #2 is managed as the priority information for the namespace NS #2.

In the case where each of the table cache 61A and 61B caches each of the segments corresponding to more hierarchical levels, the number of times of hits corresponding to each of these hierarchical levels and the cumulative score corresponding to each of these hierarchical levels may be managed as the access history information. Moreover, the priority corresponding to each of these hierarchical levels may be managed the as priority information.

For example, in the table cache 61A, when the table segment of the hierarchical level 1 is hit, the access history information management unit 152A acquires a score corresponding to the current LRU rank of the this hit table segment from the score add-up value table corresponding to this hierarchical level 1, and adds this score to the cumulative score corresponding to the hierarchical level 1. In the case where the table segment of the hierarchical level 2 is hit in the table cache 61A, the access history information management unit 152A acquires a score corresponding to the current LRU rank of the this hit table segment from the score add-up value table corresponding to this hierarchical level 2, and adds this score to the cumulative score corresponding to the hierarchical level 2. In the case where the table segment of the hierarchical level 3 is hit in the table cache 61A, the access history information management unit 152A acquires a score corresponding to the current LRU rank of the this hit table segment from the score add-up value table corresponding to this hierarchical level 3, and adds this score to the cumulative score corresponding to the hierarchical level 3. Thus, by computing the cumulative score for each hierarchical level, the degree of bias of reference for each hierarchical level, the degree of bias of the reference relating to the table segment corresponding to each hierarchical level cached in the table cache 61A, can be evaluated. Therefore, based on this evaluation result, the priority corresponding to each hierarchical level can be set. As a result, in the case where the table segments of three or more hierarchical levels are to be cached into the table cache 61A, the priority can be set for each hierarchical level based on the cumulative score for every hierarchical level, and thus the segments of a hierarchical level with high priority can be preferentially cached into the table cache 61A over the segments of a hierarchical level with a low priority.

In the table cache 61B as well, processing which calculates the cumulative score for each hierarchical level, and processing which sets the priority for each hierarchical level based on the cumulative score for every hierarchical level are executed. As a result, in the case as well where the table segments of three or more hierarchical levels are cached into the table cache 61B, the priority can be set for each hierarchical level based on the cumulative score for each hierarchical level, and the segments of a hierarchical level with high priority can be preferentially cached into the table cache 61B over the segments of a hierarchical level with a low priority.

Figure 40:
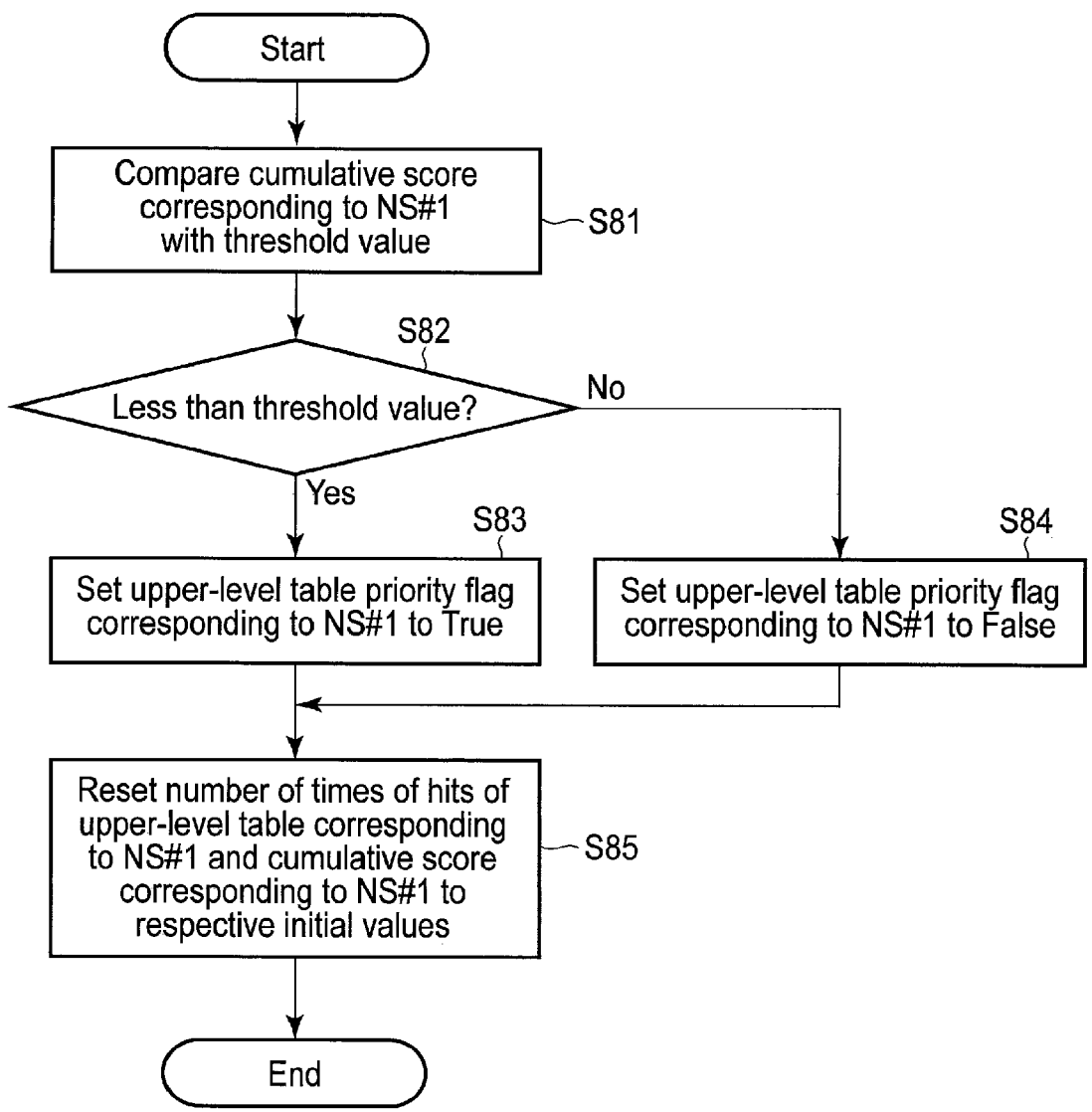
FIG. 40 is a flowchart illustrating a procedure of a priority information update process executed for a first namespace of the namespaces, in the memory system of the first embodiment.

The flowchart of FIG. 40 illustrates the procedure of the priority information update process executed for the namespace NS #1 in a plurality of namespaces.

The priority adjustment unit 153A compares the cumulative score corresponding to NS #1 with a threshold value (Step S81). When the cumulative score corresponding to NS #1 is less than the threshold value (Yes in Step S82), the priority adjustment unit 153A sets the upper-level table priority flag corresponding to NS #1 to True (Step S83).

On the other hand, when the cumulative score corresponding to NS #1 is not less than the threshold value (No in Step S82), the priority adjustment unit 153A sets the upper-level table priority flag corresponding to NS #1 to False (Step S84).

Then, the priority adjustment unit 153A resets each of the number of times of hits of upper-level tables corresponding to NS #1, and the cumulative score corresponding to NS #1 to the respective initial values (Step S85), and finishes the priority information update process.

Figure 41:
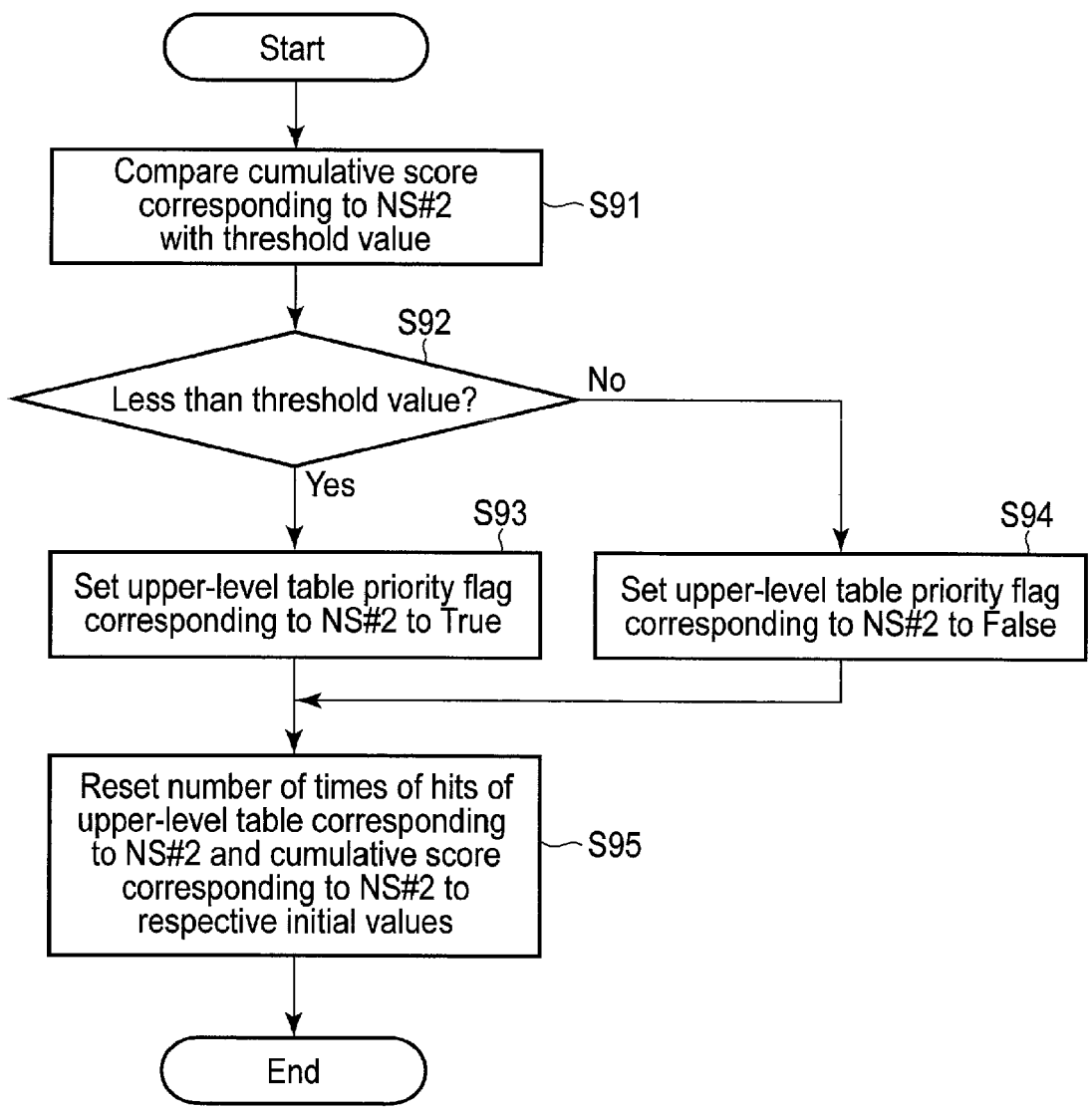
FIG. 41 is a flowchart illustrating a procedure of a priority information update process for a second namespace of the namespaces, in the memory system of the first embodiment.

The flowchart of FIG. 41 illustrates the procedure of the priority information update process executed on the name space NS #2 in a plurality of name spaces.

The priority adjustment unit 153B compares the accumulation score to NS #2 with a threshold value (Step S91). When the accumulation score to NS #2 is less than the threshold value (YES in Step S92), the priority adjustment unit 153B sets the upper-level table priority flag corresponding to NS #2 as True (Step S93).

On the other hand, when the accumulation score to NS #2 is not less than the threshold value (NO in Step S92), the priority adjustment unit 153B sets the upper-level table priority flag corresponding to NS #2 as False (Step S94).

Then, the priority adjustment unit 153B resets each of the number of times of hits of upper-level tables corresponding to NS #2, and the accumulation score corresponding to NS #2 to an initial value (Step S95), and finishes the priority information update process.

FIG. 40 and FIG. 41 illustrate the process of setting the priority of the upper-level tables based on the cumulative score of the upper-level table. Here, in the case where segments corresponding to more hierarchical levels are cached into each of the table cache 61A and 61B, as described above, the priority to each of a plurality of hierarchical levels may be set based on a plurality of cumulative scores corresponding respectively to the plurality of hierarchical levels. That is, for each of the table caches 61A and 61B, the priority is set for each hierarchical level, on the basis of the cumulative score for each hierarchical level. Then, in each of the table caches 61A and 61B, the operation of preferentially caching the segments of a hierarchical level with a high priority, over segments of a hierarchical level with a low priority.

FIG. 42 and FIG. 43 illustrate the operation of adjusting the memory capacities to be allocated to a plurality of table caches corresponding respectively to a plurality of namespaces based on the frequency of access to each namespace by the host 2. Note that based on not only the frequency of access, but also the cumulative scores corresponding to the plurality of table caches corresponding respectively to these namespaces, the operation of adjusting the memory capacity to be allocated to the plurality of table caches corresponding respectively to the plurality of name spaces may be executed.

When adjusting the cache size (cache capacity), the process of adjusting the threshold value to be used according to the cache capacity adjusted may be executed.

For example, when the frequency of access to NS #1 is high and the access frequency of NS #2 is low, the cache controller 151, as shown in FIG. 42, increases the capacity on the RAM 6 to be allocated to the table cache 61A, and instead decreases the capacity on the RAM 6 to be allocated to the table cache 61B. Thus, the size of the table cache corresponding to a namespace accessed highly frequently by the host 2 can be increased, and therefore the hit rate of this table cache frequently accessed can be improve.

On the other hand, when the access frequency of NS #1 is low and the access frequency of NS #2 is high, the cache controller 151 decreases the cache capacity of the table cache 61A and increases the cache capacity of the table cache 61B as shown in FIG. 43.

Or the memory capacities to be allocated to the table cache 61A and the table cache 61B may be adjusted so as to increase the size of the cache determined as that the access tendency is the wide-range access, based on the relationship between the cumulative scores of the table cache 61A and the cumulative scores of the table cache 61B.

Thus, in this embodiment, the size of each of these table caches is adjusted based on at least one of: (i) the frequency of access to each of a plurality of namespaces by the host 2; and (ii) the cumulative score for each hierarchical level corresponding to each table cache. Note that the process of adjusting the size of each of these table caches may be executed by the controller 4 (for example, CPU 12).

Second Embodiment

With reference to FIG. 44, the configuration of an information processing system 1 including a storage system according to a second embodiment will be described.

This storage system is realized as a storage array 100 including a plurality of storage devices. The storage devices included in the storage array 100 may be SSDs or hard disk drives (HDD). The following descriptions are based on the case on the assumption that a plurality of storage devices included in the storage array 100 are SSDs.

The storage array 100 comprises a controller 101, a RAM 102, a plurality of SSDs 200-1 to 200-n. The controller 101 manages the SSDs 200-1 to 200-n as a logical volume. The capacity of the logical volume is equivalent to a total of the capacities of the SSD 200-1 to 200-n. The host 2 recognizes the storage array 100 as one storage device. Or the controller 101 may have the function of supporting a plurality of namespaces. In this case, the capacity (user capacity) of the storage array 100 as seen from the host 2 is logically divided into a plurality of regions corresponding to a plurality of namespaces. Therefore, the host 2 can handle the storage array 100 as a plurality of regions (a plurality of storage devices).

Each of the SSDs 200-1 to 200-n manages a look-up table (LUT) which functions as a logical-to-physical address translation table.

A multi-level mapping table 300 is used to manage mapping between each of first type logical addresses designated by the host 2 and each of second type logical addresses for accessing the SSDs 200-1 to 200-n. The multi-level mapping table 300 includes a plurality of hierarchical tables, similar to the multi-level mapping table 8 described with reference to FIG. 5 and FIG. 6. The multi-level mapping table 300 may be stored in any one of the SSDs 200-1 to 200-n or and may be distributed to some of the SSDs 200-1 to 200-n.

A part of the multi-level mapping table 300 is cached in the table cache 311. The table cache 311 may be placed in a storage area of the RAM 102 or may be placed in a storage area of a storage device such as a high-speed SSD.

The controller 101 controls the SSDs 200-1 to 200-n and the table cache 311. The controller 101 executes, by referring to the segment (the address translation data portion) corresponding to each hierarchical level stored in the table cache 311, the address resolution process of converting a first type logical address into a second type of logical address, and the address update process of updating a second type logical address.

The controller 101 includes a cache controller 401, an access history information management unit 402 and a priority adjustment unit 403. The cache controller 401, the access history information management unit 402, and the priority adjustment unit 403 are configured to be similar to the cache controller 151, the access history information management unit 152, and the priority adjustment unit 153, respectively, discussed in FIG. 23.

FIG. 45 illustrates an example of the mapping table.

FIG. 45 illustrates first type logical addresses as global logical addresses. When the data corresponding to a global logical address 0 is written to the LBA 100 of the SSD(#1) 200-1, an identifier (ID #1) of SSD(#1)200-1 and the LBA 100 are registered into the mapping table as the second type logical address corresponding to the global logical address 0. When the data corresponding to a global logical address 1 is written to the LBA 110 of SSD(#1)200-1, the identifier (ID #1) of SSD(#1)200-1 and the LBA110 are registered into the mapping table as the second type logical address corresponding to the global logical address 1. Similarly, when the data corresponding to a global logical address 2 is written to the LBA 50 of SSD(#2)200-2, an identifier (ID #2) of SSD(#2)200-2 and the LBA 50 are registered into the mapping table as the second type logical address corresponding to the global logical address 2.

In this embodiment, this mapping table is realized as the multi-level mapping table 300 which has a hierarchical structure.

As shown in FIG. 46, a lower-level table 301 of the multi-level mapping table 300 includes a plurality of data portions (address translation data portion) #0, #1, #2, ..., #127, and ..., each referred to as a segment. One segment (one address translation data portion) of the lower-level table 301 is, for example, a set of 128 consecutive mapping information items. In other words, each segment of the lower-level table 301, i.e., each address translation data portion of the lower-level table 301, includes 128 second type logical addresses respectively corresponding to 128 first type logical addresses consecutive, for example, by unit of 4 KiB as the mapping information. Each second type logical address indicates an identifier (device ID) of an SSD to which data corresponding to a certain first type logical address is written, and a logical address (local logical address) of this SSD to which this data is written. Thus, the lower-level table 301 includes a plurality of segments (address translation data portions) which manage second type logical addresses, respectively. In the following descriptions, a segment belonging to the lower-level table 301 is referred to also as a lower-level table segment.

The upper-level table 302 of the multi-level mapping table 300 also includes a plurality of data portions (address translation data portions) #0, #1, #2, and ..., each referred to as a segment. One segment (one address translation data portion) of the upper-level table 302 manages second type logical addresses indicating the locations in the SSD, where, for example, 128 consecutive lower-level table segments are respectively stored. Each lower-level table segment may be stored in any of SSDs 200-1 to 200-n. Since each segment of the upper-level table 302 indicates the locations of 128 lower-level table segments, the number of the segments included in the upper-level table 302 is ⅟128 of the number of lower-level table segments. In the following descriptions, a segment of the upper-level table 302 is referred to also as an upper-level table segment.

The uppermost-level table 303 of the multi-level mapping table 300 includes a plurality of pointers. These pointers manage the second type logical addresses indicating the locations in the SSD, where all of the upper-level table segments are respectively stored. Each upper-level table segment may also be stored in any of SSDs 200-1 to 200-n.

In the second embodiment as well, a priority is set for each hierarchical level, on the basis of a degree of bias of reference for each hierarchical level, the degree of bias of the reference relating to the segment corresponding to each hierarchical level stored in the table cache 311, as in the first embodiment. Then, the operation of preferentially caching each segment of a hierarchical level with a high priority into the table cache 311, over each segment of a hierarchical level with a low priority, is executed.

The operation of the second embodiment will be described in connection with an example case where only two types of segments (upper-level table segments, lower-level table segments) corresponding to two hierarchical levels are cached in the table cache 311.

When a cumulative score which indicates the degree of bias of reference with respect to the upper-level table segment cached in the table cache 311 is less than a threshold value, it is estimated that the current access tendency of the host 2 is wide-range access. Then, the priority of the upper-level table is raised, and the upper-level table priority mode for preferentially caching the upper-level table segments into the table cache 311, over the lower-level table segments, is enabled. Thus, more upper-level table segments required for the address resolution process and address update process in the wide-range access can be placed on the table cache 311, and therefore the hit rate of the table cache 311 can be improved.

On the other hand, when the cumulative score indicating the degree of bias of reference to the upper-level table segment cached is higher than the threshold value, it is estimated that the current access tendency of the host 2 is narrow-range access. Then, the priority of the upper-level table is lowered and the upper-level table priority mode is disabled. Thus, specific one or some upper-level table segments highly frequently referred to and a number of lower-level table segments can be placed on the table cache 311, and therefore the hit rate of the table cache 311 can be improved.

As described, based on the degree of bias of reference to the upper-level table segment cached in the table cache 311, (i) the operation of preferentially caching each upper-level table segment into the table cache 311 over each lower-level table segment (the upper-level table priority mode is enabled), and (ii) the operation of caching each lower-level table segment and each upper-level table segment into the table cache 311 without giving priority to each upper-level table segment (the upper-level table priority mode is disabled) are selectively executed.

In the process of preferentially caching the upper-level table segments into the table cache 311 over the lower-level table segments, the operation of preferentially selecting each lower-level table segment over the upper-level table segments, as a candidate for replacement, is executed.

In the processing of caching the upper-level table segments and the lower-level table segments into the table cache 311 without giving priority to the upper-level table segments over the lower-level table segments, whether the candidate for replacement is an upper-level table segment or it is a lower-level table segment is not taken into consideration, but the segment to be replaced is selected from the candidates for replacement based on the LRU replacement algorithm or the like.

Note that in the second embodiment as well, the threshold value to be compared with the cumulative score may be changed according to the current state of the upper-level table priority flag so that the switching operation of the enabling/disabling the upper-level table priority mode has the hysteresis characteristics.

In this case, when the current upper-level table priority flag is False, the cumulative score is compared with a first threshold value. When the cumulative score is less than the first threshold value, the upper-level table priority flag is set to True. When the cumulative score is not less than the first threshold value, the upper-level table priority flag is maintained as False.

When the current upper-level table priority flag is True, that is, in the period that the operation of preferentially caching each upper-level table segment into the table cache 311 over each lower-level table segment, the cumulative score is compared with a second threshold value which is higher or lower than the first threshold value. When the cumulative score is higher than or equal to the second threshold value, the upper-level table priority flag is changed to False. Then, the operation of caching each lower-level table segment and each upper-level table segment into the table cache 311 is executed without giving priority to each upper-level table segment over each lower-level table segment.

Note that in the second embodiment as well, in the case of caching the segments of more hierarchical levels into the table cache 311, the cumulative score corresponding to each of a plurality of hierarchical levels cached may be calculated as in the first embodiment. Then, based on the cumulative score for each calculated hierarchical level, a priority may be set for each hierarchical level.

Moreover, in the second embodiment as well, the access tendency by the host 2 may be evaluated while neglecting one of the write access and the read access by the host 2 as in the first embodiment.

Moreover, in the second embodiment as well, a plurality of table caches corresponding to a plurality of namespaces may be managed as in the first embodiment. In this case, the cache controller 401 in the controller 101 controls a plurality of table caches each configured to cache a part of a corresponding multi-level mapping table of a plurality of multi-level mapping tables which correspond to the plurality of namespaces. For example, when the write or read request which designated the NSID of the namespace NS #1 is received from the host 2, the cache controller 401 refers to the table cache for the namespace NS #1. When a write or read request which designates the NSID of the namespace NS #2 is received from the host 2, the cache controller 401 refers to the table cache for the namespace NS #2. Then, the priority adjustment unit 403 evaluates the cumulative score corresponding to each of the plurality of table caches, and individually sets the priority corresponding to each of the lower-level table and upper-level table for each table cache based on the evaluation result.

Moreover, in the second embodiment as well, the controller 101 may adjust the size of each of the table caches based on at least one of: (i) the frequency of access to each of a plurality of namespaces by the host 2, and (ii) the cumulative score for each hierarchical level corresponding to each table cache, as in the first embodiment.

As described above, according to the first embodiment and the second embodiment, based on a degree of bias of reference for each hierarchical level, the degree of bias of the reference relating to the address translation data portion (segment) corresponding to each hierarchical level stored in the table cache, a priority is set for each hierarchical level, and the operation of preferentially caching each segment of a hierarchical level with a high priority over each segment of a hierarchical level with a low priority is executed. Therefore, according to the access tendency by the host 2, the order of the hierarchical levels to be cached with priority can be adjusted.

For example, in a case where the upper-level table segment in the table cache is focused, the degree of bias of reference with respect to the upper-level table segment in the table cache is less than the threshold value, the upper-level table priority flag, which raises the priority corresponding to the hierarchical level of an upper-level table, is set to True. Thus, the operation of preferentially caching each upper-level table segment into the table cache over each lower-level table segment is executed.

In the wide-range access in which a number of upper-level table segments are referred to, the degree of bias of reference with respect to the upper-level table segment in the table cache becomes weak. Therefore, by setting the upper-level table priority flag to True on the condition that the degree of bias of reference with respect to the upper-level table segment in the table cache is less than the threshold value, it is now possible to start the operation of preferentially caching each upper-level table segment into the table cache over the lower-level table segments at an appropriate timing. As a result, the performance regarding the address translation can be improved.

Moreover, when the condition that the degree of bias of reference with respect to the upper-level table segment in the table cache is less than the threshold value is not satisfied (in the narrow-range access), the operation of caching each upper-level table segment and each lower-level table segment into the table cache without giving priority to each upper-level table segment over the lower-level table segments is executed.

Therefore, as described with reference to FIG. 12, in the narrow-range access, the average number of times that the SSD is accessed can be made to about 1, and in the wide-range access, the average number of times that the SSD is accessed can be made into about 2.

In the first embodiment, the NAND flash memory is illustrated as a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory configured to store a multi-level mapping table for logical-to-physical address translation;
a cache configured to cache a part of the multi-level mapping table; and
a controller configured to control the nonvolatile memory and the cache,
the multi-level mapping table including a plurality of tables corresponding to a plurality of hierarchical levels, each of the tables containing a plurality of address translation data portions, and each of the plurality of address translation data portions included in the table of each of the hierarchical levels covering a logical address range according to each hierarchical level, wherein
the controller is further configured to:
execute, by referring to the address translation data portion corresponding to each of the hierarchical levels stored in the cache, an address resolution process for the logical-to-physical address translation and an address update process of updating a physical address corresponding to a logical address;
obtain, for each of the hierarchical levels, a degree of bias of reference with respect to the address translation data portion stored in the cache;
set a priority for each of the hierarchical levels such that a high priority is set to a hierarchical level in which the degree of bias of reference is weak and a low priority is set to a hierarchical level in which the degree of bias of reference is strong, based on the degree of bias of reference for each of the hierarchical levels obtained; and
execute an operation of preferentially caching each of the address translation data portions of the hierarchical level with the high priority into the cache, over each of the address translation data portions of the hierarchical level with the low priority.

2. The memory system of claim 1, wherein
the controller is further configured to preferentially cache each of the address translation data portions of the hierarchical level with the high priority into the cache, over each of the address translation data portions of the hierarchical level with the low priority, by preferentially selecting each of the address translation data portions of the hierarchical level with the low priority as a candidate for replacement target, over each of the address translation data portions of the hierarchical level with the high priority.

3. The memory system of claim 1, wherein
the controller is further configured to not reflect a cache hit that occurred, in the address update process in a value indicating the degree of bias of reference for each of the hierarchical levels, when a reference tendency of the cache resulting from write access by the host is to be neglected.

4. The memory system of claim 1, wherein
the controller is further configured to not reflect a cache hit that occurred in the address resolution process in a value indicating the degree of bias of reference for each hierarchical level, when a reference tendency of the cache resulting from read access by the host is to be neglected.

5. The memory system of claim 1, wherein the controller is further configured to:
control a plurality of caches, each configured to cache a part of a corresponding multi-level mapping table of a plurality of multi-level mapping tables corresponding to a plurality of namespaces;
regarding each of the plurality of caches, obtain, for each of the hierarchical levels, a degree of bias of reference with respect to the address translation data portion stored in each cache; and
execute, based on the degree of bias of reference for each of the hierarchical levels obtained, an operation of setting a priority for each of the hierarchical levels and an operation of preferentially caching each of the address translation data portions of the hierarchical level with a high priority into a corresponding cache, over each of the address translation data portions of the hierarchical level with a low priority, for each cache.

6. The memory system of claim 1, wherein
the controller is further configured to adjust a size of each of the plurality of caches, based on at least one of (i) a frequency of access to each of the plurality of name spaces by the host, and (ii) the degree of bias of reference for each of the hierarchical levels corresponding to each cache.

7. A storage system connectable to a host, comprising:
a plurality of storage devices;
a cache configured to cache a part of a mapping table which manages mapping between each of first type logical addresses designated by the host and each of second type logical addresses for accessing the plurality of storage devices; and a controller configured to control the plurality of storage devices and the cache, the multi-level mapping table including a plurality of tables corresponding to a plurality of hierarchical levels, each of the tables containing a plurality of address translation data portions, and each of the plurality of address translation data portions included in the table of each of the hierarchical levels covering a logical address range according to each hierarchical level, wherein the controller is further configured to:
- execute, by referring to the address translation data portion corresponding to each of the hierarchical levels stored in the cache, an address resolution process for converting the first type logical address into the second type logical address and an address update process of updating the second type logical address;
- obtain, for each of the hierarchical levels, a degree of bias of reference with respect to the address translation data portion stored in the cache;
- set a priority for each of the hierarchical levels such that a high priority is set to a hierarchical level in which the degree of bias of reference is weak and a low priority is set to a hierarchical level in which the degree of bias of reference is strong, based on the degree of bias of reference for each of the hierarchical levels obtained; and
- execute an operation of preferentially caching each of the address translation data portions of the hierarchical level with the high priority into the cache, over each of the address translation data portions of the hierarchical level with the low priority.

8. The storage system of claim 7, wherein
the controller is further configured to preferentially cache each of the address translation data portions of the hierarchical level with the high priority into the cache, over each of the address translation data portions of the hierarchical level with the low priority, by selecting each of the address translation data portions of the hierarchical level with the low priority as a candidate for replacement target, over each of the address translation data portions of the hierarchical level with the high priority.

9. The storage system of claim 7, wherein the controller is further configured to:
- control a plurality of caches, each configured to cache a part of a corresponding multi-level mapping table of a plurality of multi-level mapping tables corresponding to a plurality of namespaces;
- regarding each of the plurality of caches, obtain, for each of the hierarchical levels, a degree of bias of reference with respect to the address translation data portion stored in each cache; and
- execute, based on the degree of bias of reference for each of the hierarchical levels obtained, an operation of setting a priority for each of the hierarchical levels and an operation of preferentially caching each of the address translation data portion of the hierarchical level with a high priority into a corresponding cache, over each of the address translation data portions of the hierarchical level with a low priority, for each cache.

10. The storage system of claim 9, wherein
the controller is further configured to adjust a size of each of the plurality of caches, based on at least one of: (i) a frequency of access to each of the plurality of namespaces by the host, and (ii) the degree of bias of reference for each of the hierarchical levels corresponding to each cache.

11. A method of controlling a memory system including a nonvolatile memory configured to store a multi-level mapping table for logical-to-physical address translation, and a cache configured to cache a part of the multi-level mapping table, the multi-level mapping table including a plurality of tables corresponding to a plurality of hierarchical levels, each of the tables containing a plurality of address translation data portions, and each of the plurality of address translation data portions included in the table of each of the hierarchical levels covering a logical address range according to each hierarchical level, the method comprising:
- executing, by referring to the address translation data portion corresponding to each of the hierarchical levels stored in the cache, an address resolution process for the logical-to-physical address translation and an address update process of updating a physical address corresponding to a logical address;
- obtaining, for each of the hierarchical levels, a degree of bias of reference with respect to the address translation data portion stored in the cache;
- setting a priority for each of the hierarchical levels such that a high priority s set to a hierarchical level in which the degree of bias of reference is weak and a low priority is set to a hierarchical level in which the degree of bias of reference is strong, based on the degree of bias of reference for each of the hierarchical levels obtained; and
- executing an operation of preferentially caching each of the address translation data portions of the hierarchical level with all the high priority into the cache, over each of the address translation data portions of the hierarchical level with the low priority.

12. The method of claim 11, wherein
the executing the operation of preferentially caching each of the address translation data portions of the hierarchical level with the high priority into the cache, over each of the address translation data portions of the hierarchical level with the low priority, comprises preferentially selecting each of the address translation data portions of the hierarchical level with the low priority as a candidate for replacement target, over each of the address translation data portions of the hierarchical level with the high priority.

13. The method of claim 11, further comprising:
- controlling a plurality of caches, each configured to cache a part of a corresponding multi-level mapping table of a plurality of multi-level mapping tables corresponding to a plurality of namespaces;
- regarding each of the plurality of caches, obtaining, for each of the hierarchical levels, a degree of bias of reference with respect to the address translation data portion stored in each cache; and
- executing, based on the degree of bias of reference for each of the hierarchical levels obtained, an operation of setting a priority for each of the hierarchical levels and an operation of preferentially caching each of the address translation data portions of the hierarchical level with a high priority into a corresponding cache, over each of the address translation data portions of the hierarchical level with a low priority, for each cache.

14. The method of claim 13, further comprising:
adjusting a size of each of the plurality of caches, based on at least one of (i) a frequency of access to each of the plurality of name spaces by the host, and (ii) the degree of bias of reference for each of the hierarchical levels corresponding to each cache.

\* \* \* \* \*